United States Patent [19]
Tanaka et al.

[11] Patent Number: 6,032,000
[45] Date of Patent: Feb. 29, 2000

[54] CAMERA WITH MECHANISM FOR OPERATING A LIGHT BLOCK LID OF A FILM CARTRIDGE

[75] Inventors: Yoshiharu Tanaka, Sakai; Shigeru Wada, Kishiwada; Ikushi Nakamura, Sakai; Kazuhiko Kojima, Kyoto; Junji Mori, Sakai, all of Japan

[73] Assignee: Minolta Co., Ltd., Osaka, Japan

[21] Appl. No.: 09/195,033

[22] Filed: Nov. 19, 1998

Related U.S. Application Data

[62] Division of application No. 08/789,559, Jan. 27, 1997.

[30] Foreign Application Priority Data

| | | | |
|---|---|---|---|
| Jan. 31, 1996 | [JP] | Japan | 8-16225 |
| Jan. 31, 1996 | [JP] | Japan | 8-16249 |
| Jan. 31, 1996 | [JP] | Japan | 8-16250 |

[51] Int. Cl.$^7$ ................................................. G03B 17/02
[52] U.S. Cl. ................................. 396/536; 396/538
[58] Field of Search ................................. 396/536, 538, 396/511–516, 387, 411, 413, 418, 439

[56] References Cited

U.S. PATENT DOCUMENTS 5,592,253  1/1997  Nishimura et al. ..................... 396/538

*Primary Examiner*—Safet Metjahic
*Assistant Examiner*—J. K. Han
*Attorney, Agent, or Firm*—McDermott, Will & Emery

[57] ABSTRACT

A camera with a cartridge chamber for accepting a film cartridge with film and a cover for covering the cartridge chamber. The camera has a locking mechanism that locks the cover when the cover is in a closed state and a releasing device for releasing the cover from a closed state. The locking mechanism includes a pivotable member having on one end a locking portion engageable with the cover to lock the cover in the closed state and on the other end a contact portion. A biasing member urges the pivotal member in a locking direction so that the locking portion engages the cover. The releasing member includes a motor is used to open the cover. The motor drives a crank member that is connected to an unlocking member via a link member, which is operable to rotate the pivotal member in a direction opposite to the cover closing direction to open the cover.

13 Claims, 38 Drawing Sheets

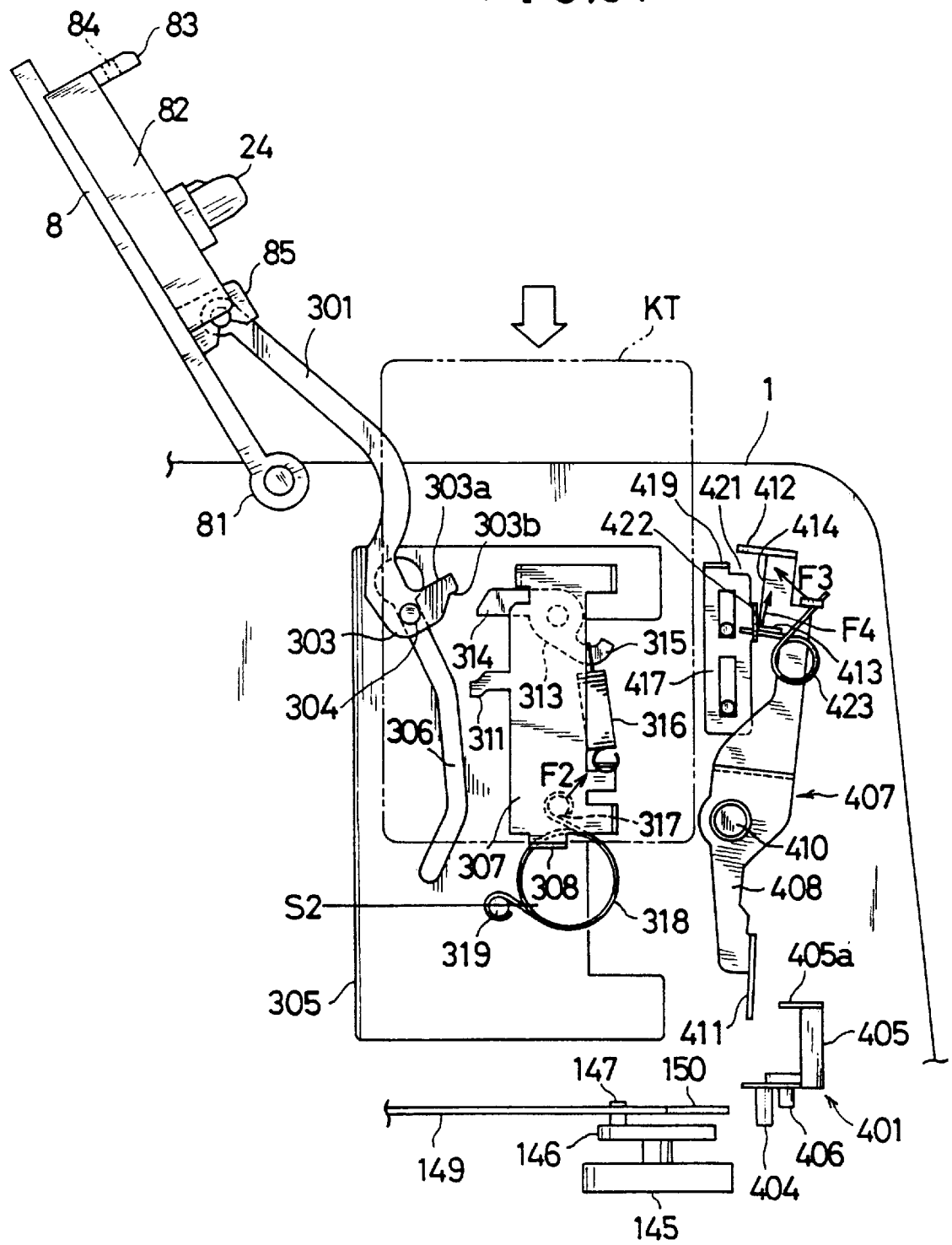
F I G. 34

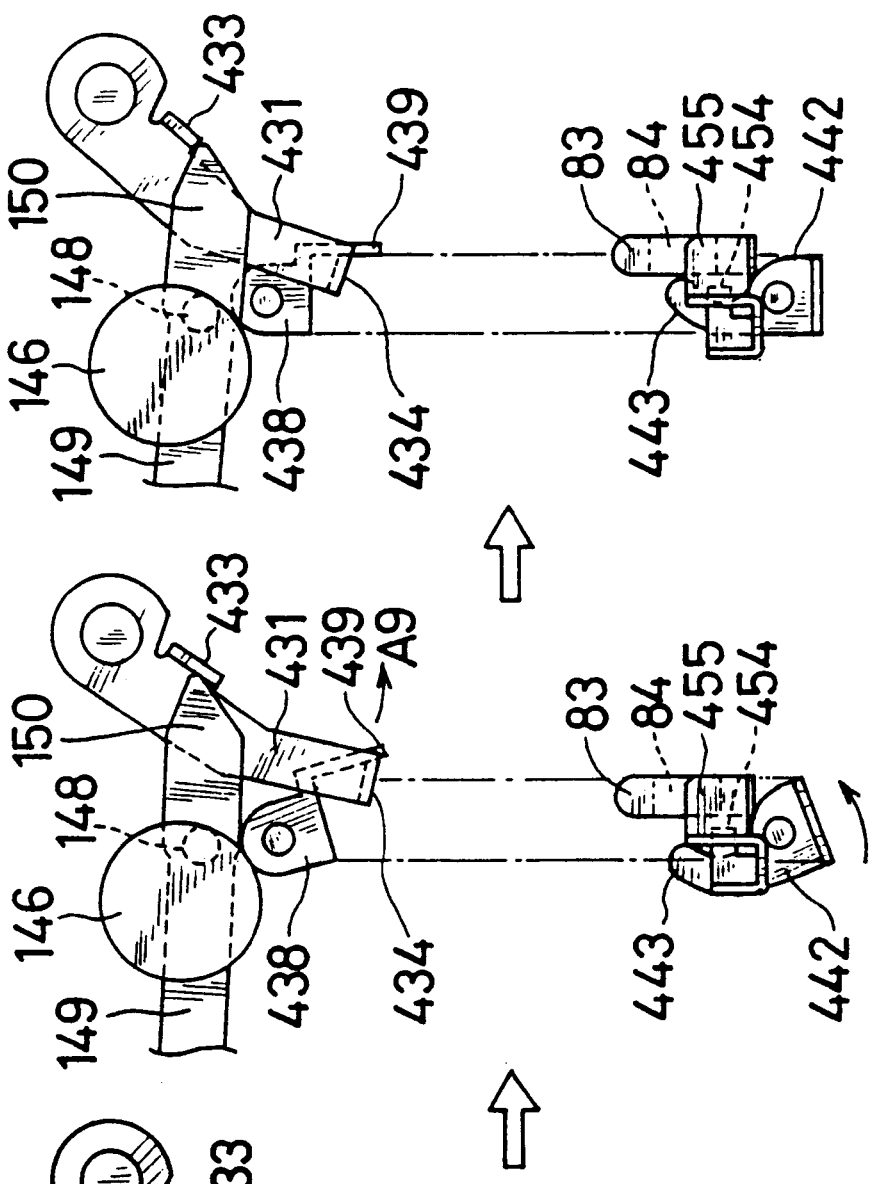

CAMERA WITH MECHANISM FOR OPERATING A LIGHT BLOCK LID OF A FILM CARTRIDGE

This is a divisional application of Ser. No. 08/789,559, filed Jan. 27, 1997.

BACKGROUND OF THE INVENTION

This invention relates to a camera mountable with a film cartridge, in particular to a camera mountable with an APS or advanced photosystem film cartridge.

A technique for effecting a film feed such as winding and rewinding by a torque of an electric motor built in a camera main body is known, and the film is fed by driving a motor in most of cameras presently available on the market.

The film is wound by rotating a take-up spool provided in a film take-up chamber, whereas it is rewound by rotating a fork provided in a cartridge chamber and fitted into a spool of a cartridge. Different members are driven to wind and rewind the film, and contents of controls for winding and rewinding of the film differ (the film is wound frame by frame, whereas the entire length of the pulled out film is rewound into the cartridge). Accordingly, a conventional drive mechanism for winding and rewinding the film by driving of the motor is such that a torque acting in one rotating direction of the single electric motor is transmitted to the fork in the cartridge chamber and a torque acting in the opposite rotating direction thereof is transmitted to the take-up spool in the film take-up chamber by means of a planetary transmission switching mechanism.

In recent years, film cartridges in accordance with the APS (hereinafter, APS film cartridge) have been standardized and commercialization of cameras which use such films have been promoted.

The APS film cartridge is provided with a light blocking lid at a film outlet of a cartridge and a film is completely contained in the cartridge as disclosed in, e.g. U.S. Pat. No. 5,347,334. Accordingly, the cartridge functions not only as a container for an unexposed film, but also as a container for a developed film.

Further, a bar code plate which enables the detection of the type of a contained film (unexposed film, exposed film, incompletely exposed film, etc.) is integrally rotatably provided at one end of the spool. Type of the film is detectable by reading a bar code on the bar code plate. Accordingly, a proper photo-processing can be applied in accordance with the type of the contained film independently of which type of a film cartridge is loaded in the camera.

Furthermore, the APS film cartridge is smaller than the conventional 35 mm film cartridge (the radial and longitudinal dimensions of the container or cartridge are reduced by about 4 mm, and an image recording area of the film is reduced by about 40%), contributing to downsizing the camera main body.

Since the film is completely contained in the cartridge in the APS film cartridge as described above, the APS film cartridge needs to be loaded by automatically pulling the film out of the cartridge after opening the light blocking lid when it is loaded in the camera. On the other hand, when the APS film cartridge is taken out of the camera, the light blocking lid needs to be closed after the pulled out film is completely rewound into the cartridge. For example, as compared with a 135 type roll film, a more complicated film feeding control is necessary for the APS film cartridge. Therefore, in the camera which uses the APS film cartridge, the motor-driving is essential for the film feed control and driving is necessary not only to wind and rewind the film, but also to load the film and open/close the light blocking lid which are not necessary with the conventional films.

Also, in the case where there is provided a lockable cover for closing the cartridge chamber for accommodating the film cartridge, it is desirable to automatically release a cover lock and open the cartridge cover.

In the camera using the conventional 135 type roll film, since the rewinding fork and the take-up spool are not controllably driven in connection with each other, winding/rewinding can be done by switching the rotating direction of the single electric motor. Accordingly, it is possible to facilitate the drive control. In the camera using the APS film cartridge, the rewinding fork and the take-up spool needs to be simultaneously controllably driven for loading of the film after defining a specified relationship between them and a new drive mechanism is necessary to open and close the light blocking lid. However, if special motors are separately provided to drive the respective members such as the rewinding fork, the take-up spool, and the light blocking lid, there are required more elements for the construction of the camera and a complicated drive control for the respective motors. This is against a downsizing tendency of the APS film cartridge and is not necessarily effective.

SUMMARY OF THE INVENTION

It is an object of the present invention to provide a camera mountable with an APS film cartridge which has overcome the problems residing in the prior art.

It is another object of the present invention to provide a camera mountable with an APS film cartridge which can perform feeding to a film of an APS film cartridge in a reduced size.

It is still another object of the present invention to provide a camera mountable with an APS film cartridge which can automatically open and close a light blocking lid of an APS film cartridge and release a cartridge cover.

It is yet still object of the present invention to provide an operating method which can ensure easier handling of a camera mountable with an APS film cartridge.

According to one aspect of the present invention, a camera comprising: a cartridge chamber which accommodates a film cartridge containing a film, the film cartridge being provided with a spool; a fork provided in the cartridge chamber and engageable with the spool provided in the film cartridge; a film take-up chamber provided with a take-up spool for taking up the film; a driver which generates a driving force; a transmission mechanism which transmits the driving force from the driver to the take-up spool and the fork, the transmission mechanism having a first transmission route of transmitting the driving force to the take-up spool to wind the film and a second transmission route of transmitting the driving force to the fork to rewind the film; and a changer which changes over the first and second transmission routes, the changer being positioned near the fork. The transmission mechanism may be provided with a driver gear wheel attached on the driver; a fork gear wheel attached on the fork; a transmission gear wheel partially overlapping the fork gearwheel; a first gear device including a first sun gear wheel meshed with the driver gear wheel and the transmission gear wheel, and a first planetary gear wheel meshed with the first sun gear wheel and meshable with the fork gear wheel; a second gear device including a second sun gear wheel operatively connected with the take-up spool, and a second planetary gear wheel meshed with the second sun gear wheel and meshable with the transmission gear wheel. The changer may be provided with a cam rotatable about an axis of the transmission gear wheel, the cam being formed with specified guide surfaces on a circumference thereof; a first contact member attached on the first planetary gear wheel and operable to come into contact with a specified guide surface of the cam to regulate a relative position of the first planetary gear wheel to the fork gear wheel; and a second contact member attached on the second planetary gear wheel and operable to come into contact with a specified guide surface of the cam to regulate a relative position of the second planetary gear wheel to the transmission gear wheel.

The cam may be connected with the transmission gear wheel by way of an one-way clutch, whereby the cam is driven by the driver.

According to another aspect of the present invention, a camera comprising: a cartridge chamber which accommodates a film cartridge containing a film, the film cartridge being provided with a spool; a fork provided in the cartridge chamber and engageable with the spool provided in the film cartridge; a film take-up chamber provided with a take-up spool for taking up the film; a driver which generates a driving force; a transmission mechanism which transmits the driving force from the driver to the take-up spool and the fork, the transmission mechanism having a first transmission route of transmitting the driving force to the take-up spool to wind the film, a second transmission route of transmitting the driving force to the fork to rewind the film, and a third transmission route of transmitting the driving force to the take-up spool and the fork to load the film; and a changer which changes over the first, second, and third transmission routes. The transmission mechanism may be provided with a driver gear wheel attached on the driver; a fork gear wheel attached on the fork; a transmission gear wheel; a first gear device including a first sun gear wheel meshed with the driver gear wheel and the transmission gear wheel, and a first planetary gear wheel meshed with the first sun gear wheel and meshable with the fork gear wheel; a second gear device including a second sun gear wheel operatively connected with the take-up spool, and a second planetary gear wheel meshed with the second sun gear wheel and meshable with the transmission gear wheel; a third gear device including a third planetary gear wheel meshed with the second sun gear wheel and meshable with the fork gear wheel. The changer may be provided with a cam rotatable about an axis of the transmission gear wheel, the cam being formed with specified guide surfaces on a circumference thereof; a first contact member attached on the first planetary gear wheel and operable to come into contact with a specified guide surface of the cam to regulate a relative position of the first planetary gear wheel to the fork gear wheel; a second contact member attached on the second planetary gear wheel and operable to come into contact with a specified guide surface of the cam to regulate a relative position of the second planetary gear wheel to the transmission gear wheel; and a third contact member attached on the third planetary gear wheel and operable to come into contact with a specified guide surface of the cam to regulate a relative position of the third planetary gear wheel to the fork gear wheel.

According to still another aspect of the present invention, a camera mountable with a film cartridge containing a film and having a light blocking lid rotatable about a vertical axis to open and close the film cartridge, comprising: a cartridge chamber which accommodates the film cartridge; an engaging member which is rotatably provided in the cartridge chamber and engageable with the light blocking lid when the film cartridge is placed in the cartridge chamber; and an actuator which actuates the engaging member to open and close the light blocking lid. The actuator may be provided with a motor which generates a driving force; a crank member driven by the motor; and a link member which operatively connects the crank member with the engaging member.

Further, it may be preferable to provide a transmission mechanism which transmits a driving force of the motor to the crank member, a take-up spool for winding the film, and a fork for rewinding the film to produce a first transmission route of transmitting the driving force to the crank member to actuate the engaging member, a second transmission route of transmitting the driving force to the take-up spool to wind the film, and a third transmission route of transmitting the driving force to the fork to rewind the film, and a changer which changes over the first, second, and third transmission routes. Furthermore, it may be preferable to provide the transmission mechanism with a fourth transmission route of transmitting the driving force to the take-up spool and the fork to load the film.

According to yet still aspect of the present invention, a camera comprising: a cartridge chamber which accommodates a film cartridge containing a film; a cover which openably closes the cartridge chamber; a locking mechanism which locks the cover in a closing state of closing the cartridge; and a releasing device which releases the locking of the cover in the closing state.

The locking mechanism may be constructed by: a pivotal member pivotable about a specified axis, and having on one end a locking portion engageable with the cover to lock the cover in the closing state and on the other end a contact portion; a biasing member which urges the pivotal member in a locking direction that the locking portion engages with the cover. The releasing device may be constructed by: a motor which generates a driving force; a crank member driven by the motor; an unlocking member which is operable to come into contact with the contact portion of the pivotal member to rotate the pivotal member in a direction opposite to the locking direction; a link member which operatively connects the crank member with the unlocking member.

It may be preferable to provide a transmission mechanism which transmits a driving force from the motor to the crank member, the take-up spool, and the fork, the transmission mechanism having a first transmission route of transmitting the driving force to the crank member to actuate the unlocking member, a second transmission route of transmitting the driving force to the take-up spool to wind the film, and a third transmission route of transmitting the driving force to the fork to rewind the film, and a changer which changes over the first, second, and third transmission routes.

According to further aspect of the present invention, a camera mountable with a film cartridge containing a film and having a light blocking lid rotatable about a vertical axis to open and close the film cartridge, comprising: a cartridge chamber which accommodates the film cartridge; an engaging member which is rotatably provided in the cartridge chamber and engageable with the light blocking lid when the film cartridge is placed in the cartridge chamber; a cover which openably closes the cartridge chamber; a pivotal member pivotable about a specified axis, and having on one end a locking portion engageable with the cover to lock the cover in the closing state and on the other end a contact portion; a biasing member which urges the pivotal member in a locking direction that the locking portion engages with the cover; a motor which generates a driving force; a crank member driven by the motor; an unlocking member which is operable to come into contact with the contact portion of the pivotal member to rotate the pivotal member in a direction opposite to the locking direction; and a link member which operatively connects the crank member with the engaging member and the unlocking member.

According to still further aspect of the present invention, a method for opening and closing a light blocking lid provided on a film cartridge containing a film, the method comprising the steps of: permitting an engaging member rotatably provided in a cartridge chamber for accommodating the film cartridge to engage with the light blocking lid when the film cartridge is placed in the cartridge chamber; driving a motor to generate a driving force when the light blocking lid is required to be opened and closed; and transmitting the driving force to the engaging member by a way of a crank member and a link member operatively connecting the crank member with the engaging member to actuate the light blocking lid.

According to yet still further aspect of the present invention, a method for locking and unlocking a cover of a cartridge chamber for accommodating a film cartridge, the method comprising the steps of: permitting a pivotal member to engage with the cover to lock the cover in a closing position when a film cartridge is placed in the cartridge chamber; keeping the pivotal member to engage with the cover by a biasing member; driving a motor to generate a driving force when the locking of the cover is required to be released; and transmitting the driving force to a unlocking member operable to come into contact with the pivotal member by a way of a crank member and a link member operatively connecting the crank member with the unlocking member.

These and other objects, features and advantages of the present invention will become more apparent upon a reading of the following detailed description and accompanying drawings.

BRIEF DESCRIPTION OF THE DRAWINGS

FIGS. 26A to 26F are diagrams showing the movement of a crank lever, a lid opening key and an unlock lever in the lid opening/closing mode, wherein FIG. 26A shows a state where the lid opening key is in its open position (standby position), FIG. 26B shows a state where the position switch of the lid opening key is started by the crank lever, FIG. 26C shows an intermediate state between the open position and close position of the lid opening key, FIG. 26D shows a state immediately before the crank lever comes into contact with the unlock lever, FIG. 26E shows a state after the completion of an unlocking operation by the crank lever, and FIG. 26F shows a state where the lid opening key is in its close position (standby position);

FIG. 34 is a diagram showing the cartridge loaded into the cartridge chamber by action of gravity;

FIGS. 44A to 44C are diagrams showing an locking operation of the second embodiment, wherein FIG. 44A shows a locked state, FIG. 44B shows a state upon the completion of an unlocking operation, and FIG. 44C shows a state where the locking mechanism is held unlocked.

DETAILED DESCRIPTION OF THE PREFERRED EMBODIMENTS OF THE INVENTION

A cartridge self-loading type camera according to the invention is described with reference to the accompanying drawings.

First, an APS film cartridge used for this camera is briefly described.

Figure 1:
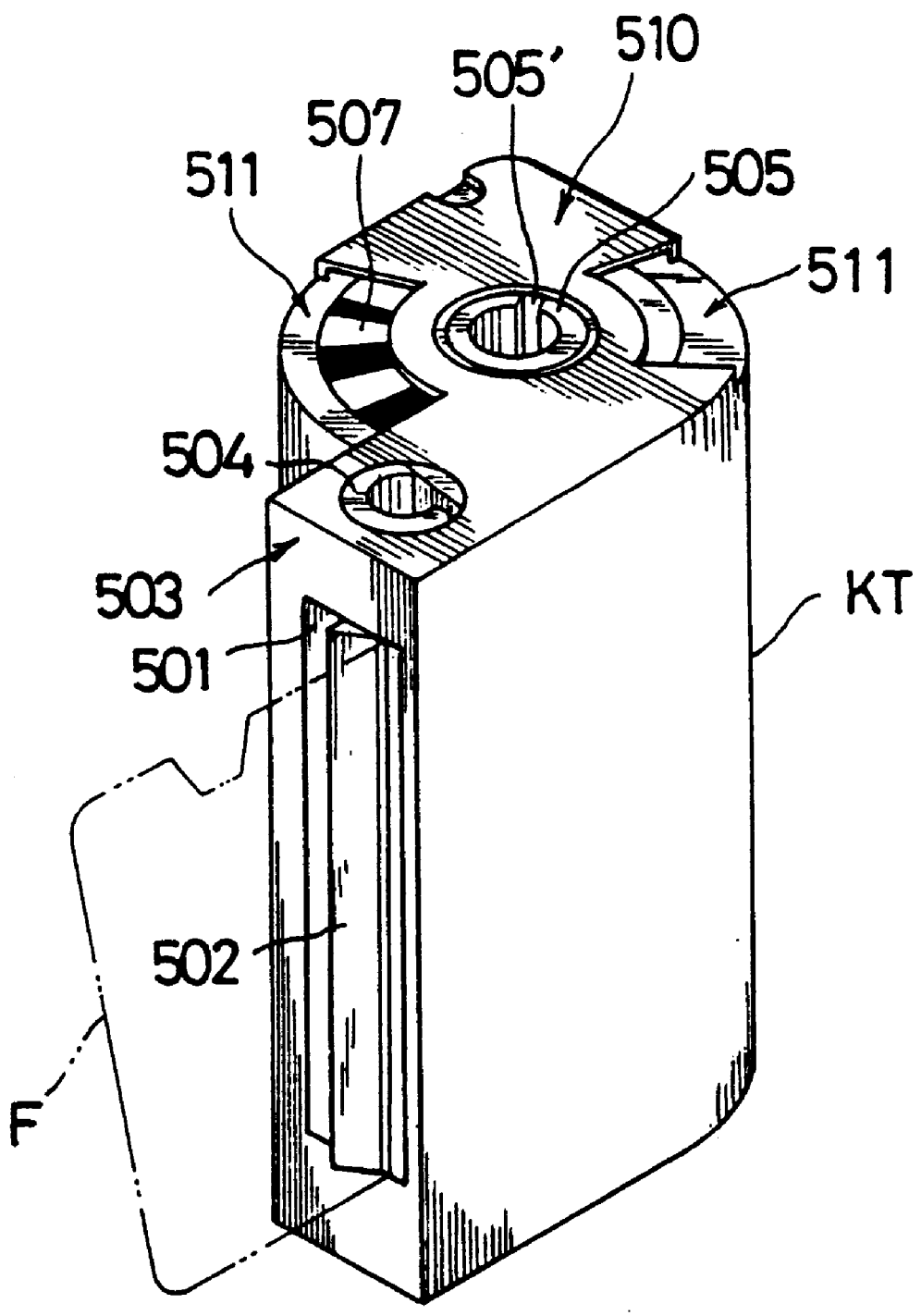
FIG. 1 is a perspective view of an APS film cartridge when viewed from above.
Figure 2:
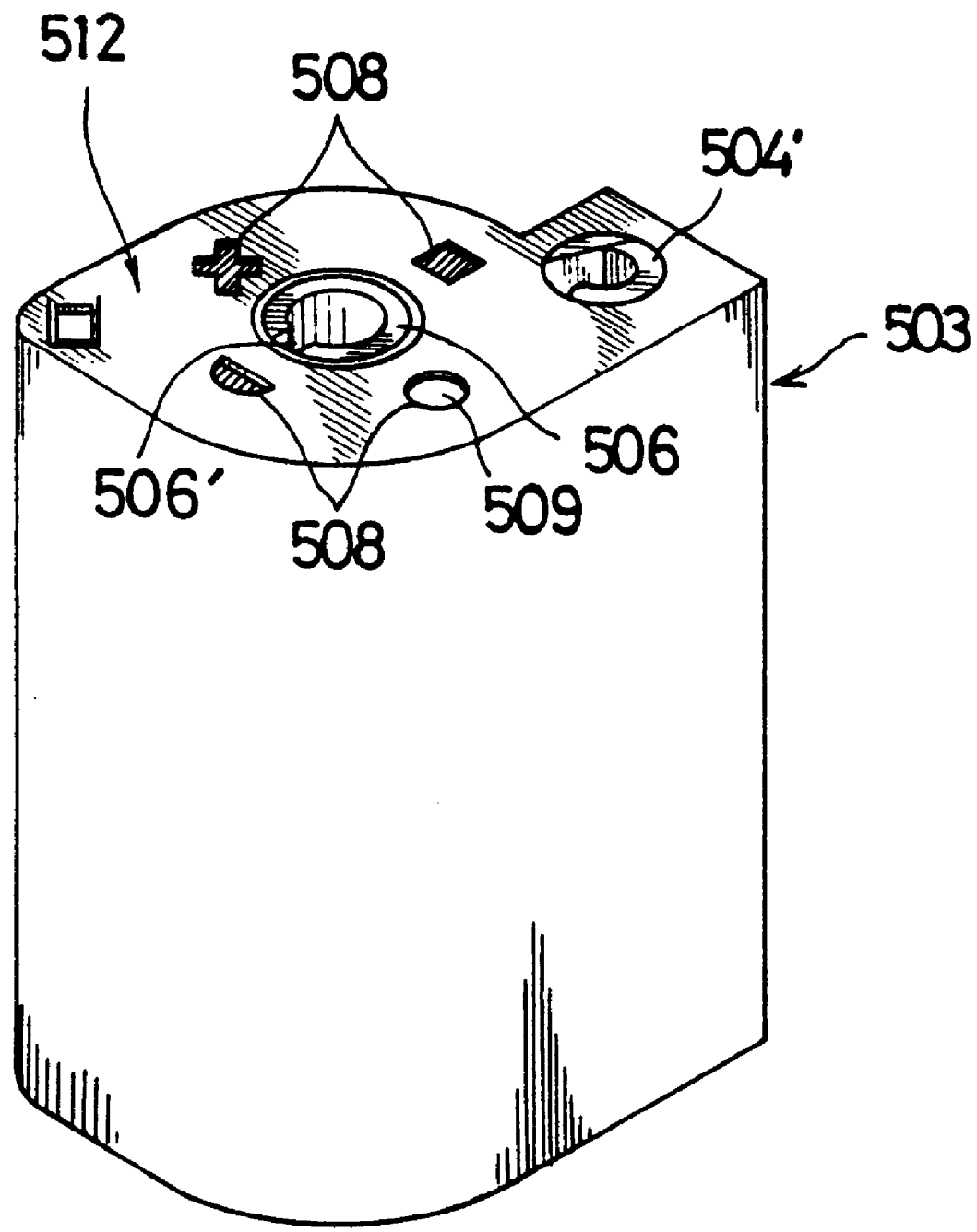
FIG. 2 is a perspective view of the APS film cartridge when viewed from below.

FIGS. 1 and 2 are perspective views showing the APS film cartridge when viewed from above and from below, respectively.

The APS film cartridge includes a cartridge KT provided with a light blocking lid 502 at a film outlet 501, so that a film F can be completely contained in the cartridge KT. Accordingly, the camera using the APS film cartridge is provided with a so-called self-loading mechanism for, when the ASP film cartridge is set, pulling the film F out of the cartridge KT and winding it around a take-up spool, and feeding the film F to bring the first frame to an image recording position so as to enable a photographing operation.

The cartridge KT has a cylindrical shape, and a film outlet portion 503 projects at a side surface thereof in parallel with its axis. The film outlet 501 is provided at the leading end face of the film outlet portion 503.

The light blocking lid 502 is rotatable or pivotal, and is openable and closable by inserting a lid opening key of a specified shape into a key hole 504 which opens in an upper surface 510 and a lower surface 512 of the cartridge KT and is formed at an leading end portion of the film outlet portion 503 and by rotating the inserted key. As described later, a cartridge chamber of the camera is provided with the lid opening key used to open and close the light blocking lid 502. When the cartridge KT is contained in the cartridge chamber, the lid opening key is fitted into the key hole 504, and the light blocking lid 502 is unlocked by a specified slanting surface of the lid opening key 502 and opened by rotating it.

Spools 505, 506 used to wind and rewind the film F are rotatably provided at the axial centers of the upper and lower surfaces 510, 512 of the cartridge KT. To the spool 505 at the upper surface 510 is rotatably fixed a code plate 507 on which pieces of information concerning the film F contained in the cartridge KT (number of exposures, ISO sensitivity, color/black-and-white, negative/positive, etc., hereafter, referred to as a film information) are recorded. To the spool 506 at the lower surface 512 is rotatably fixed a white indicator 509 provided with four marks 508 perforated around the spool 506 which are indicative of an information concerning the type of the film F (unexposed film, exposed film, partially exposed film, developed film, etc.). The spools 505, 506 are provided at the opposite ends of a spool shaft provided at the axial center of a cartridge chamber of the cartridge KT so as to be integrally rotatable.

Notches 511 are formed in specified peripheral positions of the upper surface 510 of the cartridge KT, and a bar code on the code plate 507 is readable through the notches 511. In a position of the cartridge chamber of the camera facing the notch 511, there is provided a photoreflector (not shown). When the cartridge KT is contained in the cartridge chamber, the bar code on the code plate 507 is read by the photoreflector so as to discriminate the type of the film F contained the cartridge KT.

On the other hand, the marks 508 perforated in the lower surface 512 of the cartridge KT enables a camera operator to visually confirm the type of the film F contained in the cartridge KT. When any one of the marks 508 is located at the indicator, it turns to white to indicate the type of the film F. It should be noted that "○" indicates an unexposed film, "x" an exposed film, "□" a developed film, and "D" a partially exposed film. The code plate 507 and the indicator 509 rotate together with the spool 505. Since a relative position of the indicator 509 and a reference edge of the bar code on the code plate 507 is specified with respect to a key groove 505' formed in the spool 505, the type of the film F can be discriminated by rotating the spool 505 and reading the position of the bar code when the film F is loaded.

Figure 3:
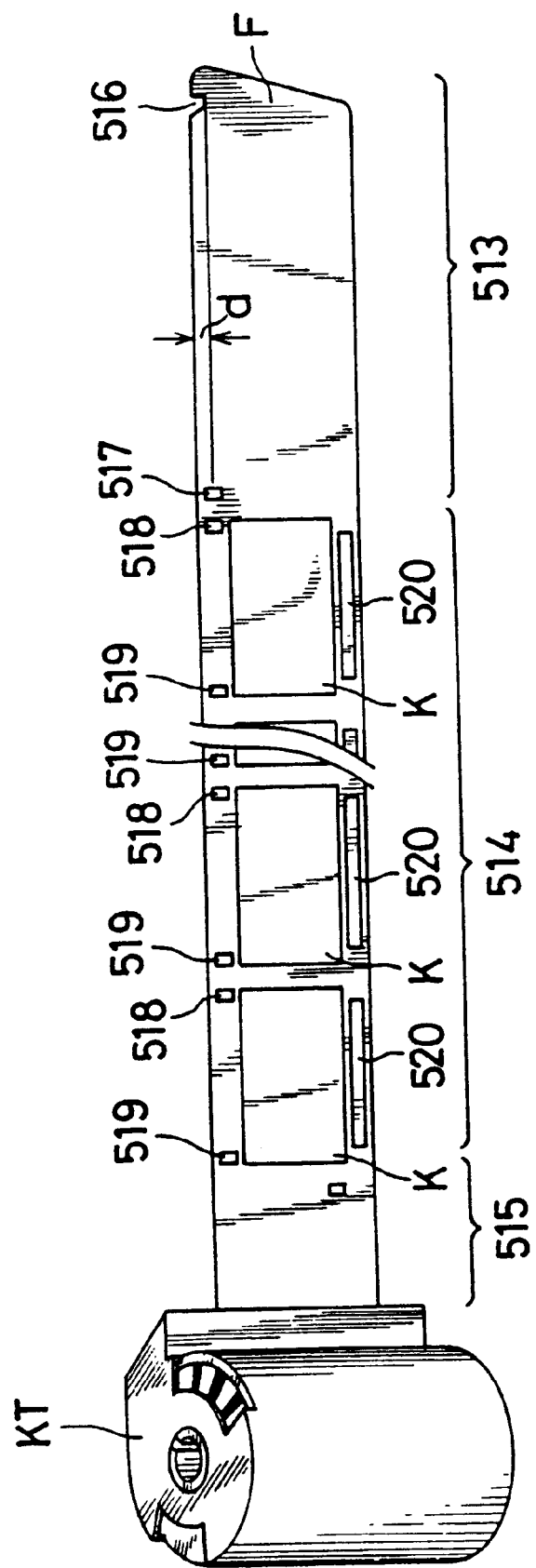
FIG. 3 is a diagram showing a configuration of an APS film.

FIG. 3 is a diagram showing the configuration of the ASP film cartridge.

The film F contained in the cartridge KT has three areas: a leader portion 513, an exposure portion 514 and an end portion 515 in this order from its leading end. The leader portion 513 is used to pull the film F out of the cartridge KT. The exposure portion 514 is an area where a specified number of photographed images are recorded at specified intervals. The end portion 515 is an unexposed area provided at a rear end of the film F to pull the exposure portion 514 by a distance longer than a specified distance from the cartridge KT.

It should be appreciated that the longitudinal and widthwise directions of the film F are referred to as horizontal and vertical directions, respectively in order to simplify the description below.

A notch 516 is formed in a specified position of a leading end of a left edge (upper edge in FIG. 3) of the film F with respect to its pull-out direction. Further, a plurality of rectangular holes (hereinafter, "perforations" 517 to 519 are formed along the left edge. The perforation 517 is indicative of a rear end of the leader portion 513 and is formed in a specified position of a rear end of the leader portion 513. The perforations 518, 519 are formed in specified positions of front and rear ends of each frame K to indicate front and rear end positions of an exposure area of each frame K.

Magnetic recording portions 520 are provided in positions corresponding to the respective frames K at a right edge (lower edge in FIG. 3) of the film F. Pieces of information concerning an image recorded in each frame K including a date of photographing, framing (vertically framed/horizontally framed), an exposure control value, and magnification are recordable on the magnetic recording portion 520.

Figure 4:
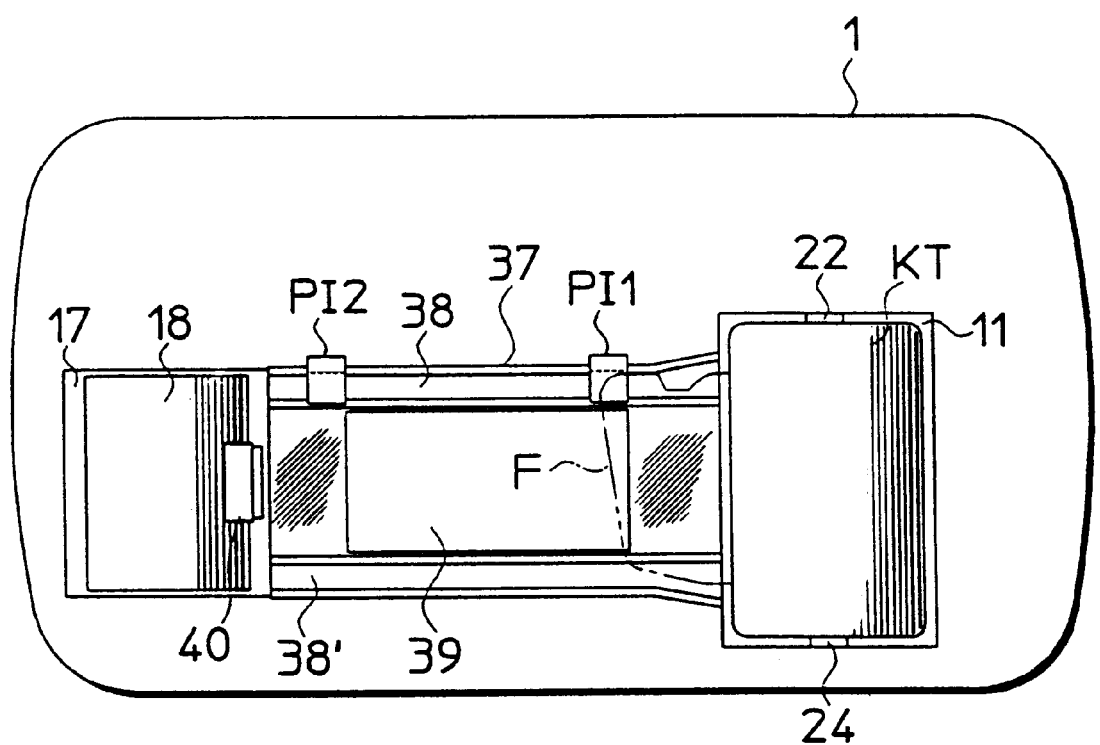
FIG. 4 is a diagram showing a positional relationship of a cartridge chamber, an exposure frame and a film take-up chamber provided in a camera main body.

The notch 516 and the perforations 517 to 519 are detected by photointerrupters PI1, PI2 provided at an upper guide member 38 for guiding the film F being fed as shown in FIG. 4, and a feed control such as loading, winding or rewinding is performed in accordance with the detection signal.

FIG. 4 is a diagram showing a positional relationship of a cartridge chamber 11, an exposure frame 37, and a film take-up chamber 17 provided in a camera main body 1 when the camera is viewed from behind.

When viewed from behind, the cartridge chamber 11 is provided at a right side of the camera main body 1, the film take-up chamber 17 is provided at a left side of the camera main body 1, and the exposure frame 37 is provided between the cartridge chamber 11 and the film take-up chamber 17. The exposure frame 37 is a horizontally long frame provided with an exposure aperture 39 of substantially the same size as the exposure area of each frame K in a position corresponding to an optic axis of a taking lens provided substantially in the middle of the camera main body 1. At the upper and lower sides of the exposure frame 37 are provided guide members 38, 38' for guiding the film F pulled out of the cartridge KT. At the upper guide member 38, the photointerrupters PI1, PI2 are provided in positions facing the opposite left and right ends of the exposure aperture 39.

When the film F pulled out of the cartridge KT moves over the exposure frame 37, the notch 516 and the perforations 517 to 519 cross optical paths of the photointerrupters PI1, PI2, thereby being detected.

Figure 5:
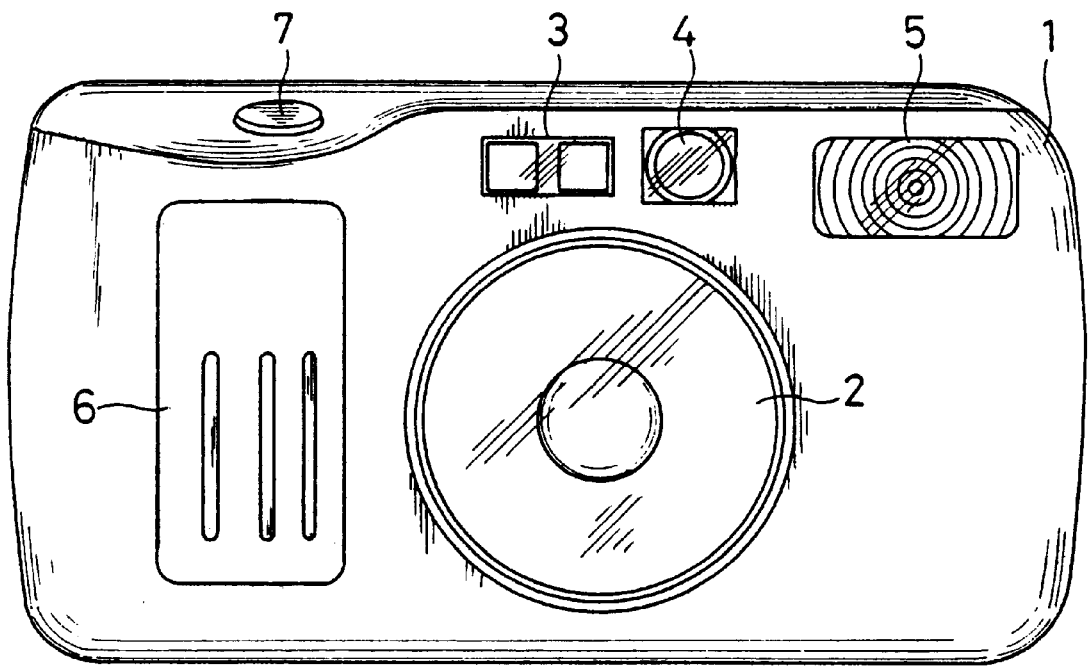
FIG. 5 is a front view showing an external configuration of a cartridge self-loading type camera according to the invention.
Figure 6:
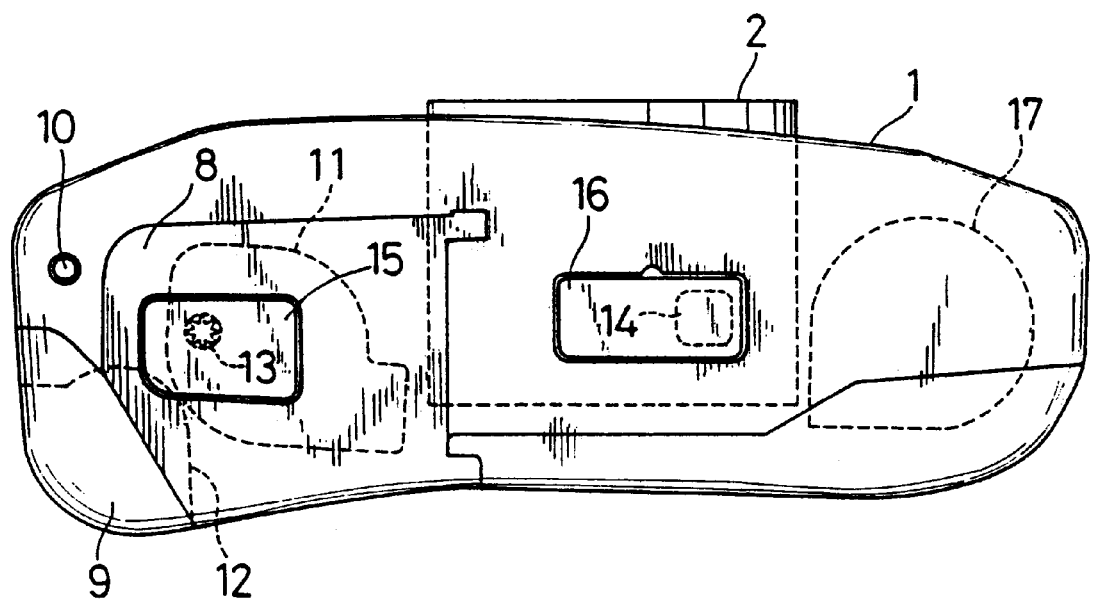
FIG. 6 is a bottom view showing an external configuration of the cartridge self-loading type camera.

FIGS. 5 and 6 are front and bottom views showing the external configuration of the camera according to the invention.

A taking lens system 2 is provided substantially in the middle of the front surface of the camera main body 1, and an AF distance measuring device 3 and a viewfinder system 4 are provided above the taking lens system 2. Further, there are provided a built-in flash 5 at an upper right end portion of the front surface of the camera main body 1; a grip 6 at a left end portion of the front surface thereof; and a release button 7 in a position above the grip 6.

A battery chamber 12 and the cartridge chamber 11 are provided in the left side part of the camera main body 1. A battery as power source is contained in the battery chamber 12 by removing a detachable battery cover 9 provided at a left end of the camera main body 1, and the cartridge KT is contained in the cartridge chamber 11 by opening a cartridge cover 8 openably provided at a cartridge loading opening 43 (see FIG. 7) at the bottom surface of the camera main body 1 (see FIG. 6).

In the camera according to the invention, a drive for the film feed such as loading, winding and rewinding and drives for opening and closing the light blocking lid 502 and unlocking the cartridge cover 8 are performed by a torque of a single motor. The reason why the cartridge cover 8 is also unlocked by means of the torque of the motor is to prevent an erroneous ejection of the cartridge KT while the film F is pulled out of the cartridge KT. For this purpose, a series of operations including the rewinding of the film F into the cartridge KT and the unlocking of the cartridge cover 8 are automatically controlled at the camera side. Accordingly, an unlocking button 10 for instructing the unlocking of the cartridge cover 8 is provided in a specified position of the bottom surface of the camera main body 1.

Further, a round hole 13 used to externally drive a fork 24 (see FIG. 7) fitted to the lower spool 506 of the cartridge KT is formed in a specified position of the outer surface (the surface exposed to the outside) of the cartridge cover 8, and a rectangular hole 14 used to disengage gear wheels of a second torque transmission mechanism 200 (see FIG. 7) including a gear wheel train to be described later is formed in a specified middle position of the bottom surface of the camera main body 1.

The round hole 13 and the rectangular hole 14 are openings used to completely rewind the film F into the cartridge KT by externally rotating the fork 24 when the motor drive causes an abnormality in the film feeding system while the film F is pulled out of the cartridge KT. These holes 13, 14 are covered by sheet members 15, 16, respectively so as to be normally invisible from outside. How the fork 24 is externally driven in the case of an abnormality is described later.

Figures 7, 8:
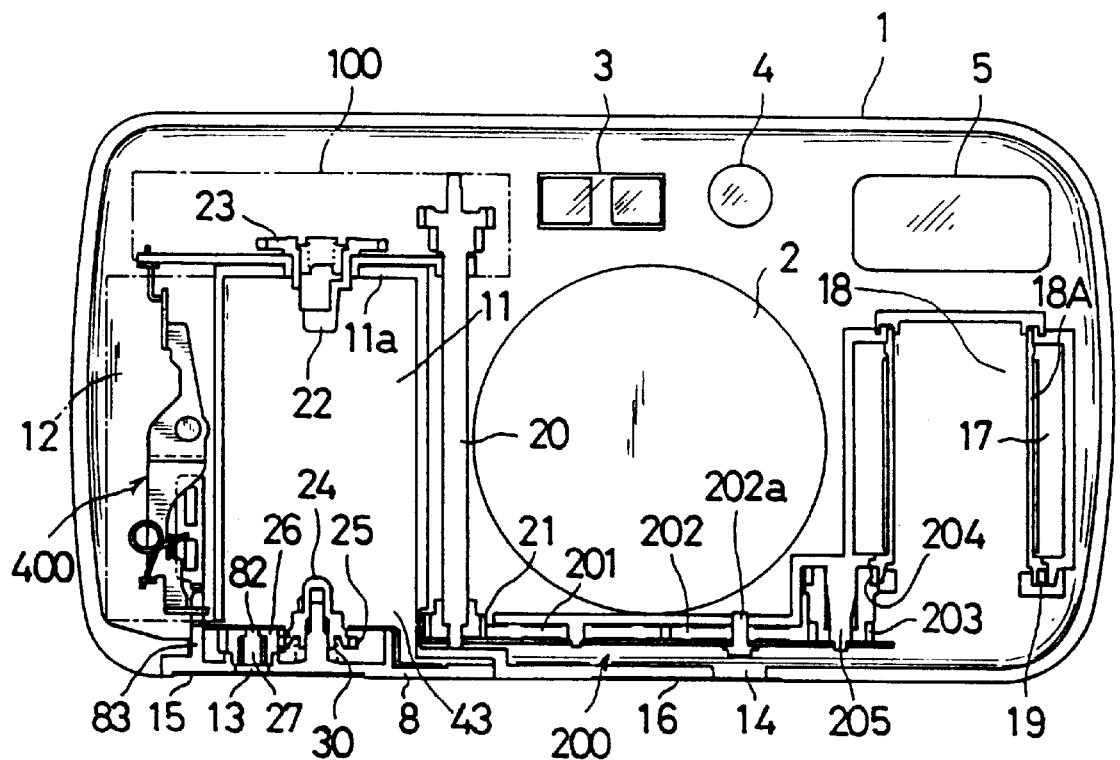
FIG. 7 is a vertical section schematically showing an essential portion of an internal construction of the cartridge self-loading type camera.
FIG. 8 is a horizontal section schematically showing an essential portion of the internal construction of the cartridge self-loading type camera.

FIGS. 7 and 8 are vertical and horizontal sections schematically showing an essential portion of the internal construction of the camera according to the invention when viewed from the front and when viewed from the above of the camera, respectively.

Inside the camera main body 1, the battery chamber 12 and the cartridge chamber 11 are arranged at the left side of the taking lens system 2 when viewed from the front of the camera, and the cylindrical film take-up chamber 17 is arranged at the right side thereof.

Figure 9:
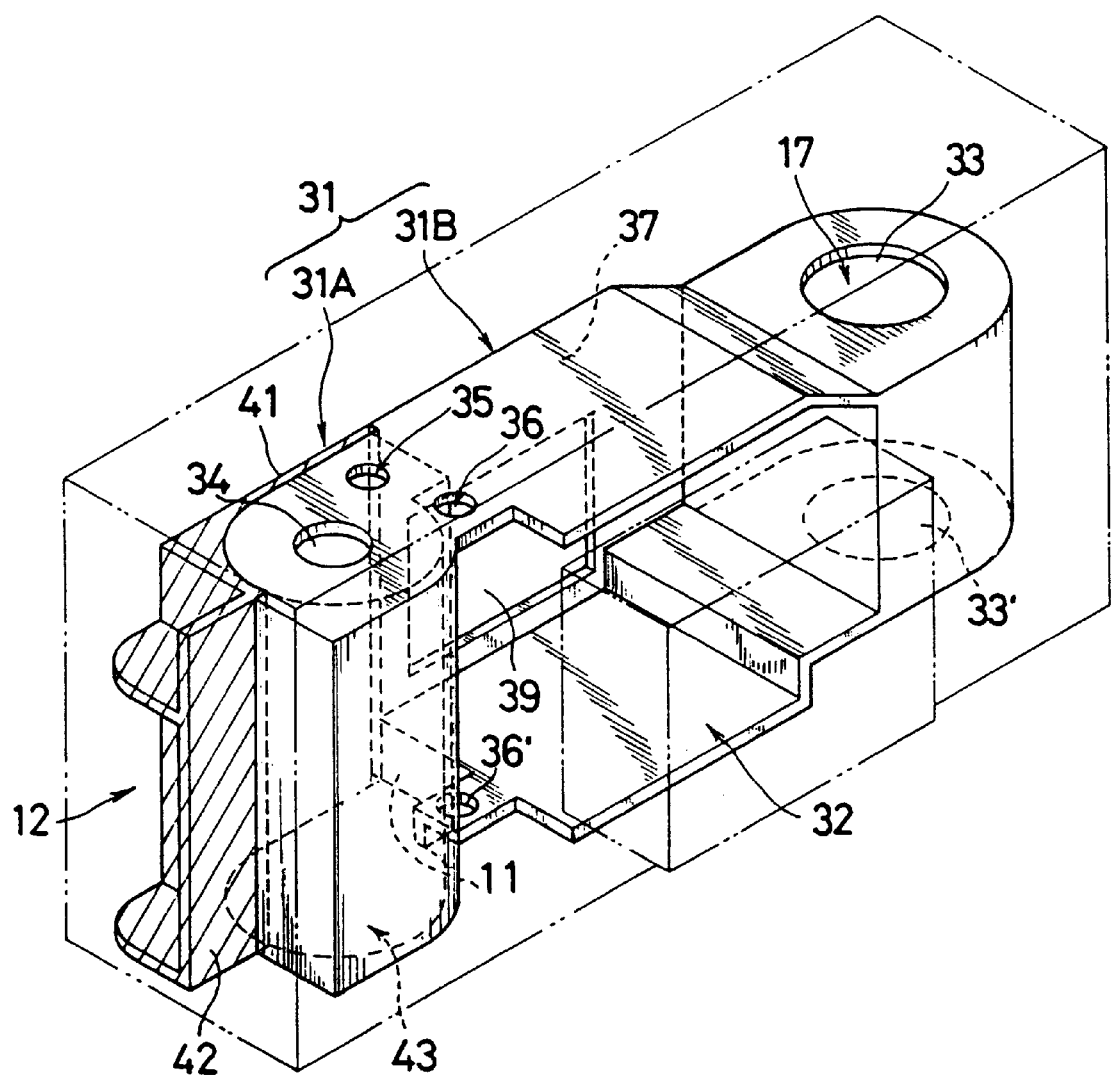
FIG. 9 is a perspective view showing a basic configuration of a housing for constructing the cartridge chamber, a taking lens and the film take-up chamber.

The battery chamber 12, the cartridge chamber 11 and the film take-up chamber 17 are integrally or unitarily formed by a housing 31 shown in FIG. 9. The taking lens system 2 is accommodated in a recess 32 of the housing 31 connecting the cartridge chamber 11 and the film take-up chamber 17, and a take-up spool 18 is rotatably arranged by being inserted into round holes 33, 33' formed in positions on the axial center of the film take-up chamber 17. On the outer surface of the take-up spool 18 is provided a friction member 18A for fixing the film F by action of a frictional force.

The housing 31 includes a first housing member 31A (a hatched member in FIGS. 8 and 9) forming the rear side walls of the battery chamber 12 and the cartridge chamber 11, and a second housing member 31B forming the cartridge chamber 11, the recess 32 for the taking lens system 2 and the film take-up chamber 17. The cartridge chamber 11 is formed by combining the first and second housings members 31A, 31B.

The housing 31 is divided into the first and second housing members 31A, 31B to facilitate assembling in consideration of the necessity to provide an ejecting mechanism 300 in the cartridge chamber 11. As described later, the first housing member 31A is integrally or unitarily provided with the ejecting mechanism 300 for the cartridge KT and a locking mechanism 400 for the cartridge cover 8. In other words, the ejecting mechanism 300 and the locking mechanism 400 are integrated into the first housing member 31A. The construction and operation of the ejecting mechanism 300 and the locking mechanism 400 are described in detail later.

In FIG. 9, a fork 22 is rotatably fitted into a round hole 34 from above the second housing member 31B, and the lid opening key for the light blocking lid 502 is rotatably fitted into a round hole 35 from above the second housing 31B. A transmission shaft 20 to be described later is arranged by being inserted into round holes 36, 36'.

In FIG. 8, the battery chamber 12 is provided at a right end portion of a rear part of the camera when viewed from above the camera, and the cartridge chamber 11 is provided in a position obliquely before the battery chamber 12.

Where the battery chamber 12 and the cartridge chamber 11 are arranged, the locking mechanism 400 for the cartridge cover 8, a drive motor M used to feed the film F, and a drive motor used to drive the taking lens system 2 (not shown) are provided. Above the cartridge chamber 11, there is provided a first torque transmission mechanism 100 for transmitting a torque of the drive motor M to the fork 22, the take-up spool 18 and the like to rotate the spool 505 of the cartridge KT.

The locking mechanism 400 is adapted to lock the cartridge cover 8 by fitting an engaging claw 412 of a lock lever 407 into an engaging hole 84 of an engagement portion 83 projecting from the cartridge cover 8 when the cartridge cover 8 is rotated to its close position where it closes the cartridge loading opening 43. The locking mechanism 400 is described in detail later.

The cartridge chamber 11 has substantially the same inner shape as the outer shape of the cartridge KT. The fork 22 is rotatably fitted into the spool 505 in a position of an end surface 11a of the cartridge 11 opposite from the cartridge loading opening 43 (hereinafter, "upper surface 11a"). A fork gear wheel 23 is provided at a base end of the fork 22. The torque of the drive motor M is transmitted to the first torque transmission mechanism 100 to pull the film F out of the cartridge KT during the winding and loading of the film F.

On the other hand, a fork gear wheel 25 is provided at a base end of the fork 24 provided at the cartridge cover 8. A gear wheel 26 formed with a gear wheel-shaped key slot 27 in its face facing the round hole 13 is in mesh with the fork gear wheel 25. The gear wheel 26 is used for the external drive of the film F at the time of occurrence of abnormality in the film feeding system. An unillustrated gear wheel of specified shape is fitted into the key slot 27 through the round hole 13 and is rotated manually or via a motor to rotate the fork 24.

Figure 10:
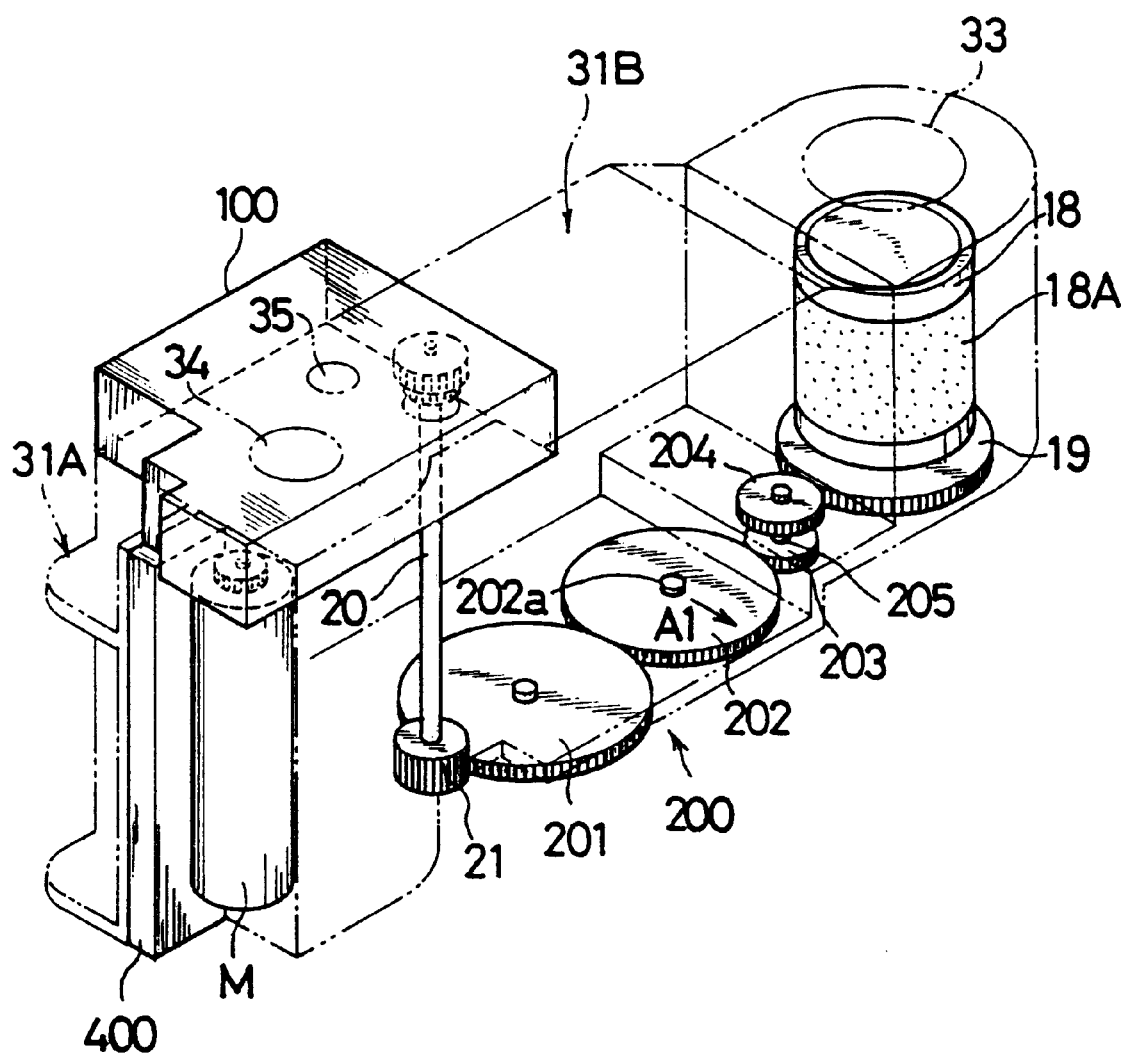
FIG. 10 is a perspective view showing a basic configuration of a drive system of a film feeding system of the camera.
Figure 11:
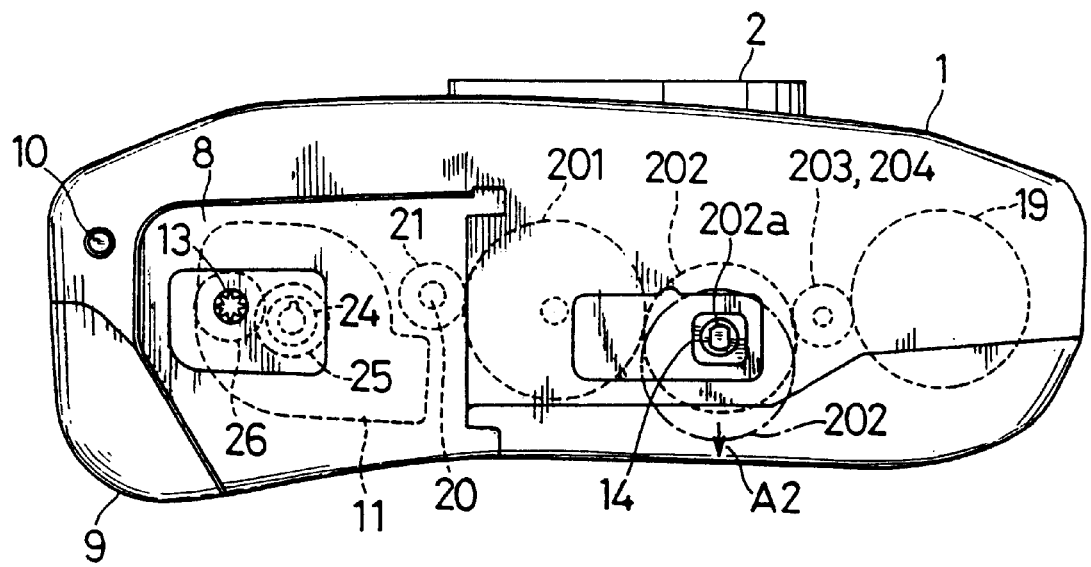
FIG. 11 is a bottom view of the camera showing a first method for disengaging gear wheels of a second torque transmission mechanism.

As shown in FIG. 10, the first and second torque transmission mechanisms 100, 200 are connected with the transmission shaft 20 provided upright in parallel with the center axis of the cartridge chamber 11. The torque of the drive motor M is transmitted to the second torque transmission mechanism 200 via the first torque transmission mechanism 100 and the transmission shaft 20.

The transmission shaft 20 is arranged in a clearance between a side wall of the cartridge chamber 11 corresponding to the film outlet 501 and the barrel of the taking lens system 2 (see FIG. 8). By arranging the transmission shaft 20 in a position where it is covered by the cartridge cover 8 as shown in FIG. 7, the connection of the first and second torque transmission mechanisms 100, 200 can be easily realized, effectively utilizing the already existing clearance, and a torque transmission path of the torque transmission assembly including the first torque transmission mechanism 100, the transmission shaft 20 and the second torque transmission mechanism 200 can be maximally shortened along the widthwise direction of the camera, thereby shortening the widthwise dimension of the camera main body.

The second torque transmission mechanism 200 includes three gear wheels 201, 202 and 203 in mesh with each other, and a gear wheel 204 which is rotatably mounted on a shaft 205 of the gear wheel 203 together with the gear wheel 203 and is in mesh with a spool gear wheel 19 provided at a base end of the take-up spool 18.

A gear wheel 21 secured to the bottom end of the transmission shaft 20 is in mesh with the gear wheel 201. A torque transmitted from the first torque transmission mechanism 100 via the transmission shaft 20 is transmitted further to the take-up spool 18 via the second torque transmission mechanism 200 including a gear wheel train of the gear wheels 201 to 204 and the spool gear wheel 19.

A rotatable shaft 202a of the gear wheel 202 is slightly movable along forward and backward directions (along a direction of arrow A1 in FIG. 10) of the camera. When an abnormality occurs in the film feeding system while the film F is pulled out of the cartridge KT, the sheet members 15, 16 are removed to expose the round hole 13 and the rectangular hole 14. The rotatable shaft 202a of the gear wheel 202 is moved from the rectangular hole 14 along a direction of arrow A2 to disengage the gear wheel 202 from the gear wheels 201 and 203. Thereafter, by externally driving the fork 24 through the round hole 13 in this state, the film F can be completely rewound into the cartridge KT.

If the shaft 202a is not movable along the forward and backward directions, but withdrawable, the shaft 202a may be withdrawn through the rectangular hole 14 and displaced along the forward or backward direction to disengage the gear wheel 201 from the gear wheel 202 or to disengage the gear wheel 202 from the gear wheel 203.

Figure 12:
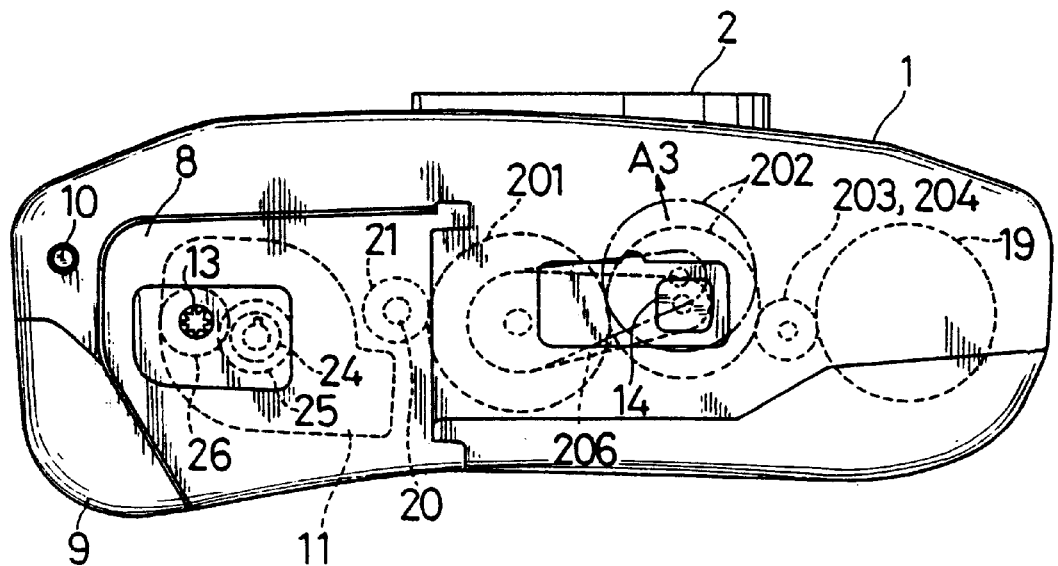
FIG. 12 is a bottom view of the camera showing a second method for disengaging gear wheels of the second torque transmission mechanism.
Figure 13:
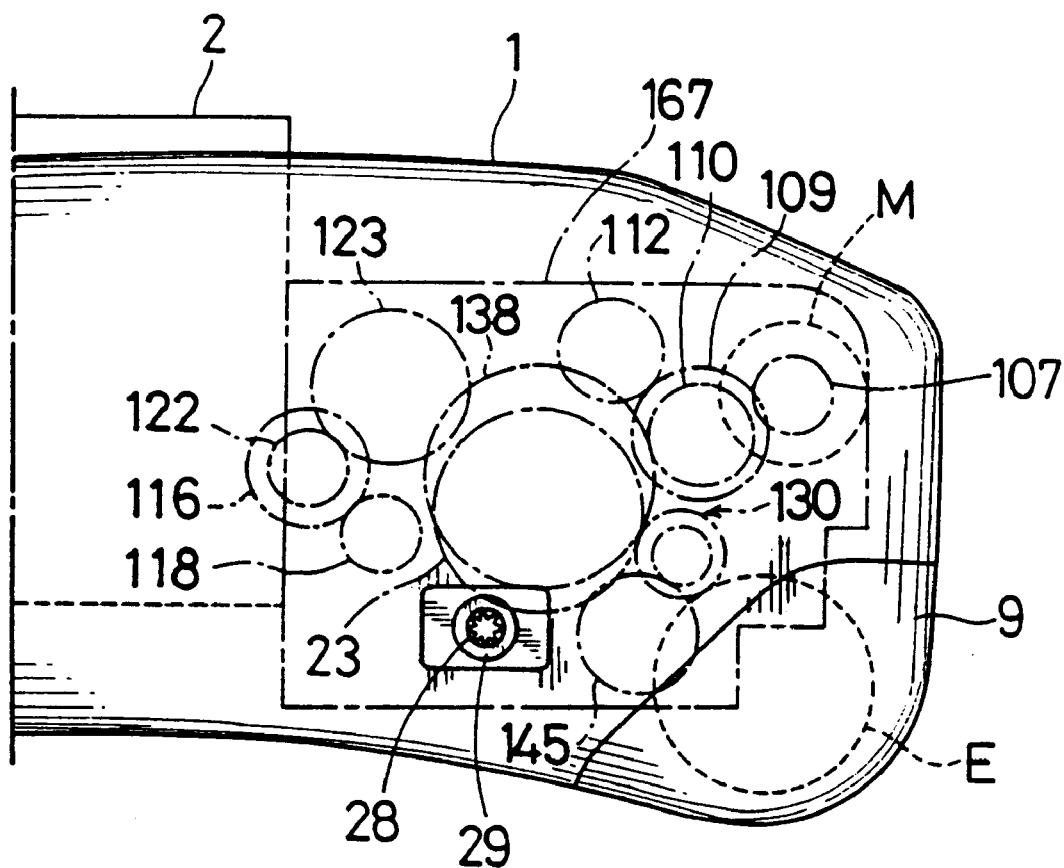
FIG. 13 is a plan view showing an essential portion of a construction of a first torque transmission mechanism which enables the external driving of a fork gear wheel.

As shown in FIG. 12, the gear wheel 202 may be constituted by a planetary gear wheel. In such a case, a carrier 206 may be rotated counterclockwise (a direction of arrow A3 in FIG. 12) from the rectangular hole 14 to disengage the gear wheel 202 from the gear wheel 203. Further, as shown in FIG. 13, the first torque transmission mechanism 100 may be provided with a gear wheel 28 for the external drive which is meshable with the fork gear wheel 23, and a round hole 29 corresponding to the round hole 13 may be formed in a specified position of the upper surface of the camera main body 1 so that the fork gear wheel 23 can be externally driven via the gear wheel 28 from the upper surface of the camera main body 1.

Although the round hole 13 and the rectangular hole 14 are provided with the sheet members 15, 16 in this embodiment, covers which openably cover the holes 13, 14 may, for example, be provided instead of the sheet members 15, 16.

Next, the first torque transmission mechanism 100 is described.

Figure 14:
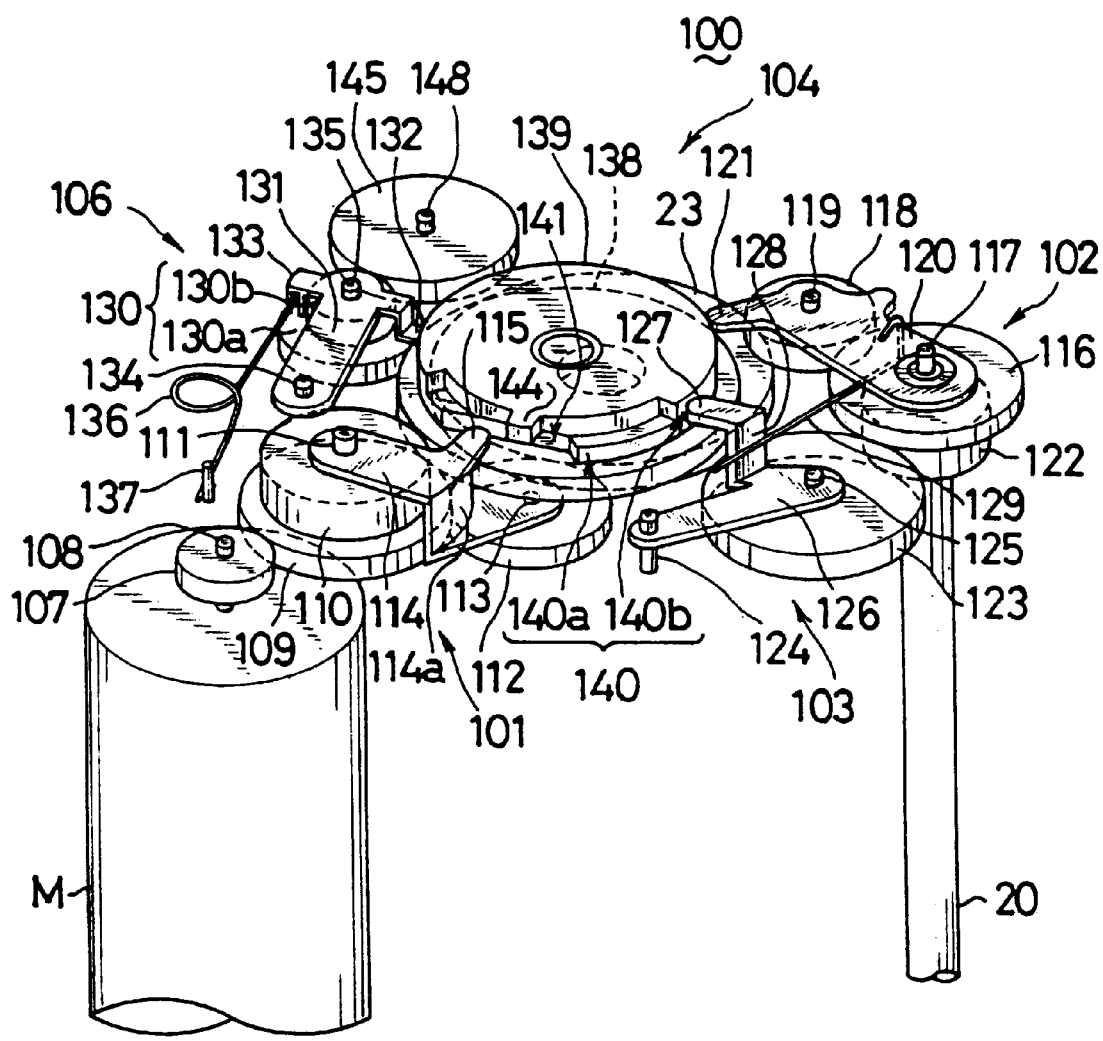
FIG. 14 is a perspective view of an essential portion of the construction of the first torque transmission mechanism viewed from the front of the camera.
Figure 15:
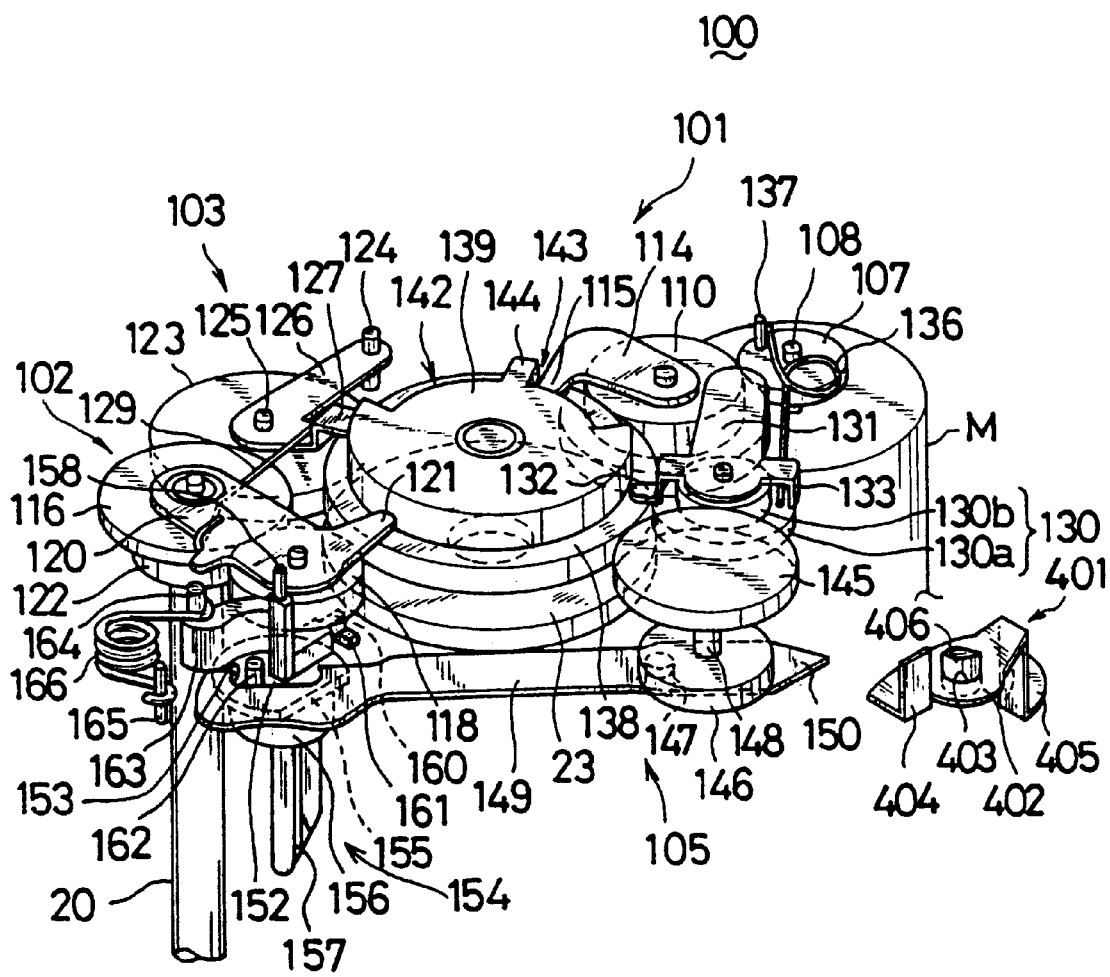
FIG. 15 is a perspective view of an essential portion of the construction of the first torque transmission mechanism viewed from the back of the camera.
Figure 16:
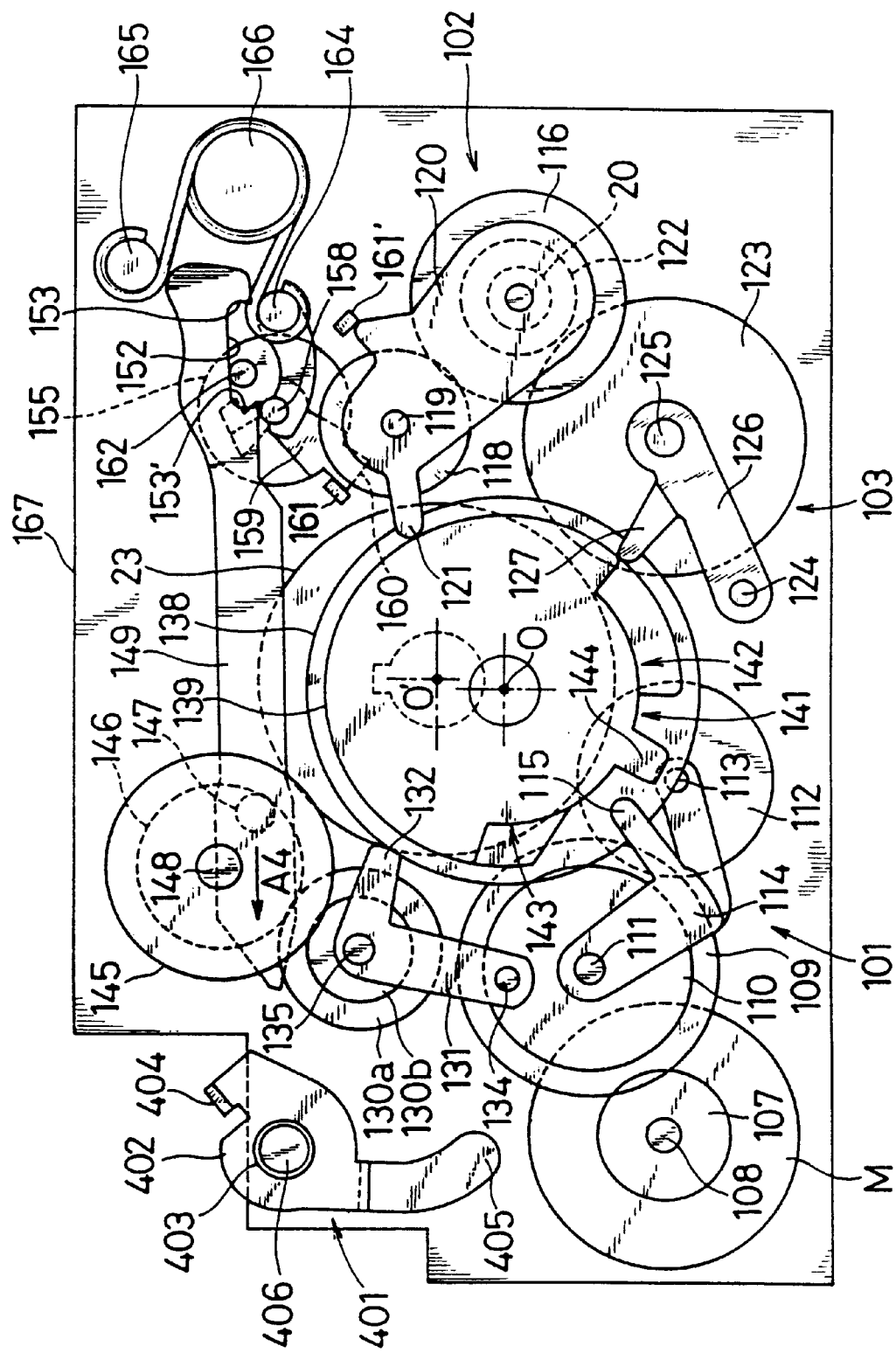
FIG. 16 is a plan view of an essential portion of the construction of the first torque transmission mechanism.

FIGS. 14 to 16 show the construction of the first transmission mechanism 100. FIGS. 14 to 16 are perspective views showing an essential portion of the construction when viewed from the front of the camera, when viewed from the back of the camera, and when viewed from the above of the camera. It should be appreciated that a mechanism for opening and closing the light blocking lid 502 and a mechanism for unlocking the cartridge cover 8 are omitted from FIG. 14.

The first torque transmission mechanism 100 is mainly provided with a first gear device 101 (hereinafter, "rewinding gear device 101"), a second gear device 102 (hereinafter, "winding gear device 102"), a third gear device 103 (hereinafter, "thrust gear device 103"), a cam mechanism 104, a crank mechanism 105 and a lid opening/closing gear device 106. The rewinding gear device 101 is adapted to rewind the film F by transmitting the torque of the drive motor M to the fork gear wheel 23. The winding gear device 102 is adapted to wind the film F during the film winding and the film loading by transmitting the torque of the drive motor M to the transmission shaft 20. The thrust gear device 103 is adapted to pull the film F out of the cartridge KT during the film loading by transmitting the torque of the drive motor M to the fork gear wheel 23. The cam mechanism 104 is adapted to switch a transmission direction of the torque of the drive motor M. The crank mechanism 105 is adapted to unlock the cartridge cover 8 and to open and close the light blocking lid 502 of the cartridge KT. The lid opening/closing gear device 106 is adapted to transmit the torque of the drive motor M to the crank mechanism 105.

Further, the respective members of first torque transmission mechanism 100 are arranged as a unit on a support plate 167.

The cam mechanism 104 controllably switches the engagement of the respective planetary gear wheels 112, 118, 123 and 130 of the gear devices 101, 102, 103 and 106 with corresponding specified gear wheels in accordance with a drive mode such as a film rewinding mode, a film winding mode, a film loading or a cartridge cover unlocking mode (hereinafter, "unlocking mode").

The cam mechanism 104 includes a transmission wheel 138 and a disk-shaped cam 139 having a slightly smaller diameter than the transmission gear wheel 138 and having two stepped cam surfaces 140 on its circumferential surface. The cam 139 is coupled with an unillustrated rotatable shaft provided in the center of the upper surface of the transmission gear wheel 138 via an one-way clutch. In this embodiment, the cam mechanism 104 is, as shown in FIG. 16, such that its center of rotation O is slightly displaced toward the front surface of the camera from a center of rotation O' of the fork gear wheel 23. However, the centers of rotation O, O' may coincide with each other.

The fork 22 extending through the support plate 167 is rotatably supported between the support plate 167 and an unillustrated second support plate arranged at an upper portion of the fork gear wheel 23. The cam mechanism 104 is arranged in a specified position of the upper surface of the second support plate.

When the transmission gear wheel 138 rotates clockwise when viewed from above the camera, the cam 139 rotates together with the transmission gear wheel 138, with the result that the cam surfaces rotate. When the transmission gear wheel rotates counterclockwise, the cam 139 idly rotates, with the result that the cam surfaces 140 are held in their set positions.

A control of switching the transmission direction of the torque of the drive motor M by the cam mechanism 104 is described in detail later.

The rewinding gear device 101 includes a sun gear wheel 109, a reduction gear wheel 110 coaxially provided on the upper surface of the sun gear wheel 109, a planetary gear wheel 112 in mesh with the sun gear wheel 109, and a carrier 114 rotatably coupled with a shaft 111 of the sun gear wheel 109 and a shaft 113 of the planetary gear wheel 112. In the film rewinding mode, the rewinding gear device 101 transmits the torque of the drive motor M to the fork gear wheel 23 via a motor gear wheel 107, the sun gear wheel 109 and the planetary gear wheel 112.

The rewinding gear device 101 is arranged around the transmission gear wheel 138 and between the transmission gear wheel 138 and the motor gear wheel 107 secured to a shaft 108 of the drive motor M (in a position obliquely below the transmission gear wheel 138 to the left in FIG. 16) with the sun gear wheel 109 and the reduction gear wheel 110 meshed with the motor gear wheel 107 and the transmission gear wheel 138, respectively.

The carrier 114 is V-shaped and has a bent portion 114a formed with a stepped portion with respect to its height. In a position of the upper stage of the bent portion 114a, a contact piece 115 which comes into contact with the cam surface 140a at the lower stage (hereinafter, "first cam surface 140a") projects toward the cam 139. The contact piece 115 restricts the rotation of the of the planetary gear wheel 112.

As shown in FIG. 14, the motor gear wheel 107, the sun gear wheel 109, the planetary gear wheel 112 and the fork gear wheel 23 are located at the same height. When a torque produced by the forward rotation of the drive motor M is transmitted to the rewinding gear device 101 via the motor gear wheel 107, the planetary gear wheel 112 revolves around the sun gear wheel 109 counterclockwise to be engaged with the fork gear wheel 23. However, since the contact piece 115 comes into contact with the first cam surface 140a of the cam 139, the counterclockwise rotation of the carrier 114 is restricted, with the result that the revolution of the planetary gear wheel 112 is restricted.

On the other hand, the first cam surface 140a is formed with a cam slot 141 in a specified circumferential position as described later. When the cam 139 is set in an area where the contact piece 115 faces the cam slot 141 (hereinafter, "film rewinding area"), the film rewinding mode is set as a drive mode (see FIG. 14).

Unless the set rotational position of the cam 139 (hereinafter, "cam position") is located in the film rewinding area, the counterclockwise rotation of the carrier 114 is restricted. Accordingly, the planetary gear wheel 112 and the fork gear wheel 23 are not engaged, and the torque of the drive motor M is not transmitted to the fork gear wheel 23. If the cam position is located in the film rewinding area, the carrier 114 is allowed to rotate counterclockwise, engaging the planetary gear wheel 112 and the fork gear wheel 23 to transmit the torque of the drive motor M to the fork gear wheel 23.

The winding gear device 102 is provided around and at the right side of the transmission gear wheel 138 when viewed from the front of the camera, whereas the thrust gear device 103 is provided in a position around the transmission gear wheel 138 and obliquely before the transmission gear wheel 138 to the right when viewed from the front of the camera (see FIG. 16).

The winding gear device 102 includes a sun gear wheel 116 secured to the transmission shaft 20, a planetary gear wheel 118 in mesh with the sun gear wheel 116, and a carrier 120 rotatably connected with a shaft 117 of the sun gear wheel 116 and a shaft 119 of the planetary gear wheel 118. In the film winding mode and the film loading mode, the winding gear device 102 transmits the torque of the drive motor M having transmitted to the transmission gear wheel 138 to the take-up spool 18 via the planetary gear wheel 118, the sun gear wheel 116, the transmission shaft 20 and the second torque transmission mechanism 200.

At an end of the carrier 120 toward the planetary gear wheel 118, there is formed a contact piece 121 which projects toward the cam 139 so as to come into contact with the cam surface 140b at the upper stage (hereinafter, "second cam surface 140b").

Further, the thrust gear device 103 includes a sun gear wheel 122 secured to the transmission shaft 20 below the sun gear wheel 116, a planetary gear wheel 123 in mesh with the sun gear wheel 122, a carrier 126 rotatably connected with a shaft 124 and a shaft 125 of the planetary gear wheel 123, and a torsion coil spring 129. The shaft 124 is a center of revolution of the planetary gear wheel 112 and is provided in a specified position between the planetary gear wheels 123 and 112.

The carrier 126 is formed, in a specified position of its side surface facing the cam 139, with an L-shaped contact piece 127 having, at its leading end, an upright portion 127a which is in contact with the first cam surface 140a. The torsion oil spring 129 biases the planetary gear wheels 118 and 123 toward the transmission gear wheel 138 and the fork gear wheel 23 and is mounted on the shaft 117 between the carrier 120 and the sun gear wheel 116. One end of the coil spring 129 is secured to a locking portion 128 formed in a specified position of the carrier 120, whereas the other end thereof is in pressing contact with the upright portion 127a of the contact piece 127 of the carrier 126.

Since the sun gear wheel 116 of the winding gear device 102 and the sun gear wheel 122 of the thrust gear device 103 are coaxially secured to the transmission shaft 20, the sun gear wheels 116, 122 are constituted by an integrally formed two speed gear wheel. Although the sun gear wheels 116, 122 are constituted by the two speed gear wheel in this embodiment, a single gear wheel may commonly be used as these sun gear wheels 116, 122.

By coaxially arranging the sun gear wheels 116, 122 of the gear devices 102, 103, the first torque transmission mechanism 100 can be made more compact.

More specifically, in the case that the sun gear wheels 122, 116 are not coaxially arranged, the torque of the drive motor M transmitted to the transmission gear wheel 138 needs to be transmitted to the sun gear wheel 122 of the thrust gear device 103 without going via the winding gear device 102. Further, since the rotating direction of the fork gear wheel 23 in the film loading mode is reverse of that in the film rewinding mode, at least one gear wheel needs to be provided between the transmission gear wheel 138 and the sun gear wheel 122 to transmit the torque having transmitted to the transmission gear wheel 138 to the sun gear wheel 122. Accordingly, the sun gear wheel 122 and this gear wheel need to be arranged in positions different from the position of the sun gear wheel 116. As a result, the gear wheel construction of the first torque transmission mechanism 100 becomes more complicated and large. Therefore, by coaxially arranging the sun gear wheels 116, 122 or constituting these gear wheels by a single gear wheel, the number of the gear wheels and the number of their arrangement positions can be greatly reduced.

The thrust gear device 103 transmits the torque of the drive motor M having transmitted to the transmission gear wheel 138 further to the take-up fork gear wheel 23 via the winding gear device 102, the sun gear wheel 122 and the planetary gear wheel 123.

The contact piece 121 restricts the revolution of the planetary gear wheel 118, whereas the contact piece 127 restricts the rotational movement of the planetary gear wheel 123 toward the fork gear wheel 23.

As shown in FIG. 14, the thrust gear device 103 is provided at the same height as the fork gear wheel 23, whereas the winding planetary gear wheel 102 is provided at the same height as the transmission gear wheel 138. Since counterclockwise rotational forces about the shafts 117, 124 are respectively applied to the carriers 120, 126 by the torsion coil spring 129, the planetary gear wheel 118 revolves counterclockwise around the sun gear wheel 116 so as to be meshable with the transmission gear wheel 138, and the planetary gear wheel 123 rotates counterclockwise about the shaft 124 while being meshed with the sun gear wheel 122 so as to be meshable with the fork gear wheel 23. However, since the contact pieces 121, 127 come into contact with the first and second cam surfaces 140a, 140b of the cam 139, respectively, the counterclockwise rotation of the carriers 120, 126 is restricted, with the result that revolution of the planetary gear wheel 118 and the rotation of the planetary gear wheel 123 toward the fork gear wheel 23 are restricted.

As described later, two cam slots 142, 143 are formed in the second cam surface 140b in specified positions along the same circumferential direction as the cam slot 141 is formed in the first cam surface 140a. When the cam position is set in an area where the contact piece 121 faces the cam slot 143 (hereinafter, "film winding area") or in an area where both contact pieces 121, 127 face the cam slot 142 (hereinafter, "film loading area"), the film winding mode or the film loading mode is set as a drive mode.

Unless the cam position is located in the film winding area or the film loading area, the counterclockwise rotation of the carrier 120 is restricted, deterring the engagement of the planetary gear wheel 118 and the transmission gear wheel 138. Accordingly, the torque of the drive motor M is not transmitted to the take-up spool 18. However, if the cam position is located in the film winding area or the film loading area, the carrier 120 is allowed to rotate counterclockwise. Accordingly, the planetary gear wheel 118 is allowed to be engaged with the transmission gear wheel 138, thereby transmitting the torque of the drive motor to the take-up spool 18.

On the other hand, if the cam position is not located in the film loading area, the rotation of the carrier 126 is restricted, deterring the engagement of the planetary gear wheel 123 and the fork gear wheel 23. Accordingly, the torque of the drive motor M is not transmitted to the fork gear wheel 23. If the cam position is located in the film loading area, the carrier 126 is allowed to rotate. Accordingly, the planetary gear wheel 123 is allowed to be engaged with the fork gear wheel 23, thereby transmitting the torque of the drive motor M to the fork gear wheel 23.

The crank mechanism 105 includes a strip-shaped crank lever 149, a disk-shaped crank plate 146 and a crank gear wheel 145, and is provided at a rear end portion of the first torque transmission mechanism 100.

The crank lever 149 is so provided as to be reciprocally movable along the widthwise direction of the camera main body 1. The forward movement (a movement toward the left as indicated by an arrow A4 in FIG. 16) of the crank lever 149 unlocks the cartridge cover 8 by rotating an unlock lever 401 rotatably provided at one widthwise end of the rear part of the first torque transmission mechanism 100 (upper left corner in FIG. 16). The reciprocal movement of the crank lever 149 also opens and closes the light blocking lid 502 by rotating a lid opening key 154 for opening and closing the light blocking lid 502 rotatably provided at the other widthwise end (upper right corner in FIG. 16) of the rear part of the first torque transmission mechanism 100.

The crank lever 149 is formed at its left end with a tapered contact portion 150, and at the front edge of its right end with a recess 152 which is long in the widthwise direction. Engaging portions 153, 153' are formed at ends of the recess 152. In a position of the support plate 167 facing the key hole 504 of the cartridge KT, the lid opening key 154 is so provided as to be rotatable between a position where it completely opens the light blocking lid 502 (hereinafter, "open position") and another position where it completely closes the light blocking lid 502 (hereinafter, "close position").

The lid opening key 154 is such as shown in FIG. 15. Specifically, a key portion 157 of specified shape to be fitted into the key hole 504 projects in the center of the lower surface of a disk-shaped base portion 156 which is formed with a jaw portion 155 on its upper surface, and a shaft 158 projects in the center of the upper surface of the jaw portion 155. A contact portion 159 radially extending from the shaft 158 projects in a specified position of the upper surface of the jaw portion 155, and a contact piece 160 projecting more outward than the outer surface of the jaw portion 155 is formed at the leading end of the contact portion 159 with respect to a radial direction. The contact piece 160 comes into contact with stoppers 161, 161' provided in specified positions of the support plate 167 so as to form a specified angle with respect to the shaft 158 (about 90° in FIG. 16), thereby restricting the rotatable range of the lid opening key 154 to a range defined by the open and close positions. It should be noted that the stoppers 161, 161' correspond to the open and close positions, respectively.

An engaging pin 162 engageable with the engaging portions 153, 153' of the crank lever 149 projects upward in a peripheral position of the upper surface of the jaw portion 155 opposite from the contact portion 159. Further, in an intermediate position of the shaft 158, an arm 163 radially projects in a curved manner. At an upper face of the leading end of the arm 163, a pin 164 projects in parallel with the shaft 158. The opposite ends of a torsion coil spring 166 are rotatably supported between the pin 164 and a pin 165 projecting in a specified position of the support plate 167. This spring 166 renders a rotational force to the lid opening key 154.

Accordingly, while the cartridge KT is loaded, the lid opening key 154 is held in a position (open position) where the contact portion 159 is in contact with the stopper 161 by the spring force of the coil spring 166.

On the other hand, upon the reciprocal movement of the crank lever 149 in a mode wherein the light blocking lid 502 is opened/closed and the cartridge cover 8 is unlocked (hereinafter, lid opening/closing mode), the engaging portion 153 comes into engagement with the engaging pin 162 of the lid opening key 154 to rotate the lid opening key 154 in the reverse direction to its close position. As a result, the light blocking lid 502 is closed. When the crank lever 149 moves from its standby position by a longer distance than specified, the spring force of the coil spring 166 acts to render a counterclockwise rotational force to the lid opening key 154, with the result that the light blocking lid 154 is securely kept in its close position.

After the light blocking lid 502 is completely closed, the contact portion 150 comes into contact with a contact portion 404 of the unlock lever 401 by the movement of the crank lever 149, thereby rotating the unlock lever 401 counterclockwise about a shaft 406. As a result, the locking mechanism 400 for locking the cartridge cover 8 is unlocked.

The closing of the light blocking lid 502 and the unlocking of the locking mechanism 400 for the cartridge cover 8 when the cartridge KT is taken out of the cartridge chamber 11 are described in detail later.

The crank gear wheel 145 and the crank plate 146 are secured to upper and lower ends of a shaft 148 rotatably supported through an unillustrated second support plate so that the crank plate 146 rotates together with the crank gear wheel 145. Further, a crank pin 147 projects downward in a peripheral position of the lower surface of the crank plate 146, and is loosely fitted in a round hole 151 formed in a specified left end position of the crank lever 149. When the crank gear wheel 145 rotates, the crank plate 146 rotates together therewith. As a result, the crank pin 147 rotates about the shaft 148 to move the crank lever 149 along the widthwise direction.

The lid opening/closing gear device 106 includes a planetary gear wheel 130 formed by a two speed gear wheel, a carrier 131 for rotatably supporting the planetary gear wheel 130 about a shaft 134 and a torsion coil spring 136 for applying a biasing force to the carrier 131 to rotate it clockwise. In the lid opening/closing mode, the gear device 106 transmits the torque of the drive motor M having transmitted to the transmission gear wheel 138 further to the crank gear wheel 145 via the planetary gear wheel 130.

The lid opening/closing gear device 106 is arranged at the left side of the transmission gear wheel 138 when viewed from the front such that an upper gear wheel 130b of the planetary gear wheel 130 (hereinafter, "second planetary gear wheel 130b") is in mesh with the crank gear wheel 145 (see FIG. 16).

The carrier 131 is rotatably supported on the shaft 134 and a shaft 135 of the planetary gear wheel 130. In a specified position of a side surface of the carrier 131 facing the cam 139, an L-shaped contact piece 132 which is bent downward so that its leading end comes into contact with the first cam surface 140a of the cam 139. Further, a locking portion 133 is formed in a specified position of a side surface of the carrier 131 opposite from the side surface facing the cam 139. One end of the torsion coil spring 136 is secured to the locking portion 133 while the other end thereof is secured to a pin 137 provided on the second support plate.

The contact piece 132 acts to restrict the rotation of the planetary gear wheel 130 about the shaft 134 toward the transmission gear wheel 138. As shown in FIG. 15, since the planetary gear wheel 130 is arranged in such a position that the lower gear wheel thereof (hereinafter, "first planetary gear wheel 130a") is located at the same height as the transmission gear wheel 138 and the coil spring 136 renders a rotational force to the carrier 131 so as to rotate the carrier 131 clockwise about the shaft 134, the planetary gear wheel 130 rotates about the shaft 134 so as to be meshable with the transmission gear wheel 138. However, since the contact piece 132 comes into contact with the first cam surface 140a of the cam 139, the clockwise rotation of the carrier 131 is restricted, with the result that the rotation of the planetary gear wheel 130 toward the transmission gear wheel 138 is restricted.

Accordingly, unless the cam position is located in an area where the contact piece 132 faces the cam slot 141 of the first cam surface 140a (hereinafter, "lid opening/closing area"), the clockwise rotation of the carrier 131 is restricted, deterring the engagement of the planetary gear wheel 130 and the transmission gear wheel 138. As a result, the torque of the drive motor M is not transmitted to the crank gear wheel 145. If the cam position is located in the lid opening/closing area, the carrier 131 is allowed to rotate to engage the first planetary gear wheel 130a with the transmission gear wheel 138. As a result, the torque of the drive motor M is transmitted to the crank gear wheel 145 via the planetary gear wheel 130.

Next, a control for the transmission of the torque of the drive motor M in the first torque transmission mechanism 100 is described.

Figure 17:
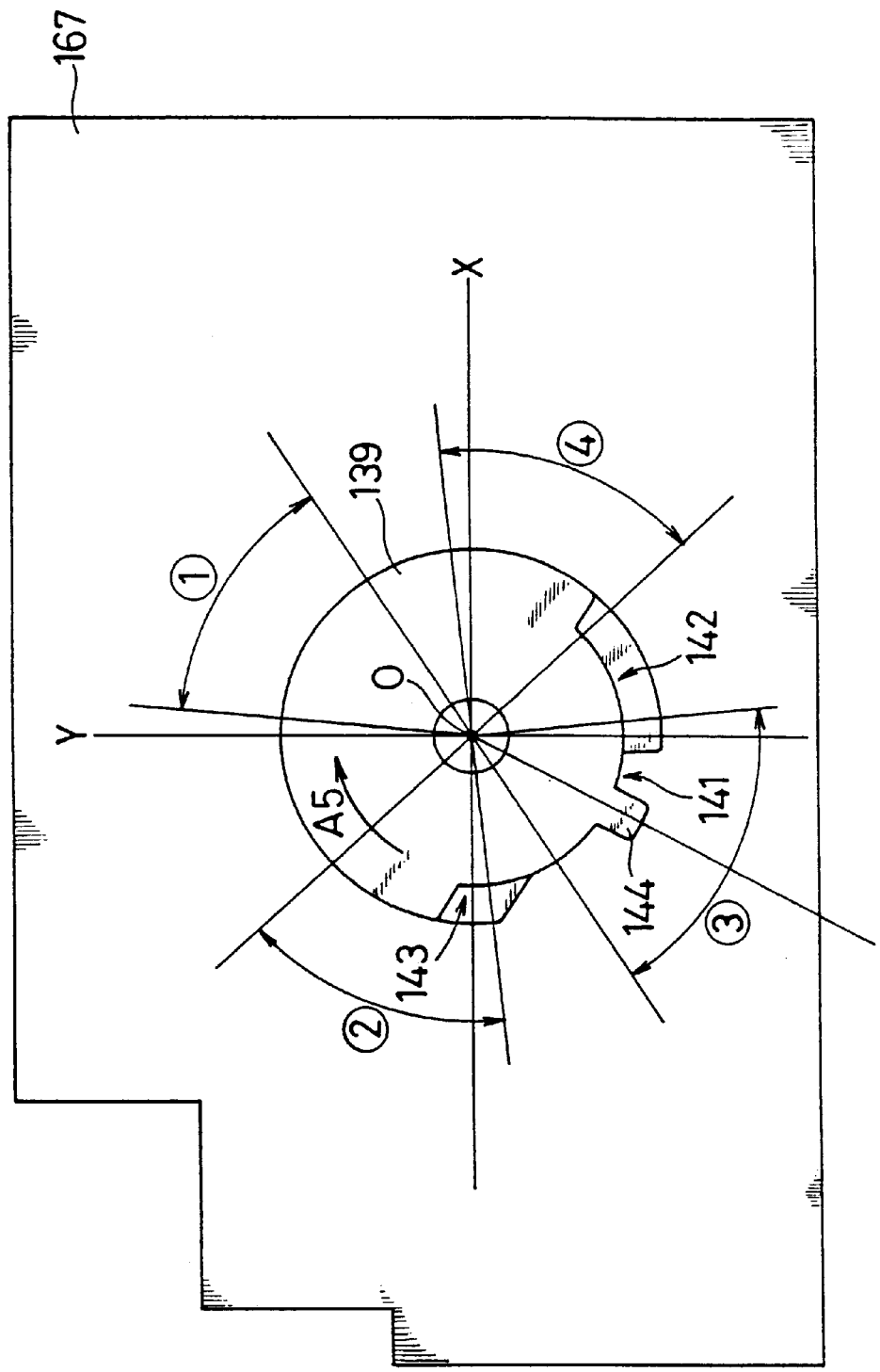
FIG. 17 is a diagram showing a relationship between rotational position ranges of a cam and a film rewinding area, a film winding area, a loading area, a lid opening/closing area.

FIG. 17 is a diagram showing a relationship between rotational position ranges of the cam 139 and the film rewinding area, the film winding area, the film loading area, the lid opening/closing area.

In FIG. 17, X, Y axes define orthogonal coordinate systems set at the center of rotation O of the cam 139 so as to be parallel with the optic axis of the taking lens system 2. Angle areas ① to ④ are rotational position ranges of the cam 139 corresponding to the film winding area, the lid opening/closing area, the film rewinding area and the film loading area, respectively. As is clear from FIG. 17, the angle areas ① to ④ corresponding to the areas of the respective drive modes are separately defined in first to fourth quadrants, respectively. This is done in view of reliability in switching the torque transmission.

If the reference of rotation of the cam 139 is assumed to be a projected portion 144 partitioning the cam slots 142, 143 formed in the second cam surface 140b, the transmission direction of the torque of the drive motor M can be switched by controlling the angle of the cam 139 so that the projected portion 144 is located in the angle areas ① to ④. It should be noted that a direction of arrow A5 in FIG. 17 is a rotating direction of the cam 139 for the switching of the cam position.

Figure 18:
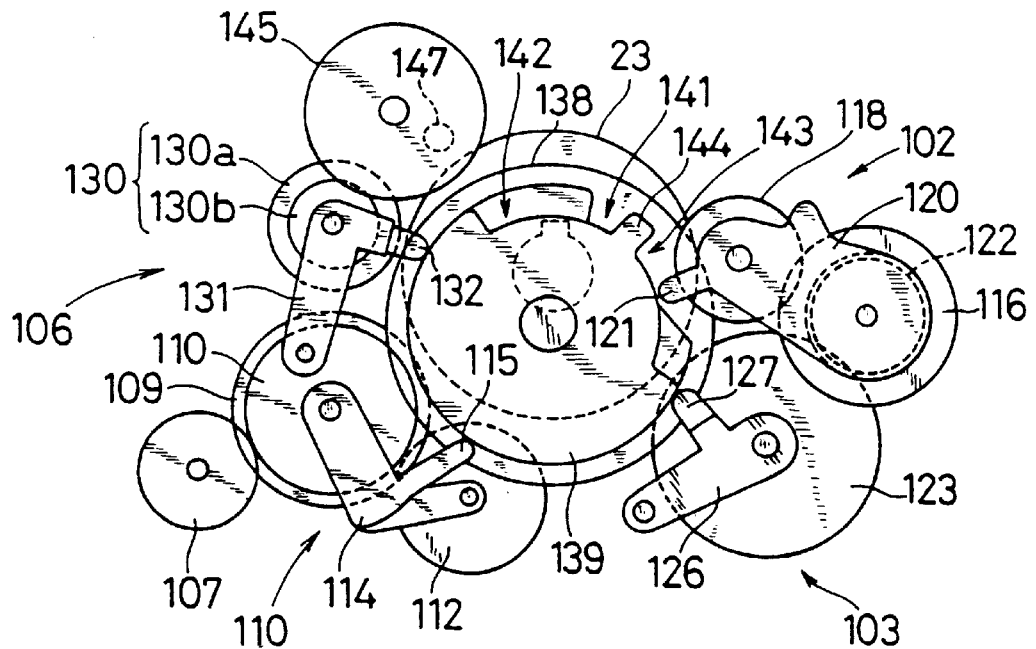
FIG. 18 is a diagram showing contact positions of the respective contact pieces with cam surfaces when the cam is set in the film winding area.
Figure 19:
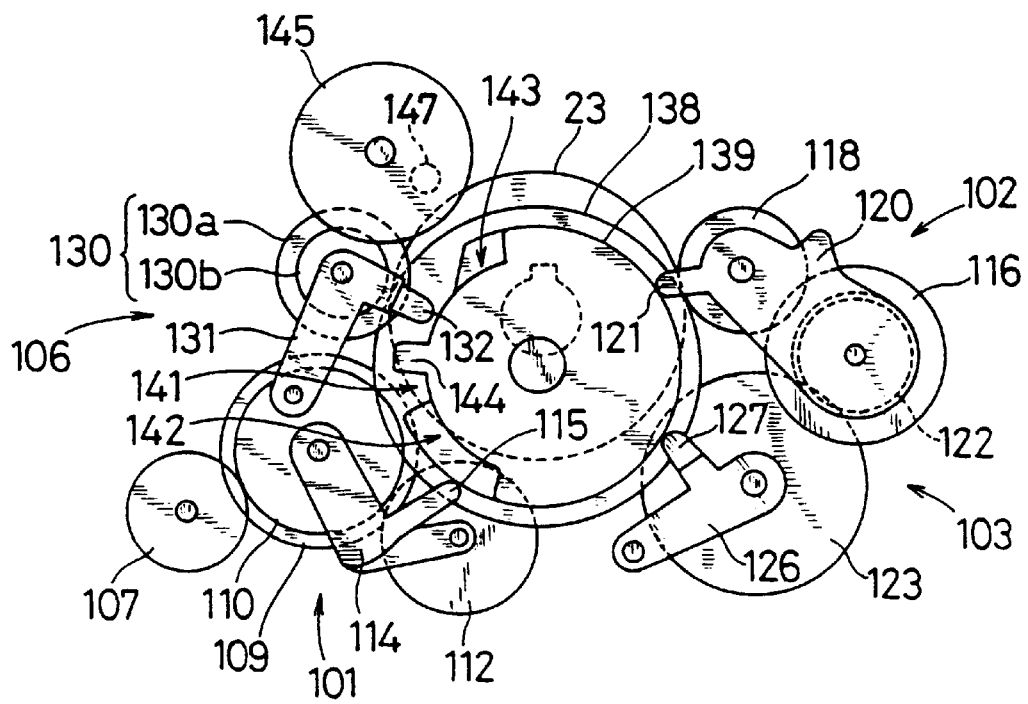
FIG. 19 is a diagram showing the contact positions of the respective contact pieces with the cam surfaces when the cam is set in the lid opening/closing area.
Figure 20:
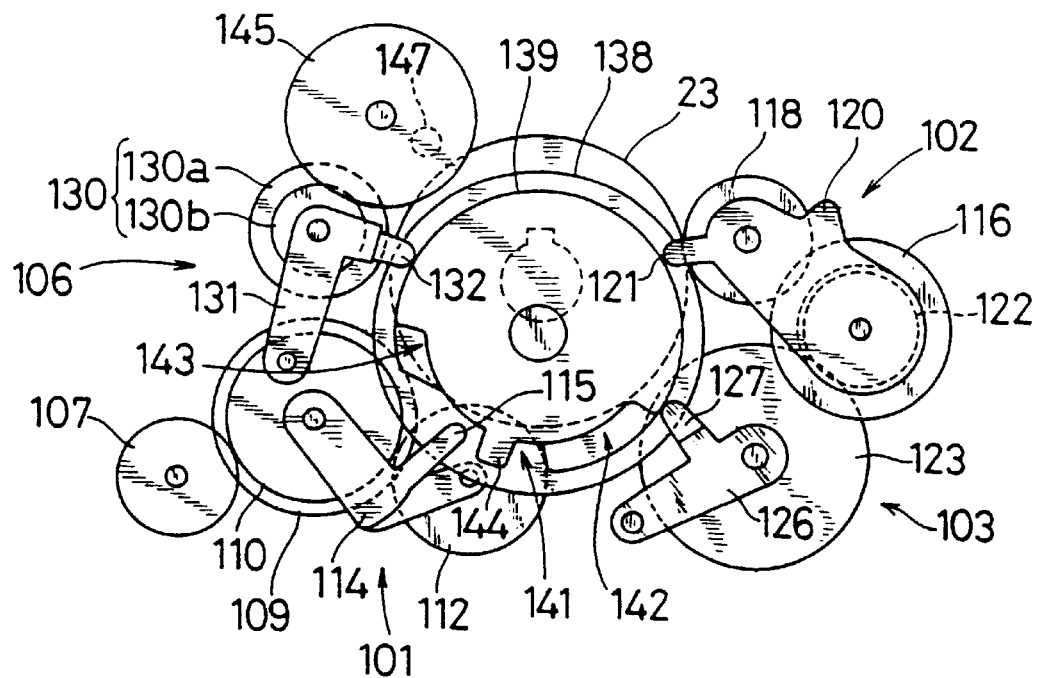
FIG. 20 is a diagram showing the contact positions of the respective contact pieces with the cam surfaces when the cam is set in the film rewinding area.
Figure 21:
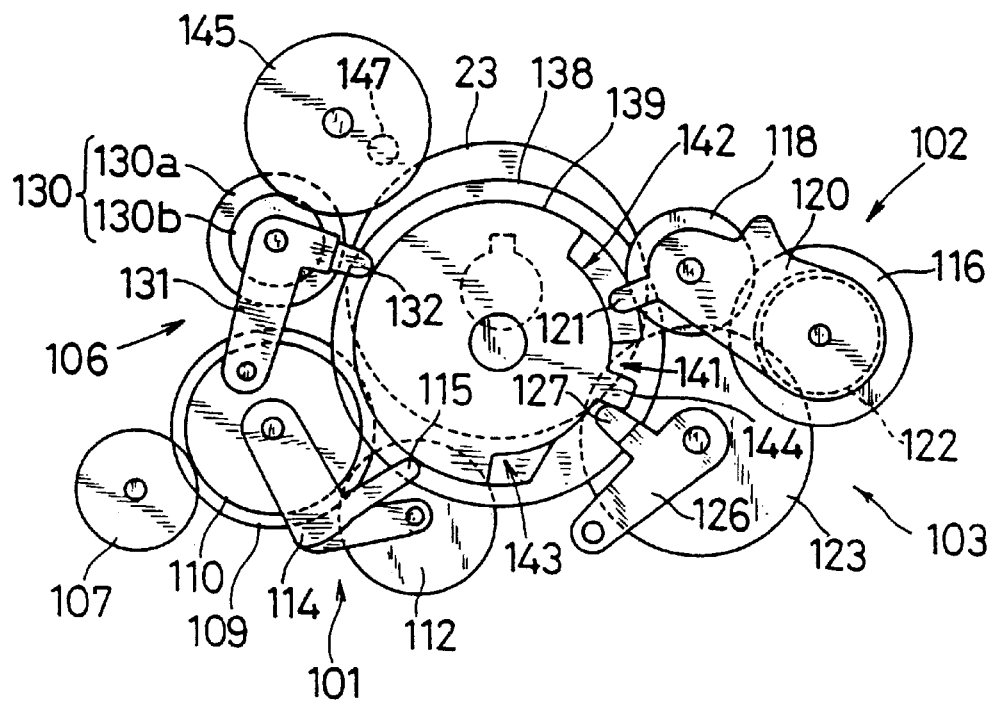
FIG. 21 is a diagram showing the contact positions of the respective contact pieces with the cam surfaces when the cam is set in the loading area.

FIG. 18 shows the contact positions of the respective contact pieces 115, 121, 127, 132 with the cam surfaces 140 when the cam position is set in the film winding area ①; FIG. 19 shows the contact positions of the respective contact pieces 115, 121, 127, 132 with the cam surfaces 140 when the cam position is set in the lid opening/closing area ②; FIG. 20 shows the contact positions of the respective contact pieces 115, 121, 127, 132 with the cam surfaces 140 when the cam position is set in the film rewinding area ③; and FIG. 21 shows the contact positions of the respective contact pieces 115, 121, 127, 132 with the cam surfaces 140 when the cam position is set in the film loading area ④.

As described above, when the contact pieces 115, 127, 132 face the cam slot 142 of the first cam surface 140a and the contact piece 121 faces the cam slot 143 of the second cam surface 140b, the planetary gear wheels 112, 123 are meshed with the fork gear wheel 23, and the planetary gear wheel 112 and the first planetary gear wheel 130a are meshed with the transmission gear wheel 138. If "○", "x" denote a meshed state and an unmeshed state, the state of the planetary gear wheels 112, 118, 123, 130a of the gear devices 101, 102, 103, 106 at the respective positions of the cam 139 are as shown in TABLE-1 below.

TABLE 1

| POSITION OF THE CAM 139 | STATE OF GEAR WHEELS | | | |
| --- | --- | --- | --- | --- |
| | GEAR WHEEL 112 (REWINDING) | GEAR WHEEL 118 (WINDING) | GEAR WHEEL 123 (LOADING) | GEAR WHEEL 130a (LID O/C) |
| FILM WINDING AREA ① | x | ○ | x | x |
| LID O/C AREA ② | x | x | x | ○ |
| FILM REWINDING AREA ③ | ○ | x | x | x |
| FILM LOADING AREA ④ | x | ○ | ○ | x |

FIGS. 22 to 25 show the transmission direction of the torque of the drive motor M in the first torque transmission mechanism 100 in the film winding mode, the film loading mode, the film rewinding mode and the lid opening/closing mode, respectively.

In FIGS. 22 to 25, solid line arrows show the transmission directions of the torque of the drive motor M, thin line arrows show the rotating directions of the respective gear wheels, and white arrows show the moving direction of the film F.

The film F is fed by drivingly rotating the drive motor M clockwise, whereas the cam position is switched by rotating the drive motor M counterclockwise.

Figure 22:
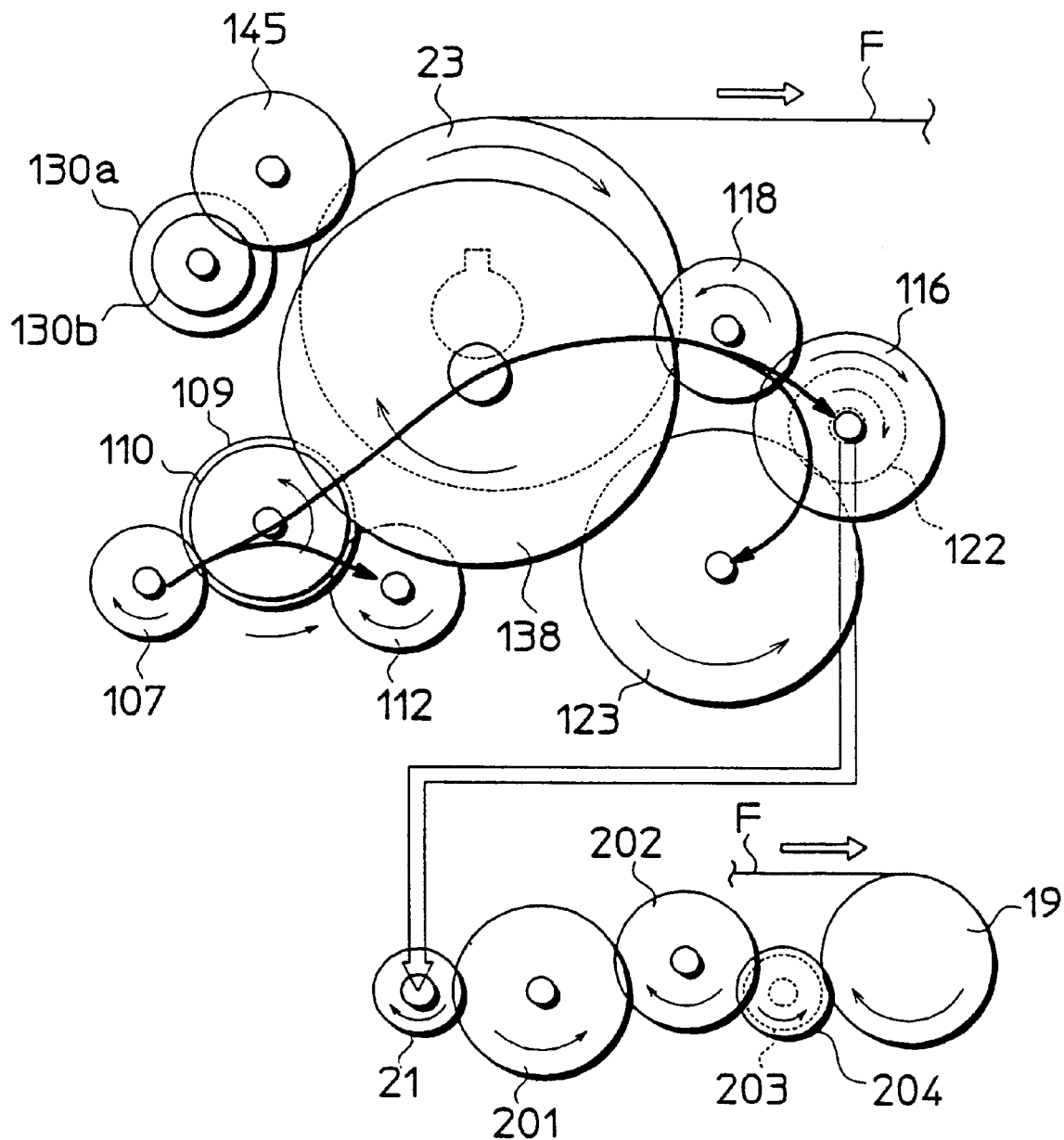
FIG. 22 is a diagram showing a transmission direction of a torque of a drive motor in the first torque transmission mechanism in a film winding mode.

In the film winding mode, as shown in FIG. 22, the torque of the drive motor M is transmitted to the take-up spool 18 via the motor gear wheel 107, the sun gear wheel 109, the reduction gear wheel 110, the transmission gear wheel 138, the winding gear device 102, the transmission shaft 20, the second torque transmission mechanism 200 and the spool gear wheel 19, thereby rotating the take-up spool 18 to wind the film F. Although the torque of the drive motor M is also transmitted to the rewinding gear device 101 and the thrust gear device 103, the fork 22 idly rotates since the planetary gear wheels 112, 123 are not meshed with the fork gear wheel 23. Accordingly, the fork 22 is rotated by the movement of the film F in the winding direction by take-up spool 18.

Figure 23:
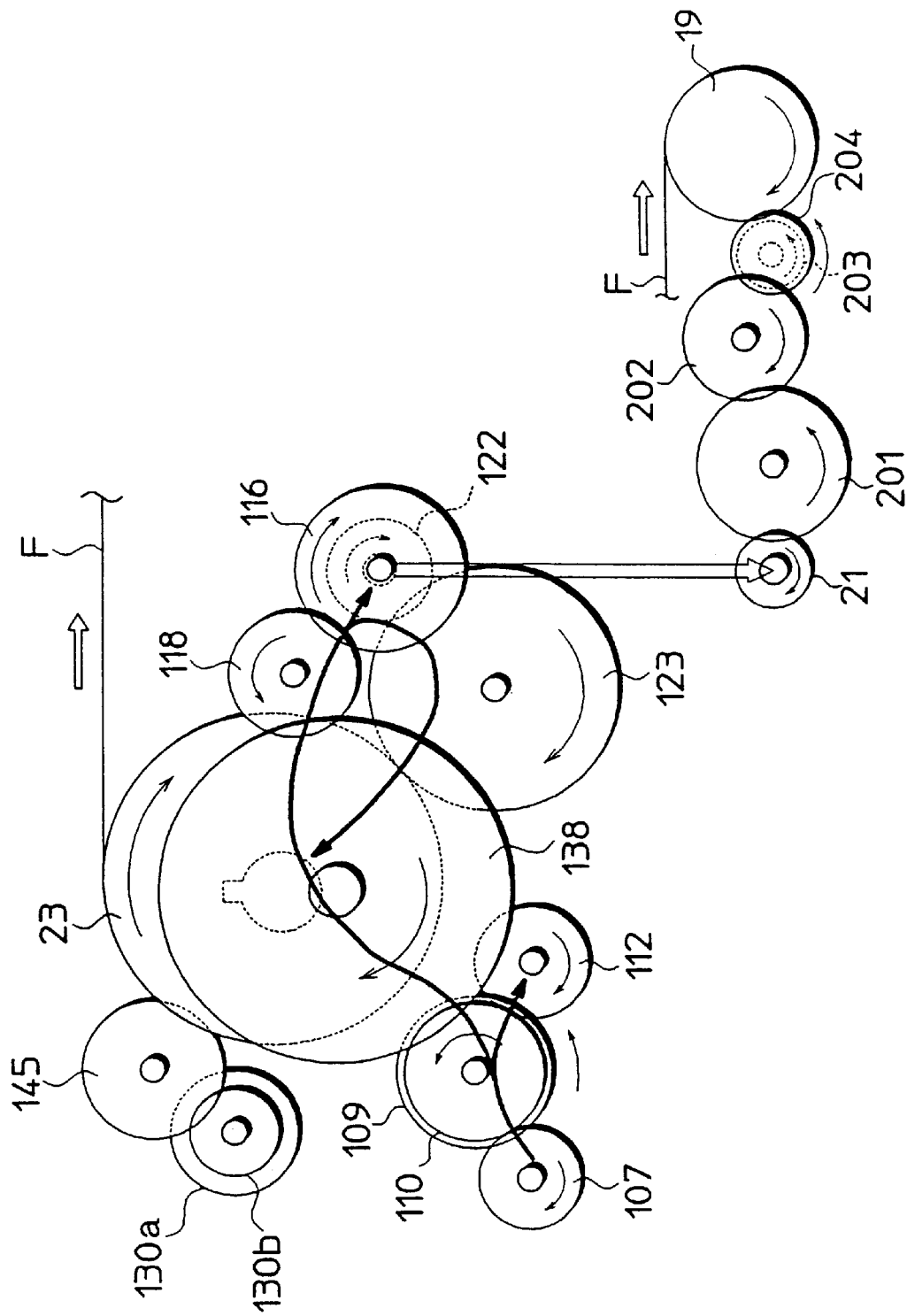
FIG. 23 is a diagram showing the transmission direction of the torque of the drive motor in the first torque transmission mechanism in a film loading mode

In the film loading mode, as shown in FIG. 23, the torque of the drive motor M is transmitted to the fork 22 via the motor gear wheel 107, the sun gear wheel 109, the reduction gear wheel 110, the transmission gear wheel 138, the winding gear device 102, the thrust gear device 103 and the fork gear wheel 23, thereby rotating the fork 22 clockwise to feed the film F from the film cartridge KT. The torque of the drive motor M is also transmitted to the take-up spool 18 via the motor gear wheel 107, the sun gear wheel 109, the reduction gear wheel 110, the transmission gear wheel 138, the winding gear device 102, the transmission shaft 20, the second torque transmission mechanism 200 and the spool gear wheel 19, thereby rotating the take-up spool 18 clockwise to take up the fed film F by the take-up spool 18.

Figure 24:
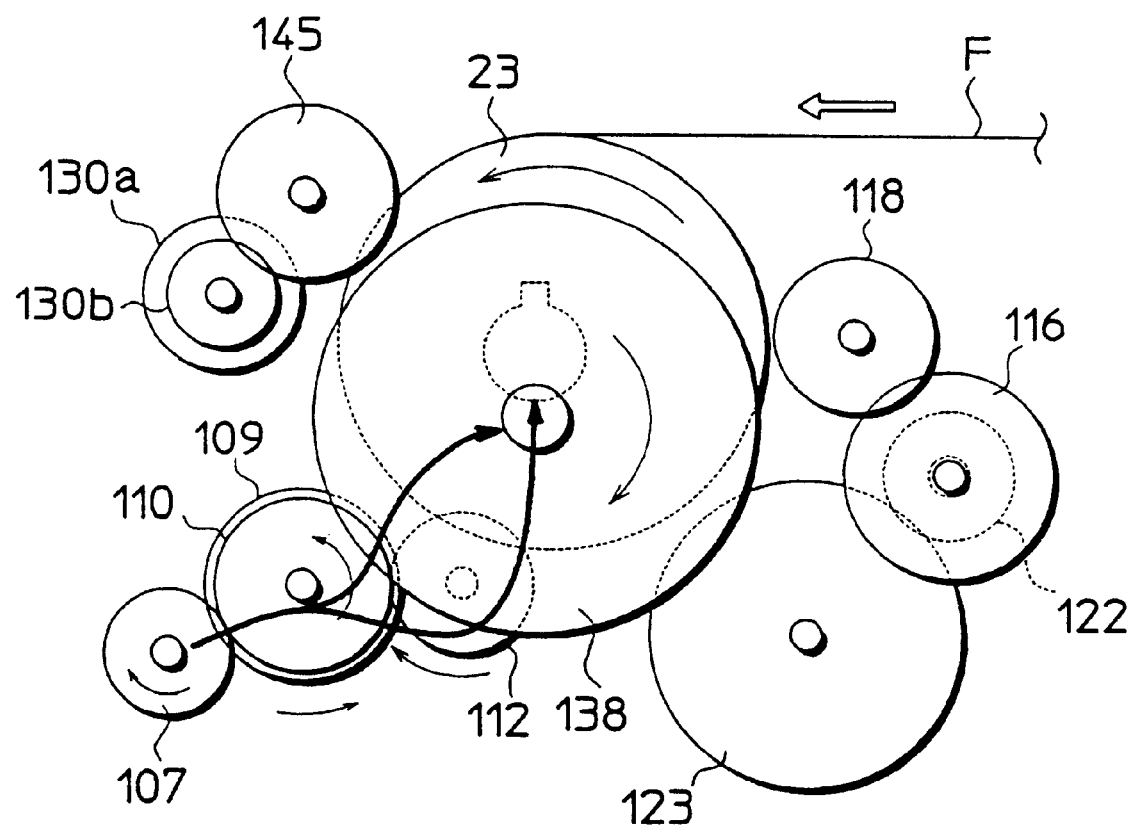
FIG. 24 is a diagram showing the transmission direction of the torque of the drive motor in the first torque transmission mechanism in a film rewinding mode.

In the rewinding mode, as shown in FIG. 24, the torque of the drive motor M is transmitted to the fork 22 via the motor gear wheel 107, the rewinding gear device 101 and the fork gear wheel 23, thereby rotating the fork 22 counterclockwise to rewind the film F. Since the planetary gear wheel 118 is not in mesh with the transmission gear wheel 138, the torque of the drive motor M having transmitted to the transmission gear wheel 138 is not transmitted to the take-up spool 18. Accordingly, the take-up spool 18 is rotated in the reverse direction by the movement of the film F in the rewinding direction by the fork 22.

Figure 25:
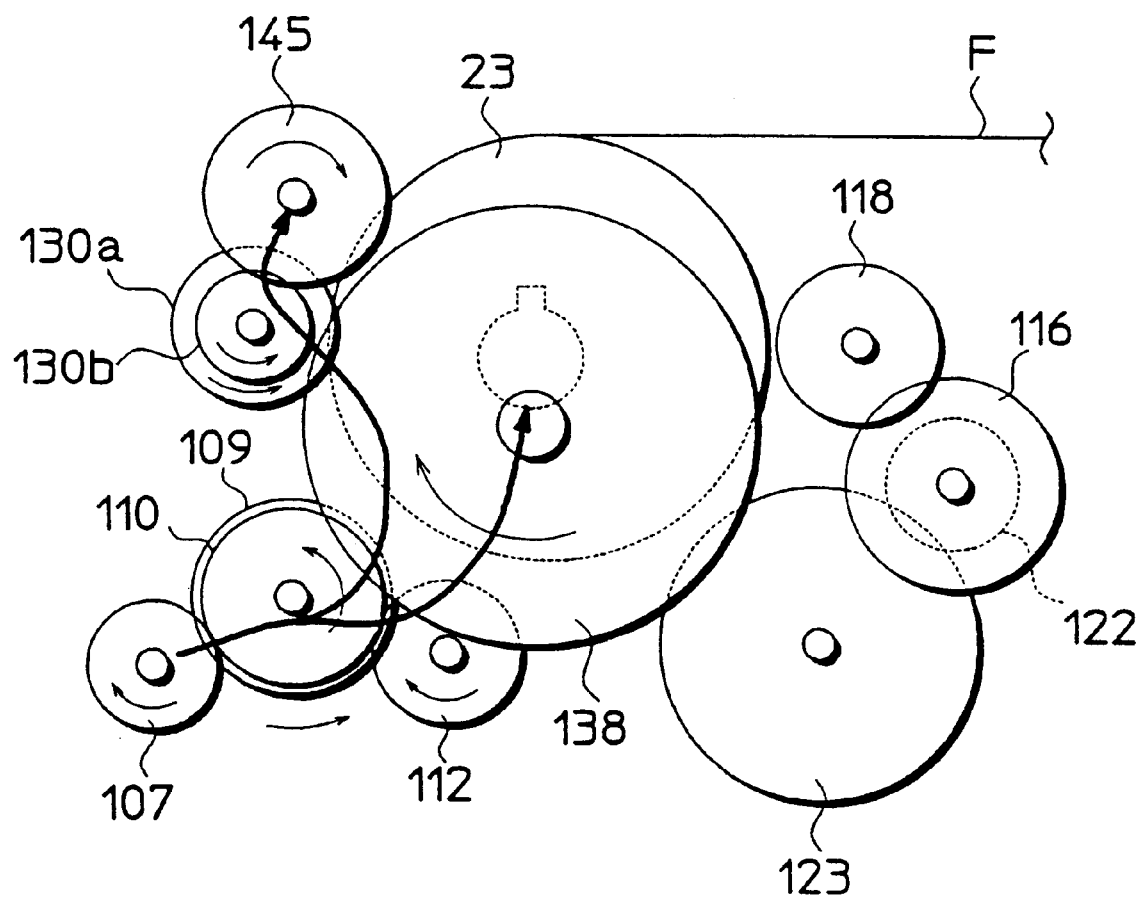
FIG. 25 is a diagram showing the transmission direction of the torque of the drive motor in the first torque transmission mechanism in a film opening/closing mode.

In the lid opening/closing mode, as shown in FIG. 25, the torque of the drive motor M is transmitted to the crank plate 146 via the motor gear wheel 107, the sun gear wheel 109, the reduction gear wheel 110, the transmission gear wheel 138, the planetary gear wheel 130 and the crank gear wheel 145, thereby rotating the crank plate 146 clockwise to move the crank lever 149. By the movement of the crank lever 149, the opening and closing of the light blocking lid 502 of the cartridge KT and of the cartridge cover 8 are performed in succession as described later after the rewinding of the film F is completed.

As described above, by providing the first torque transmission mechanism 100 outside the upper surface 11a of the cartridge chamber 11 and by providing the second torque transmission mechanism 200 connected with the first torque transmission mechanism 100 via the transmission shaft 20 below the taking lens system 2, the torque of the drive motor M provided at the side of the bottom part of the cartridge chamber 11 for the film feed is transmitted to the fork 22 via the first torque transmission mechanism 100 and also to the take-up spool 18 via the first torque transmission mechanism 100, the transmission shaft 20 and the second torque transmission mechanism 200. Accordingly, the driving system for the film feed can be made compact.

Particularly, in the first torque transmission mechanism 100, the transmission gear wheel 138 with which the cam 139 is coaxially connected is arranged coaxially or in an eccentric position with respect to the fork gear wheel 23. Further, around the transmission gear wheel 138 are arranged the rewinding gear device 101 for transmitting the torque of the drive motor M to the fork gear wheel 23 in the film rewinding mode; the winding gear device 102 for transmitting the torque of the drive motor M having transmitted to the transmission gear wheel 138 further to the transmission shaft 20 in the film winding mode and the film loading mode; the thrust gear device 103 for transmitting the torque of the drive motor M having transmitted to the transmission shaft 20 further to the fork gear wheel 23 in the film loading mode; the crank mechanism 105 for opening and closing the light blocking lid 502 and the cartridge cover 8; and the lid opening/closing gear device 106 for transmitting the torque of the drive motor M having transmitted to the transmission gear wheel 138 further to the crank gear wheel 145 in the lid opening/closing mode. By switching the cam position of the cam 139, the connection of the planetary gear wheels 112, 118, 123, 130 of the gear devices 101 to 103, 106 is controllably switched in the respective drive modes. Accordingly, the first torque transmission mechanism 100 can be arranged in a compact manner outside the upper surface 11a of the cartridge chamber 11, contributing to the downsizing of the camera as a whole.

Next, the opening and closing of the light blocking lid 502 and the cartridge cover 8 in the lid opening/closing mode is described.

Figure 26:
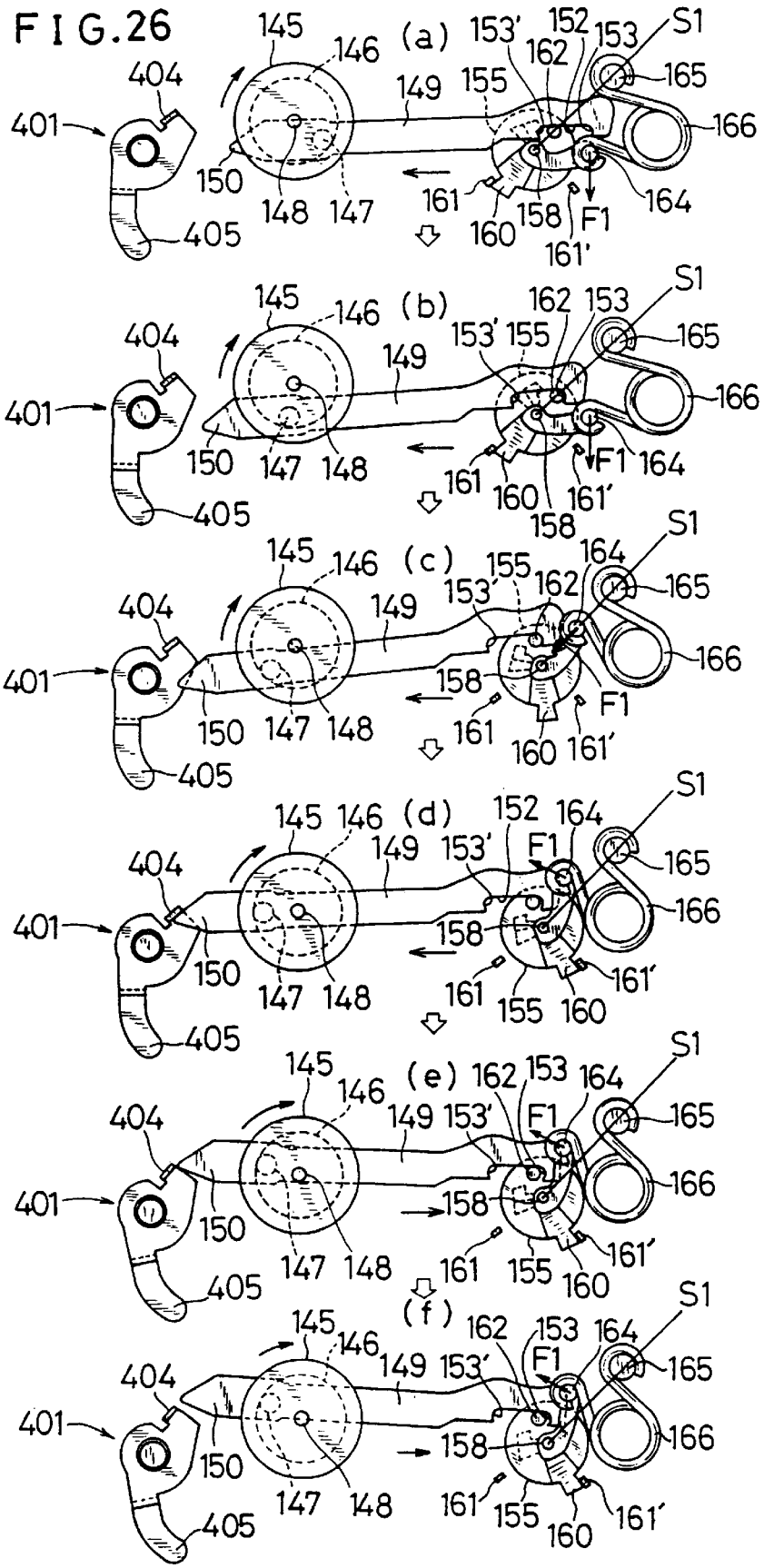

FIGS. 26A to 26F are diagrams showing the movement of the crank lever 149, the lid opening key 154 and the unlock lever 401 in the lid opening/closing mode, wherein FIG. 26A shows the state where the lid opening key 154 is in its open position (standby position), FIG. 26B shows a state where the position switch of the lid opening key 154 is started by the crank lever 149, FIG. 26C shows an intermediate state between the open position and close position of the lid opening key 154, FIG. 26D shows a state immediately before the crank lever 149 comes into contact with the unlock lever 401, FIG. 26E shows a state after the completion of the unlocking by the crank lever 149, and FIG. 26F shows a state where the lid opening key 154 is in its close position (standby position).

When the lid opening button 10 is operated, the drive motor M is driven in the reverse direction to set the cam position of the cam 139 in the lid opening/closing area ②. Thereafter, the drive motor M is rotated clockwise by a specified number of turns and this torque is transmitted to the crank gear wheel 145 to effect the reciprocal movement of the crank lever 149.

The crank lever 145 makes about a half clockwise turn upon the receipt of the torque of the drive motor M, thereby moving the crank lever 149 from a predetermined standby position where the light blocking lid 502 is open (hereinafter, "open standby position") to a predetermined standby position where the light blocking lid 502 is closed (hereinafter, "close standby position"). The open and close standby positions are predetermined positions beyond the bottom and top dead centers, respectively.

When the crank lever 149 is in the open standby position, the engaging portion 153' is located in a position more toward the torsion coil spring 166 than the shaft 158 of the lid opening key 154 (at the right side of the shaft 158 in FIGS. 26A to 26F; hereinafter, "right side position"). Accordingly, the lid opening key 154 does not rotate to a position where the engaging pin 162 is located more toward the unlock lever 401 than the shaft 158 (at the left side of the shaft 158 in FIGS. 26A to 26F; hereinafter, "left side position").

In this state, since the pin 164 of the lid opening key 154 is always located at the right side of a line segment S1 drawn from the shaft 158 toward the pin 165 and the biasing force of the torsion coil spring 166 acts on the lid opening key 154 as a clockwise rotational force F1, the lid opening key 154 is kept in the open position where the contact piece 160 is in contact with the stopper 161 (see FIG. 26A).

When the crank lever 149 is moved by a specified distance by the rotation of the crank gear wheel 145, the engaging portion 153 engages the engaging pin 162 (see FIG. 26B). Further, when the lid opening key 154 is rotated counterclockwise to an opening/closing position switching point by the movement of the crank lever 149 (see FIG. 26C), the lid opening key 154 is switched to its open position. More specifically, when the lid opening key 154 is rotated to the position where the engaging pin 162 is located beyond the line segment S1 (hereinafter, "opening/closing position switching point") by the movement of the crank lever 149, the spring force of the coil spring 166 acts on the lid opening key 154 as a counterclockwise rotational force F1'. Accordingly, the lid opening key 154 is immediately rotated in the reverse direction to the close position where the contact piece 160 is in contact with the stopper 161' and is held in this position (see FIG. 26D).

Since the contact portion 150 of the crank lever 149 is not in contact with the contact portion 404 of the unlock lever 401 at the time when the lid opening key 154 is rotated to the opening/closing position switching point, the opening or closing of the cartridge cover 8 is not performed.

The crank lever 149 continues to move even after the position of the lid opening key 154 is switched. When the crank plate 146 reaches a predetermined position in proximity to the top dead center, the contact portion 150 comes into contact with the contact portion 404 of the unlock lever 401, thereby the opening or closing of the cartridge cover 8 is started (see FIG. 26D). Upon the rotation of the crank plate 146 beyond the top dead center, the unlock lever 401 rotates counterclockwise about the shaft 406 to the lid opening/closing position, with the result that the locking mechanism 400 starts opening/closing the cartridge cover 8 (see FIG. 26 E).

Thereafter, when the crank lever 149 moves to the open standby position, the drive motor M is stopped, thereby completing a series of the closing of the light blocking lid 502 and the opening/closing of the cartridge cover 8 (see FIG. 26F).

When the lid opening key 154 is switched from the open position to the close position by the torsion coil spring 166, the engaging pin 162 is disengaged from the engaging portion 153 of the recess 152, having accomplished its object. Thereafter, the engaging pin 162 simply slides along the periphery of the recess 152 toward the engaging portion 153' as the crank lever 149 moves.

The opening of the light blocking lid 502 when the cartridge KT is loaded in the cartridge chamber 11 is done by rotating the crank gear wheel 145 clockwise by the torque of the drive motor M to move the crank lever 149 from its close standby position to its open standby position.

More specifically, when the crank lever 149 moves from its close standby position to its open standby position by a specified distance, the engaging portion 153' engages the engaging pin 162. When the lid opening key 154 is rotated clockwise to the opening/closing position switching point by the further movement of the crank lever 149, the spring force of the coil spring 166 acts in the opposite direction, i.e. acts as the clockwise rotational force F1 and the lid opening key 154 is immediately rotated to the open position where the contact piece 160 is in contact with the stopper 161 by the spring force of the coil spring 166. As a result, the light blocking lid 502 is opened.

As described above, in this embodiment, the movable range of the crank lever 149 between the open standby position and the close standby position is divided into two: the lid opening key is rotated to the opening/closing position switching point to completely close the light blocking lid 502 in the former movable range, and the unlock lever 401 is rotated to the lid opening/closing position to unlock the locking mechanism 400 in the latter movable range. Accordingly, a specified time lag can be securely ensured between the closing of the light blocking lid 502 and the unlocking of the locking mechanism 400. Therefore, a series of film eject controls to enable the withdrawal of the cartridge KT by unlocking the locking mechanism 400 after completely closing the light blocking lid 502 can be securely performed.

Further, since the open and close positions of the lid opening key 154 are defined by the stoppers 161, 161' and the lid opening key 154 has its position switched and is held in the switched position by the spring force of the torsion coil spring 166, the opening/closing of the light blocking lid 502 can be performed with high accuracy. Furthermore, since it is sufficient for the crank lever 149 to make a stroke to rotate the lid opening key 154 to the opening/closing position switching point in order to close the light blocking lid 502, the opening/closing of the light blocking lid 502 and the opening/closing of the cartridge cover 8 can be performed by a relatively short stroke of the crank lever 149. This makes it possible to construction the crank mechanism compact.

In order to pull the film F out of the cartridge KT and securely wind the film F around the take-up spool 18 when the first frame of the film F is fed to the exposure position, the feeding speed of the film F by the fork 22 needs to be sufficiently slower than the take-up speed of the film F by the take-up spool 18 (about twice as slow). However, in this embodiment, since the torque of the drive motor M is transmitted to the fork 22 and the take-up spool 18 and a torque transmission path from the drive motor M to the take-up spool 18 is longer than that from the drive motor M to the fork 22, a deceleration rate to the fork 22 in the first torque transmission mechanism 100 is relatively large. This slows the feeding speed of the film F and makes the rapid loading of the film F difficult.

In order to perform the film loading as rapidly as possible, the drive mode is switched from the film loading mode to the film winding mode at the moment when the leading end of the film F is securely held between the take-up spool 18 and a film presser 40, feeding the first frame to the exposure position.

Figure 27:
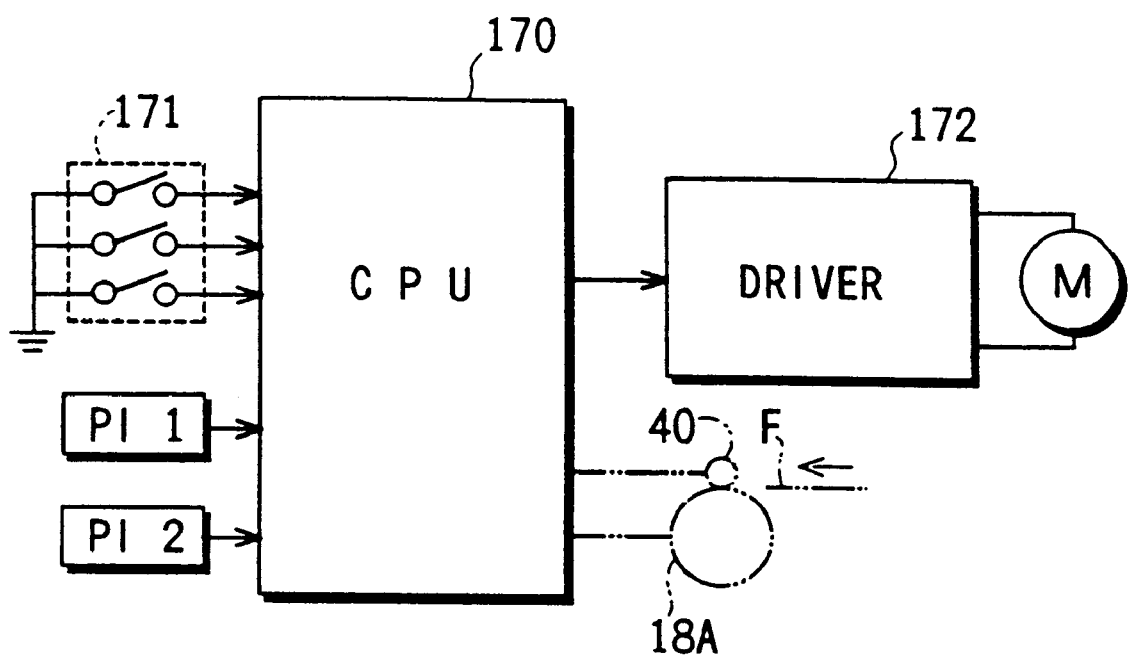
FIG. 27 is a block diagram of a control system for the film feed.
Figure 28:
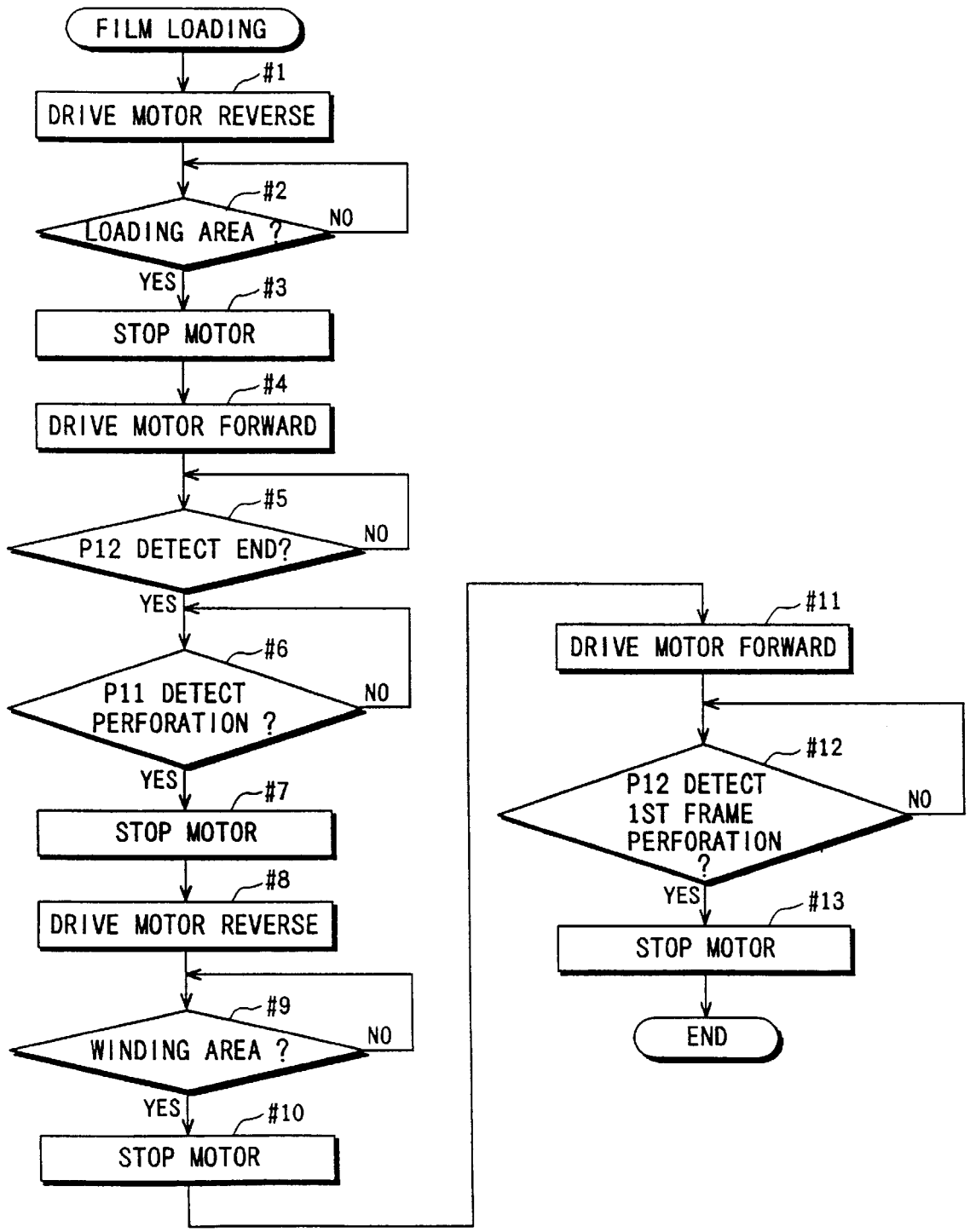
FIG. 28 is a flowchart showing a sequence of a routine "Loading"
Figure 29:
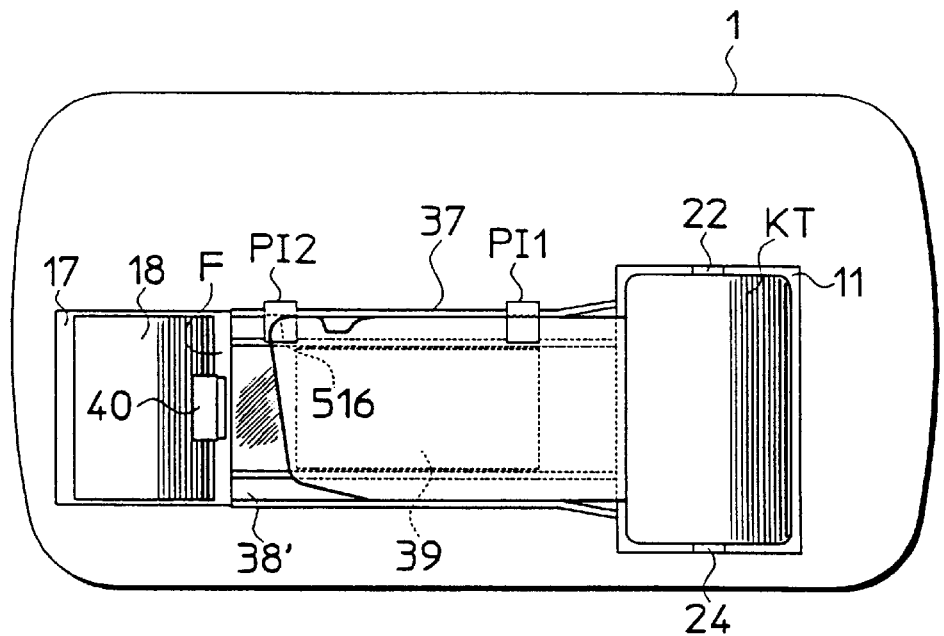
FIG. 29 is a diagram showing a state where the leading end of the film is located in a detection position of a photointerrupter PI2.
Figure 30:
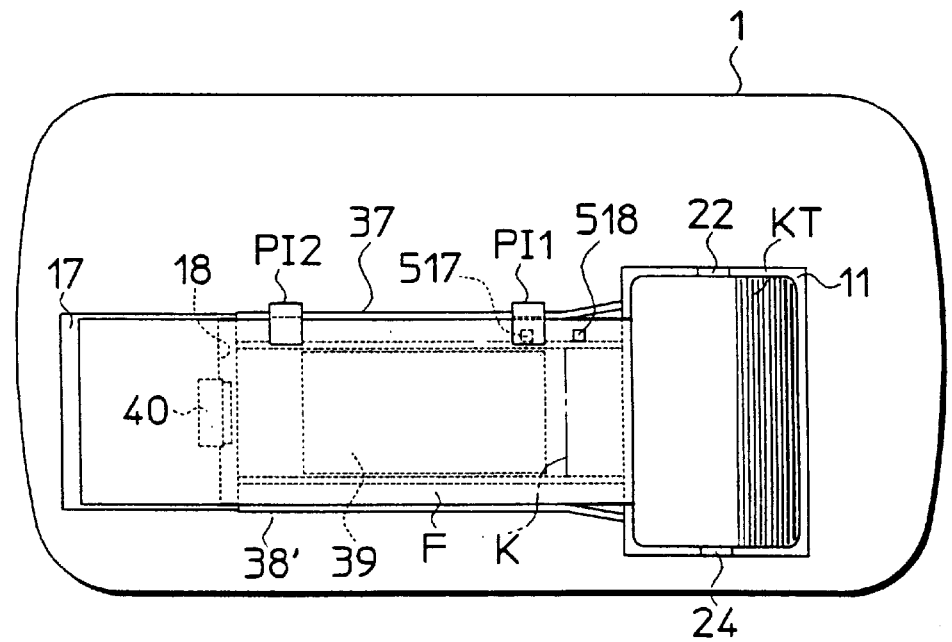
FIG. 30 is a diagram showing a state where a perforation indicative of a front end position of a leading frame is located in a detection position of a photointerrupter PI1.
Figure 31:
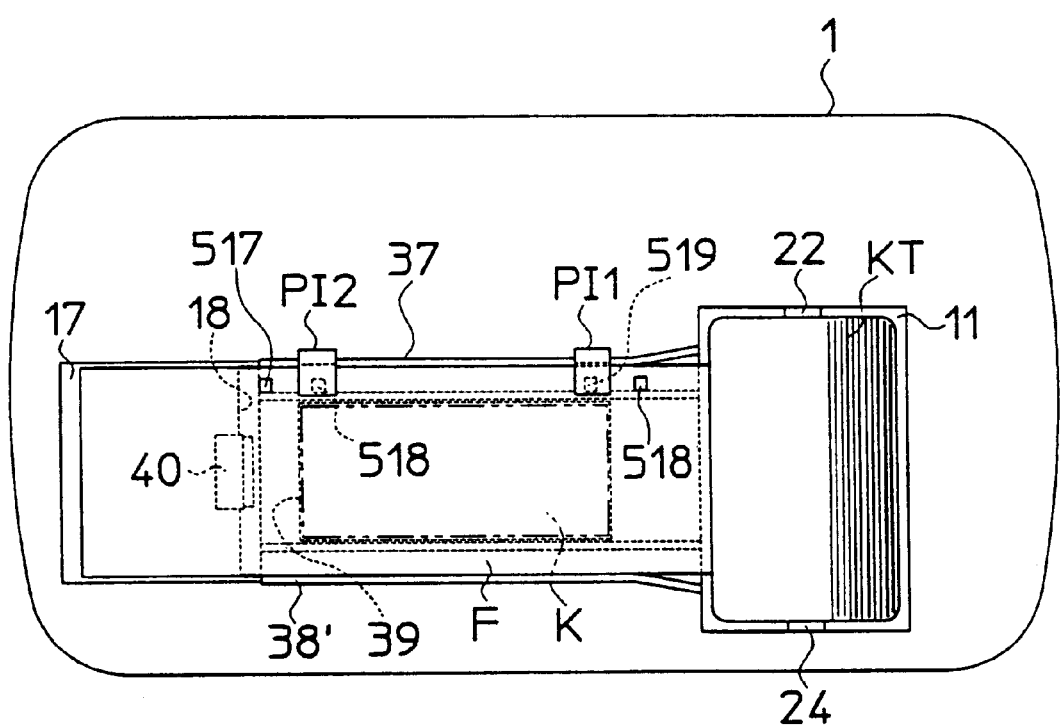
FIG. 31 is a diagram showing a state where the perforation indicative of the front end position of the leading frame is located in the detection position of the photointerrupter PI2.

FIG. 27 is a block diagram of a control system for the film feed, and FIG. 28 is a flowchart showing the sequence of the film loading. FIGS. 29 to 31 are diagrams showing the film F in respective feed positions during the film loading, wherein FIG. 29 shows the film F with the leading end thereof located in the detection position of the photointerrupter PI2, FIG. 30 shows the film F with the perforation 518 indicative of the front end position of the first frame K located in the detection position of the photointerrupter PI1, and FIG. 31 shows the film F with the perforation 518 indicative of the front end position of the first frame K located in the detection position of the photointerrupter PI2.

The control system for the film feed includes a CPU 170, a cam position sensor 171, the photointerrupters PI1, PI2, a motor driver 172 and the drive motor M. The cam position sensor 171 detects the rotational position of the cam 139, and is constituted, for example, by an encoder including a code plate opposed to the upper part of the cam 139 and three brushes held in pressing contact with this code plate.

The cam position sensor 171 outputs sensor signals from the respective brushes (equivalent to on/off signals of switches) in a parallel manner. The respective cam positions are represented by a three-bit digital signal (a1, a2, a3). For example, (0, 0, 0), (0, 1, 0), (0, 1, 1), (1, 0, 0) correspond to the cam positions in the film winding area, the film loading area, the film rewinding area and the lid opening/closing area.

The CPU 170 is a controller for the driving of the film feeding system and includes a microcomputer. The CPU 170 controllably switches the cam position of the cam 139 in accordance with the sensor signal from the cam position sensor 171, and controllably starts and stops the feed of the film F in accordance with the detection signals of the photointerrupters PI1, PI2.

The motor driver 172 controls the driving of the drive motor M in accordance with a control signal from the CPU 170. The drive motor M includes, for example, a stepping motor, and the motor driver 172 controls the respective drive parameters such as the rotating direction, the rotating amount, and the rotating speed by controlling a drive pulse output to the drive motor M.

After the bar code on the code plate 507 is read after the cartridge KT is loaded in the cartridge chamber 11 and the cartridge cover 8 is locked, the film loading is automatically executed by the CPU 170 in accordance with the flowchart shown in FIG. 28.

First, when the drive motor M is driven in the reverse direction to change the cam position of the cam 139 (Step #1) and the cam position enters the film loading area ④ (YES in Step #2), the drive motor M is stopped (Step #3). Subsequently, the drive motor M is driven in the forward direction (Step #4) to pull the film F out of the cartridge KT in the film loading mode. The film F is fed until the leading end of the film F is detected by the photointerrupter PI2 (see FIG. 29) and the perforation 517 is detected by the photointerrupter PI1 (Steps #5 and #6). Upon detecting the perforation 517 (YES in Step #6, see FIG. 30), the drive motor M is stopped, thereby completing the motor drive in the film loading mode.

Subsequently, when the drive motor M is driven in the reverse direction to change the cam position of the cam 139 (Step #8) and the cam position enters the film winding area ① (YES in Step #9), the drive motor M is stopped (Step #10) and the motor drive in the film winding mode is started. More specifically, the drive motor M is driven in the forward direction (Step #11) to wind the film F at a high speed. When the perforation 518 corresponding to the first frame of the film F is detected by the photointerrupter PI2 (YES in Step #12, see FIG. 31), the drive motor M is stopped (Step #13), thereby completing the film loading.

In the above flowchart, the drive mode is switched from the film loading mode to the film winding mode at the moment when the perforation 517 is detected by the photointerrupter PI1 because the leading end of the film F is completely wound around the take-up spool 18 at this moment (a state where the film F is pressed against the take-up spool 18 by the film presser 40) and the film F can be further fed only by the take-up force of the take-up spool 18.

As described above, in the film loading, after the leading end of the film F is completely held between the take-up spool 18 and the film presser 40, the drive mode is switched from the film loading mode to the film winding mode and the film F is fed only by the take-up operation of the take-up spool 18. Accordingly, a reduction in the efficiency of the film loading can be suppressed even in the case that the film loading is performed only by the single drive motor M and the first and second torque transmission mechanisms 100, 200.

The notch 516 formed at the leading end of the film F has a depth d substantially equal to a distance between the edge of the film F and a middle position of each of the perforations 517 to 519 as shown in FIG. 3. Accordingly, the notch 516 is sometimes detected by the photointerrupter PI1 and sometimes not. Accordingly, in the film feed control executed on the assumption that the notch 516 never fails to be detected by the photointerrupter PI1, the perforation 517 is mistakenly detected as the notch 516 when the notch 516 is not detected. On the other hand, in the film feed control executed on the assumption that the notch 516 is not going to be detected, the notch 516 is detected as the perforation 517 when the notch 516 is detected. Thus, it becomes difficult to accurately feed the film F so that the image recording area of the first frame K is located in the specified exposure position in the film loading.

Accordingly, after detecting the leading end of the film F, the photointerrupter PI2 does not detect the film F until the photointerrupter PI1 detects the perforation 517. If the detection of the film F by the photointerrupter PI2 has been started after the photointerrupter PI1 detected the perforation 517, the next detection of the absence of the film F by the photointerrupter PI2 means the detection of the perforation 517. In this way, the insecure detection signal of the notch 516 by the photointerrupters PI1, PI2 can be eliminated.

Although the drive mode is switched when the perforation 517 is detected by the photointerrupter PI1 in the above flowchart, it may be switched when the leading end of the film F is nipped between the film presser 40 and the take-up spool 18. In such a case, a detection that the leading end of the film F is nipped between the film presser 40 and the take-up spool 18 may be made as follows. The friction member 18A provided on the outer surfaces of the film presser 40 and the take-up spool 18 is made of an electrically conductive material, and a current is supplied between the film presser 40 and the friction member 18A. As indicated by phantom line in FIG. 27, a non-conductive state between the film presser 40 and the friction member 18A resulting from a nip of the film F between the film presser 40 and the friction member 18A can be detected by the CPU 170.

Since the drive mode can be switched at an earliest timing after the leading end of the film F is completely wound around the take-up spool 18 according to this method, the film loading can be more rapidly performed.

Next, the ejecting mechanism 300 for the cartridge KT and the locking mechanism 400 for the cartridge cover 8 are described.

Figure 32:
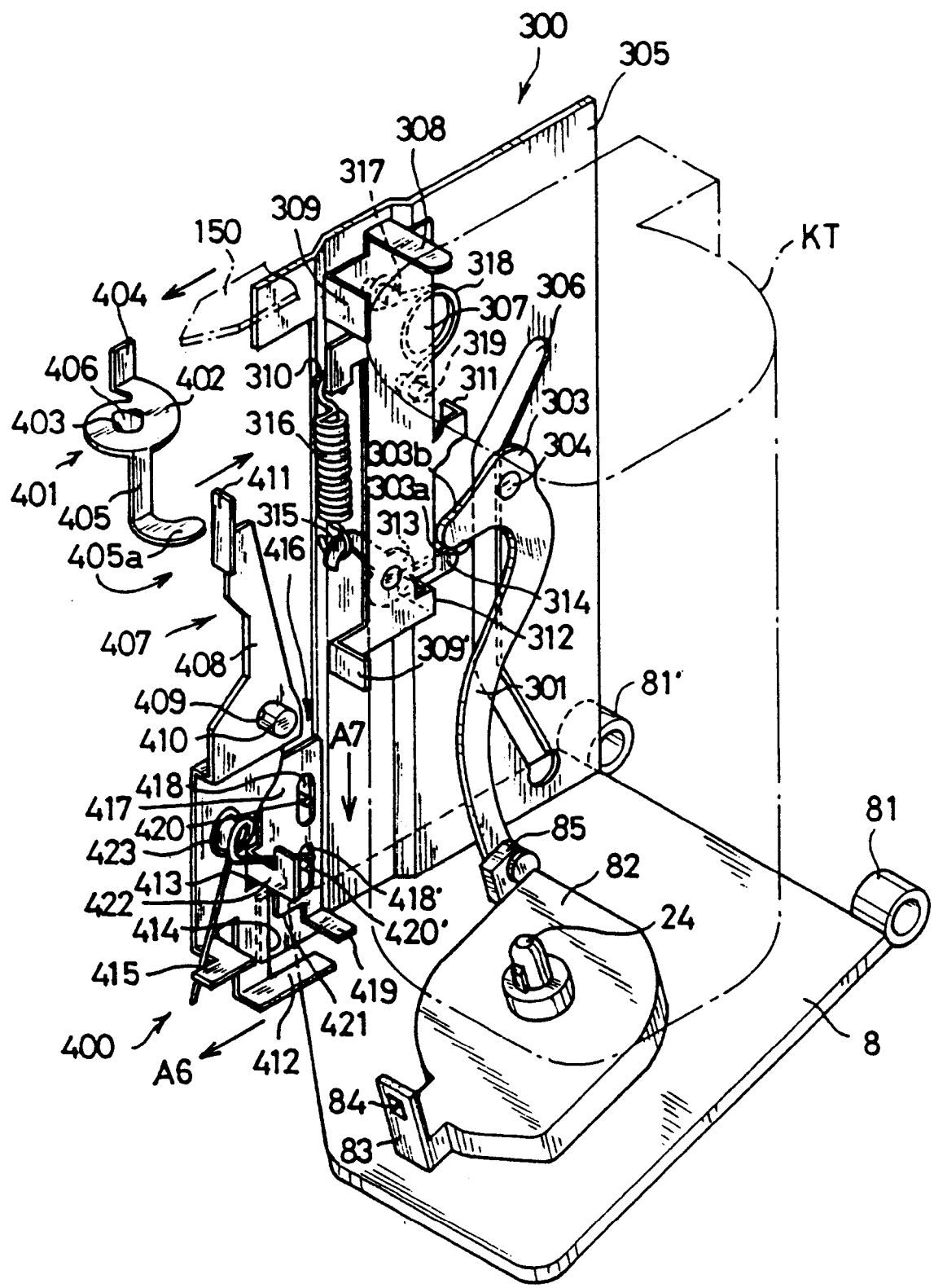
FIG. 32 is a perspective view of an ejecting mechanism for the cartridge and a locking mechanism for a cartridge cover.

FIG. 32 is a perspective view showing the ejecting mechanism 300 for the cartridge KT and the locking mechanism 400 for the cartridge cover 8.

The ejecting mechanism 300 is provided on the outer side surface of a flat plate 41 forming the rear side surface of the cartridge chamber 11 of the first housing member 31A (see FIGS. 8 and 9), whereas the locking mechanism 400 for the cartridge cover 8 is provided on the outer side surface of a flat plate 42 forming a part of the side wall of the battery chamber 12 of the first housing member 31A. In FIG. 32, the first housing member 31A is omitted in order to simplify the drawing.

First, the construction of the ejecting mechanism 300 is described.

The cartridge cover 8 has a pentagonal shape obtained by omitting a corner portion of one short side of a rectangular, and hinges 81, 81' for rotatably supporting the cartridge cover 8 are formed at the opposite corners of the other short side. A substantially disk-shaped base portion 82 is provided substantially in the middle of the inner surface of the cartridge cover 8, and the fork 24 projects substantially in the middle of the base portion 82. The fork 24 is so biased as to project by the coil spring 30 provided in the base portion 82 (see FIG. 7).

The engagement portion 83 used to lock the cartridge cover 8 projects at the leading end of the base portion 82 (an end facing the leading end of the cartridge cover 8). The engagement portion 83 is a projecting piece formed in its center with a rectangular engaging hole 84. A support portion 85 for rotatably supporting an eject hook lever 301 projects in a specified position of the inner surface of the cartridge cover 8, proximate to the corner of the base portion 82 facing the hinge 81'.

Figure 33:
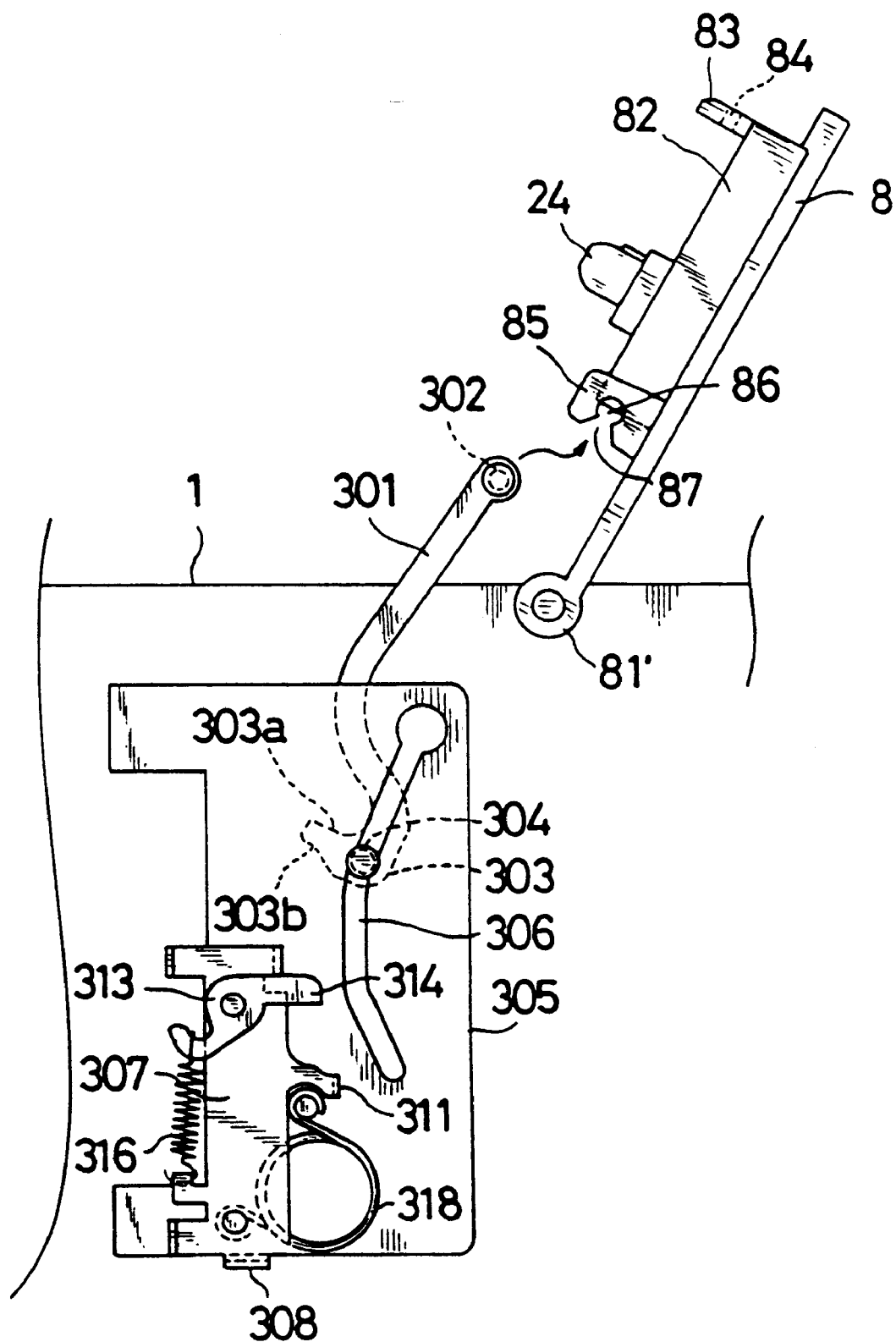
FIG. 33 is a diagram showing a linking construction of the cartridge cover and an eject hook lever.

The support portion 85 is, as shown in FIG. 33, a rectangular projecting piece formed in its center with an engaging hole 86 and in a specified position on one side thereof with a V-shaped cut 87 communicating with the engaging hole 86. The eject hook lever 301 has a shaft 302 projecting at its base end and is rotatably connected with the cartridge cover 8 by fitting the shaft 302 into the engaging hole 86 through the V-shaped cut 87. Since the boundary between the engaging hole 86 and the V-shaped cut 87 has a width smaller than the diameter of the shaft 302, the shaft 302 having fitted into the engaging hole 86 does not easily come out.

Since the connection construction is such a simple one of fitting the shaft 302 into the engaging hole 86 via the V-shaped cut 87, the camera according to the invention can be easily assembled by accommodating the housing 31 in the camera main body 1 after necessary members are mounted on the housing 31 and connecting the eject hook lever 301 mounted on the first housing member 31A with the cartridge cover 8 mounted on the camera main body 1.

The eject hook lever 301 is adapted to eject the cartridge KT by causing the bottom end of the cartridge KT completely loaded in the cartridge chamber 11 to project from the cartridge loading opening 43 as the cartridge cover 8 is opened. The eject hook lever 301 is S-shaped and formed with a hook 303 at its leading end. On the inner surface (side surface facing the cartridge loading opening 43) of the leading end of the hook 303, there is formed a contact portion 303a which comes into contact with a lever portion 314 of an eject link lever 313 to be described later. On the outer surface (side surface facing the upper surface 11a of the cartridge chamber 11), there is formed a contact portion 303b which comes into contact with a contact piece 311 to be described later.

Further, a guide pin 304 is so provided as to project toward the back surface of the camera at the leading end of the eject hook lever 301. The guide pin 304 is loosely fitted in a guide groove 306 formed in a guide plate 305 mounted on the flat plate 41 of the first housing member 31A. The guide groove 306 has an arch-like shape curved to the left when viewed from the front surface of the camera. The hook 303 of the eject hook lever 301 is guided by the guide groove 306 so as to come closer to the eject link lever 313 as the cartridge cover 8 is opened and closed.

An eject lever 307 used to eject the cartridge KT is movably provided upward and downward in a position between the guide plate 305 and the flat plate 41 of the first housing member 31A and facing a left end of the guide plate 305 when viewed from the front surface of the camera.

The eject lever 307 is movable upward and downward between a position where the cartridge KT can be completely loaded into the cartridge chamber 11 (position shown in FIG. 32; hereinafter, "load position") and a position where a part of the cartridge KT projects from the cartridge loading opening 43 (a position lowered from the position of FIG. 32; hereinafter, "eject position").

The eject lever 307 has a rectangular shape. An eject claw 308 is so formed at the upper end of the eject lever 307 as to project into the cartridge chamber 11, and a pair of guide members 309, 309' are so formed as to project toward the cartridge chamber 11 at upper and lower ends of a left edge of the eject lever 307 when viewed from the front of the camera. Further, below the guide member 309 at the left edge of the eject lever 307, a projection 310 is so formed as to project toward the back surface. The guide members 309, 309' are fitted in an unillustrated guide groove extending in the vertical direction which is provided on the flat plate 41 and are adapted to guide a vertical movement of the eject lever 307.

Further, the contact portion 311 and a projection 312 are so formed as to project toward the back surface at the substantially middle and upper end positions of a right edge of the eject lever 307 when viewed from the front of the camera. The eject link lever 313 is rotatably provided in a specified lower end position of the eject lever 307 facing the guide plate 305.

The contact portion 303b of the hook 303 comes into contact with the contact portion 311 during the closing of the cartridge cover 8. Accordingly, while the cartridge cover 8 is closed, the contact portion 311 acts to switch the position of the eject lever 307 from its eject position to its load position.

The eject link lever 313 is a member with which the contact portion 303a of the hook 303 comes into contact during the opening of the cartridge cover 8, and acts to switch the position of the eject lever 307 from its load position to its eject position as the cartridge cover 8 is opened. The eject link lever 313 includes the lever portion 314 with which the contact portion 303a comes into contact, and a hook portion 315. A torsion coil spring 316 is mounted between the hook portion 315 and the projection 310. The spring 316 renders the eject link lever 313 a clockwise rotational force when viewed from the front of the camera.

The projection 312 is a portion with which the lever portion 314 comes into contact, thereby restricting the rotation of the eject link lever 313 caused by the coil spring 316 to horizontally hold the lever portion 314.

Further, a pin 317 is provided in a specified upper end position of the surface of the eject lever 307 facing the guide plate 305. The opposite ends of a torsion coil spring 318 are rotatably mounted on the pin 317 and a pin 319 provided in a specified position of the flat plate 41. The coil spring 318 applies a drive force to switch the position of the eject lever 307.

Next, the construction of the locking mechanism 400 for the cartridge cover 8 is described.

The locking mechanism 400 is provided with the unlock lever 401, a lock lever 407, an unlocked state holding lever 416 and a torsion coil spring 423.

The unlock lever 401 causes the lock lever 407 to unlock the cartridge cover 8. The unlock lever 401 is formed with a contact portion 404 in a specified peripheral position of the front surface of a disk-shaped base portion 402 and also with a lever portion 405 projecting downward in a specified peripheral position of the rear surface of the base portion 402 opposite from the position of the contact portion 404. The lever portion 405 is an L-shaped member which is bent outward substantially at right angles in its intermediate position. A front lever portion 405a in parallel with the base portion 402 is so curved as to face a contact portion 411 of the lock lever 407. A hole 403 is formed in the center of the base portion 402. The unlock lever 401 is rotatably supported on a horizontal plane by fitting a shaft 406 (see FIG. 16) provided at the support plate 167 into the hole 403.

The lock lever 407 acts to lock and unlock the cartridge cover 8. The lock lever 407 is a plate member formed with a hole 409 substantially in the center of a lock lever main body 408. Further, the lock lever 407 is rotatably supported by fitting a shaft 410 projecting in a specified position on the outer surface of the flat plate 42 of the first housing member 31A into the hole 409.

The lock lever 407 is formed at its upper and lower ends with a rectangular contact portion 411 and an engaging claw 412 formed by bending parts of the lock lever main body 408 toward the front surface of the camera, respectively. The engaging claw 412 is engaged with the engaging hole 84 of the engagement portion 83 provided at the cartridge cover 8 to lock the cartridge cover 8.

Further, an engagement portion 413 is formed by cutting away a part of the lever main body 408 in a specified position at the right edge (edge toward the cartridge chamber 11) of the lock lever main body 408 above the engaging claw 412. The engagement portion 413 is engaged with a locking portion 422 of the unlocked state holding lever 416 to hold the lever 416 in position. The right edge of the lock lever main body 408 extending between the engagement portion 413 and the engaging claw 412 acts as a contact portion 414 which comes into contact with the locking portion 422 of the lever 416.

Further, a locking portion 415 is formed by bending a part of the lock lever main body 408 in a specified position of the left edge of the lock lever main body 408 above the engaging claw 412. The locking portion 415 supports one end of the torsion coil spring 423.

The unlocked state holding lever 416 acts to slightly open the cartridge cover 8 with respect to the cartridge chamber 11 during the unlocking of the cartridge cover 8 and to hold the lock lever 407 in its unlock position. The lever 416 is also made of a plate member formed with a pair of oblong holes 418, 418' extending along the length of the lever 416 substantially in the middle of a lever main body 417. The lever 416 is movably provided along the vertical direction at the bottom of the outer surface of the flat plate 42 of the first housing member 31A. To the oblong holes 418, 418' are loosely fitted a pair of guide pins 410, 420' projecting in specified positions on the outer surface of the flat plate 42 so as to guide the vertical movement of the lever 416.

A contact portion 419 is formed by bending a part of the lever main body 417 in a right bottom corner position of the lever main body 417, and the locking portion 422 is also formed by bending a part of the lever main body 417 in a specified position at the left edge of the lever main body 417. The locking portion 422 acts to support the other end of the torsion coil spring 423 and to hold the lock lever 407 in its unlock position.

The opposite ends of the coil spring 423 are secured to the locking portion 415 of the lock lever 407 and the locking portion 422 of the unlocked state holding lever 416, respectively. The spring force of the coil spring 423 is translated into a counterclockwise (direction of arrow A6 in FIG. 32) rotational force given to the lock lever 407 and into a downward (direction of arrow A7 in FIG. 32) acting biasing force given to the unlocked state holding lever 416.

Next, the operation of the ejecting mechanism 300 for the cartridge KT and of the locking mechanism 400 for the cartridge cover 8 is described with reference to FIGS. 34 to 42.

First, the operation of the ejecting mechanism 300 and of the locking mechanism 400 during the loading of the cartridge KT is described.

FIGS. 34 to 39 are construction diagrams showing the operations of the respective elements of the ejecting mechanism 300 and of the locking mechanism 400 during the loading of the cartridge KT when viewed from the front of the camera.

Figure 35:
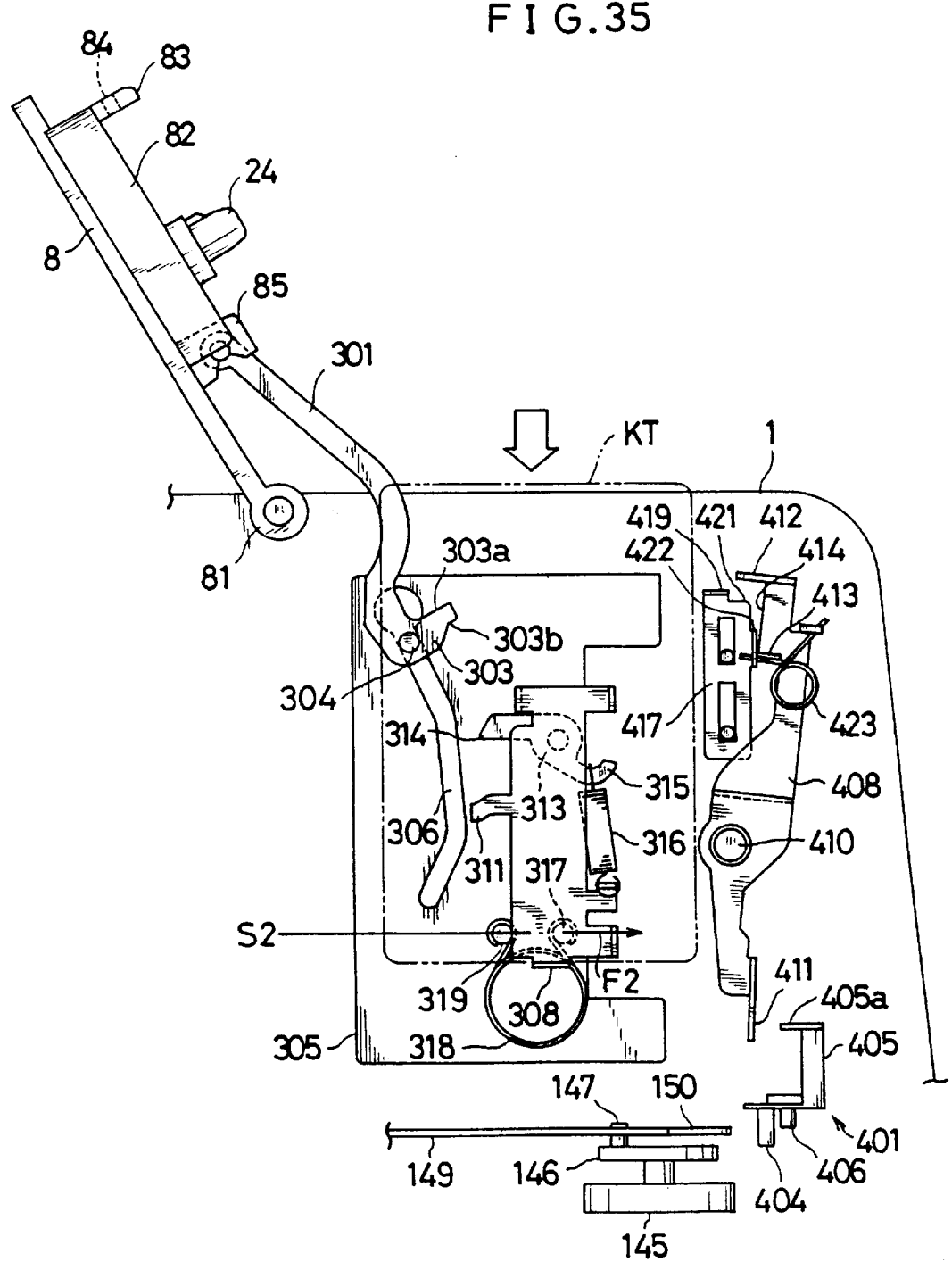
FIG. 35 is a diagram showing the cartridge being forced into the cartridge chamber.
Figure 36:
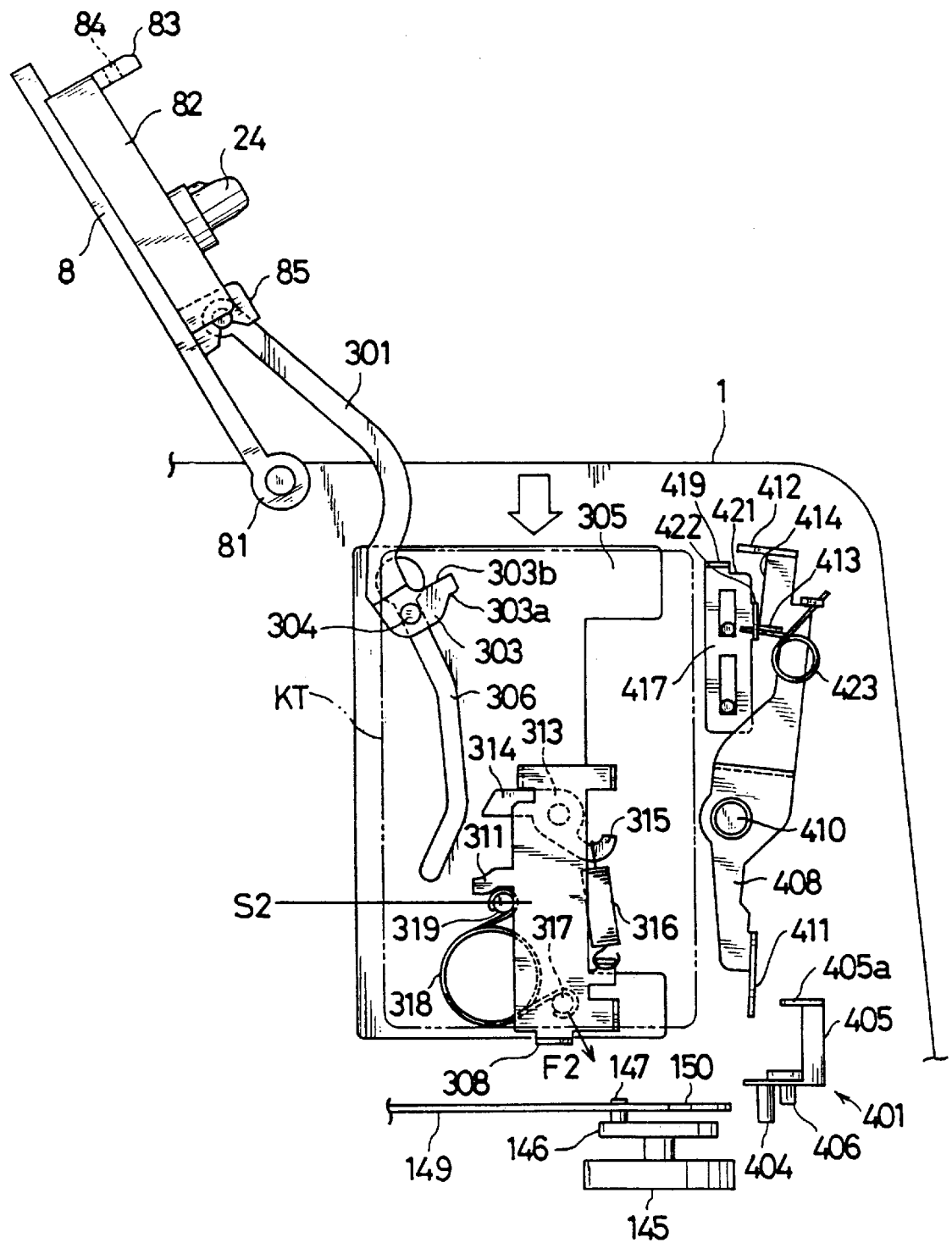
FIG. 36 is a diagram showing the cartridge completely pressed into the cartridge chamber.
Figure 37:
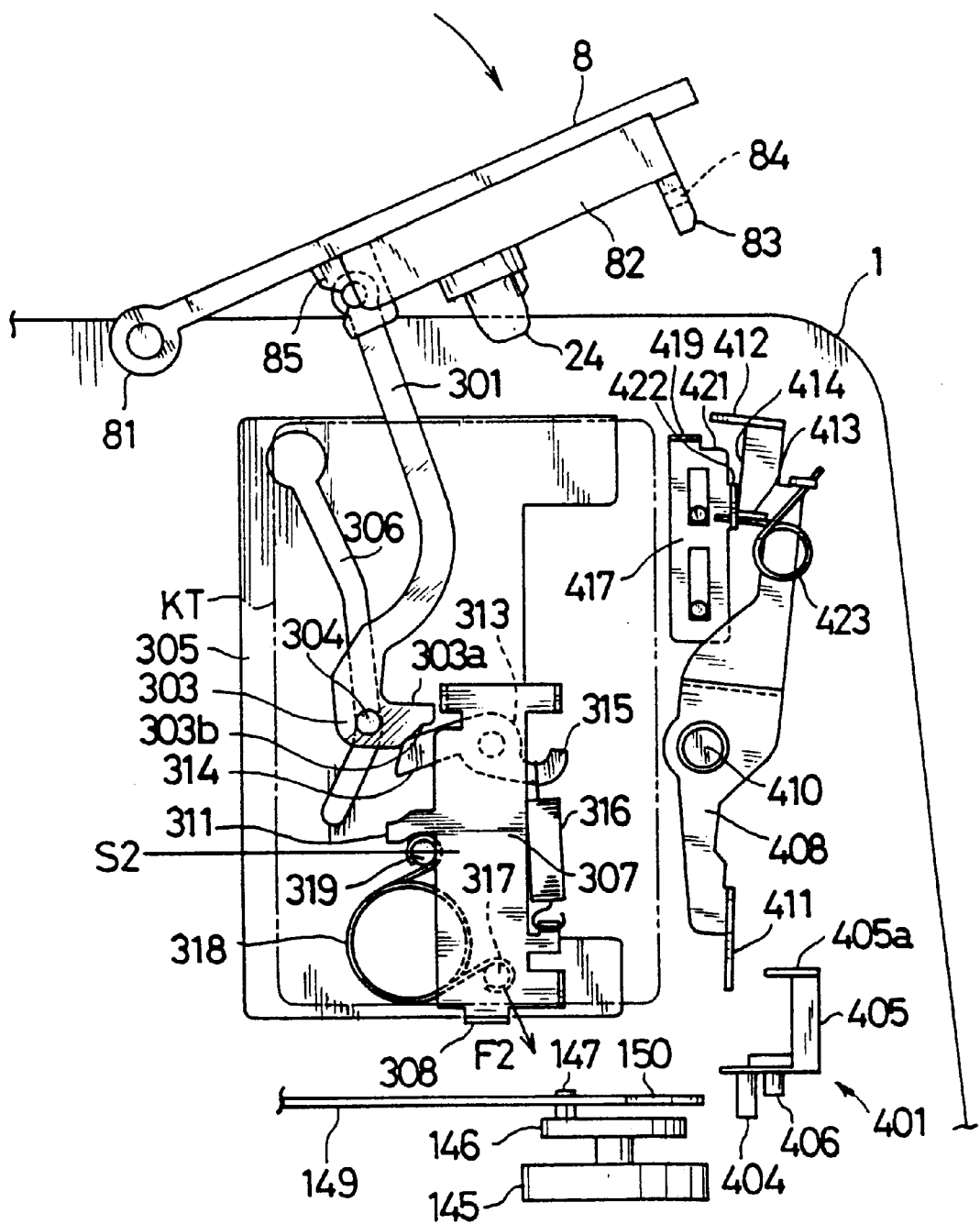
FIG. 37 is a diagram showing the cartridge cover of the cartridge chamber being closed.
Figure 38:
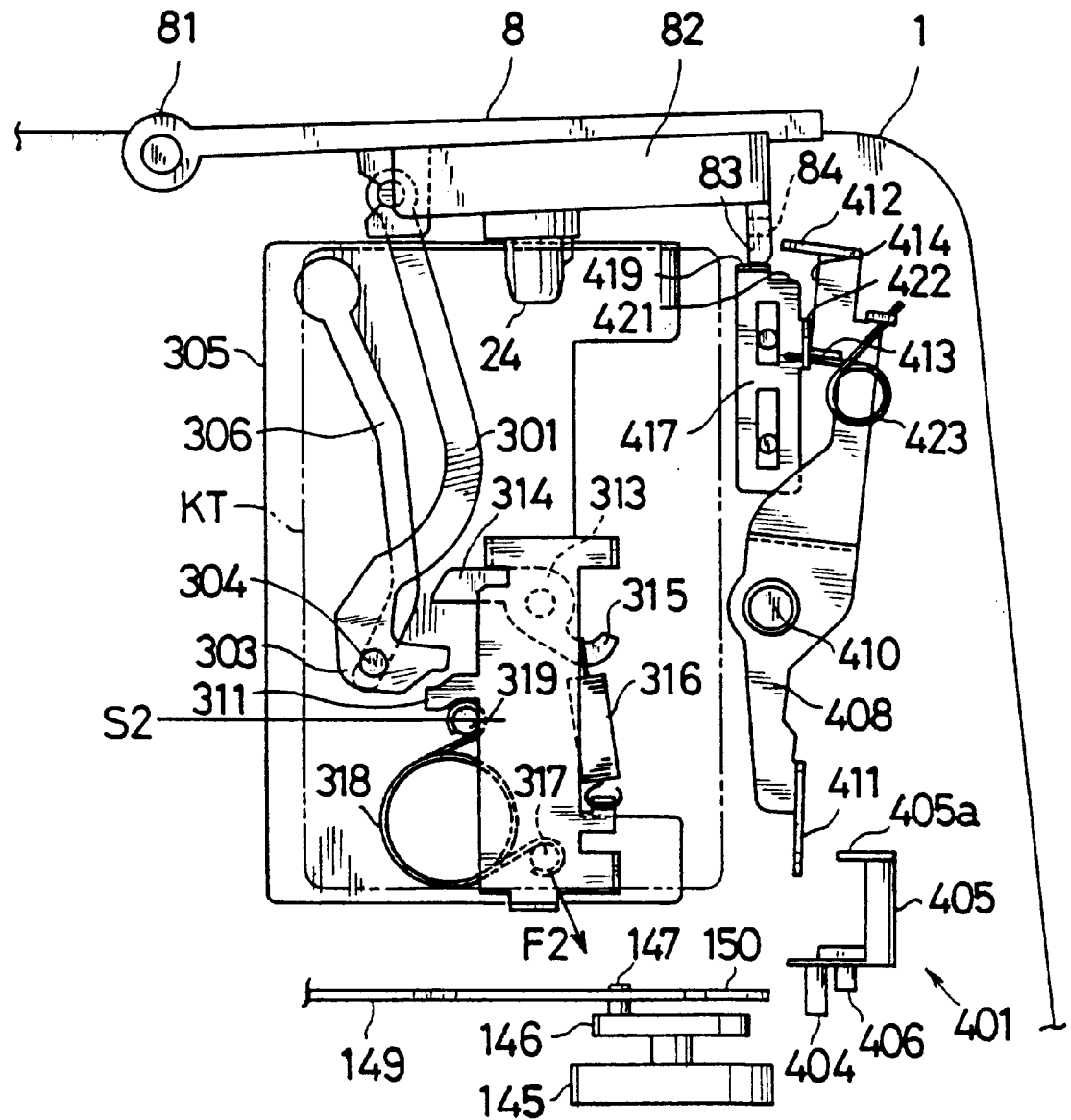
FIG. 38 is a diagram showing the cartridge cover of the cartridge chamber immediately before being locked.
Figure 39:
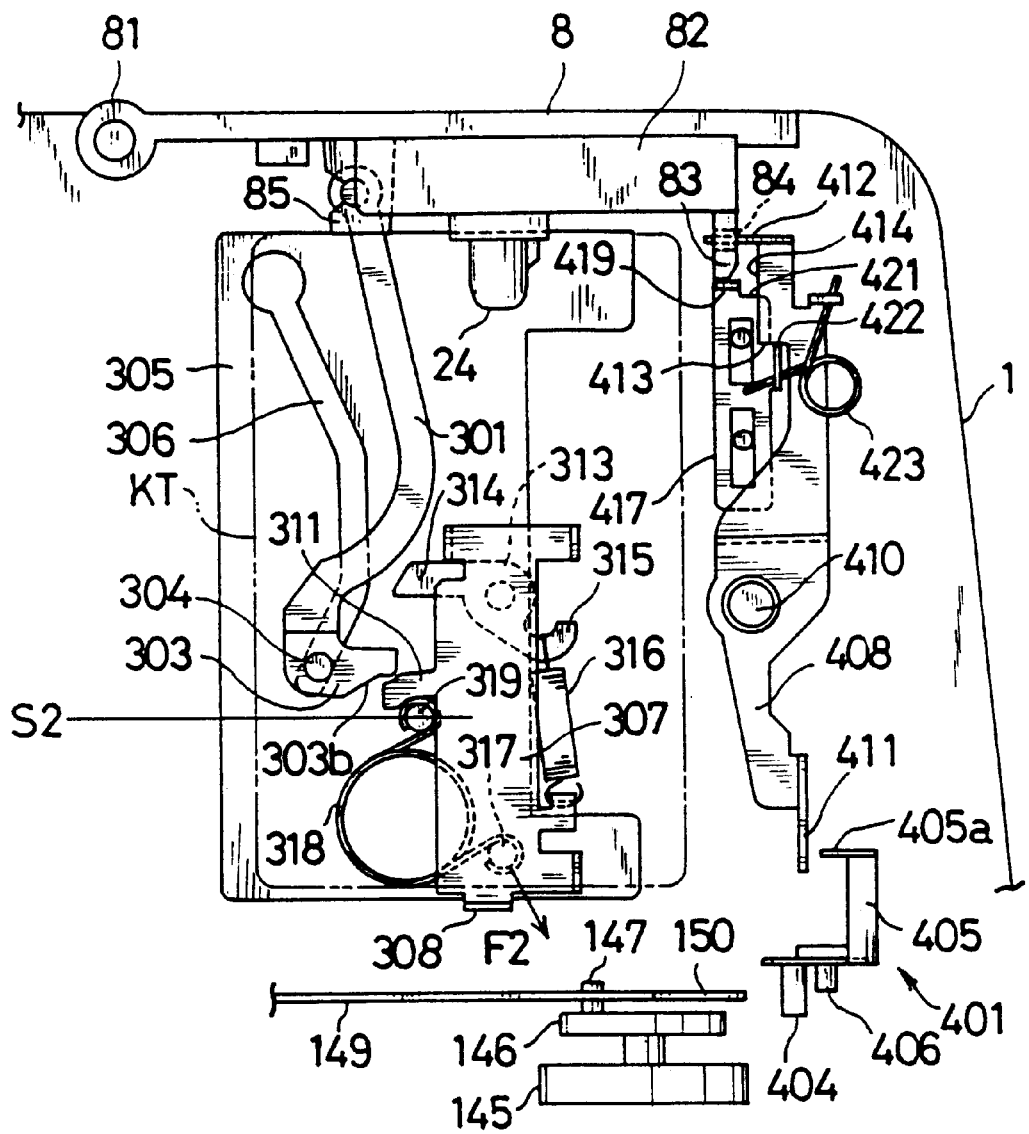
FIG. 39 is a diagram showing the cartridge cover of the cartridge chamber after being locked.

FIG. 34 shows the cartridge KT loaded into the cartridge chamber by action of gravity; FIG. 35 shows the cartridge KT being pressed into the cartridge chamber 11; FIG. 36 shows the cartridge KT completely pressed into the cartridge chamber 11; FIG. 37 shows the cartridge cover 8 being closed; FIG. 38 shows the cartridge cover 8 immediately before being locked; and FIG. 39 shows the cartridge cover 8 after being locked.

It should be noted that the camera main body 1 in FIGS. 34 to 39 are turned upside down since the cartridge KT is normally loaded into or ejected from the cartridge chamber 11 with the cartridge cover 8 opened upward. In the description below, an upward movement in FIGS. 34 to 39 is referred to as an upward movement and a rotational movement to the right is referred to as a clockwise rotation in order to simplify the description in connection with the drawings.

While the cartridge KT is not loaded, the eject lever 307 is located in its eject position at an upper limit of its movable range and the lock lever 407 is located in its unlock position (see the state of FIG. 34).

If S2 denotes a horizontal line segment passing through the pin 319 supporting the one end of the torsion coil spring 318, the pin 317 supporting the other end of the spring 318 is located above the line segment S2. Since the force of the spring 318 acts in a direction obliquely upward to the right (direction of arrow F2 in FIG. 34) with respect to the pin 319, the eject lever 307 is held in its eject position by this spring force.

Further, since the force of the coil spring 423 acts on the locking portion 415 of the lock lever 407 in a direction obliquely upward to the left (direction of arrow F3 in FIG. 34), the lock lever 407 rotates counterclockwise about the shaft 410. However, the rotation of the lock lever 407 is restricted by the contact of the contact portion 414 of the lock lever 407 with the locking portion 422 of the unlocked state holding lever 416 and, therefore, the lock lever 407 is held in this rotation restricting position (position shown in FIG. 34; hereinafter, "unlock position").

Further, since the force of the coil spring 423 acts on the unlocked state holding lever 416 in a direction obliquely upward to the right (direction of arrow F4 in FIG. 34), the lever 416 moves upward. However, the upward movement of the lever 416 is restricted by the guide pins 420, 420' coming into contact with the oblong holes 418, 418'. As a result, the lever 416 is held in this upward movement restricting position (position shown in FIG. 34; hereinafter, "unlocked state holding position").

The cartridge KT is loaded into the cartridge chamber 11 by pressing down the bottom surface 512 of the cartridge KT projecting from the cartridge loading opening 43 by finger after inserting the cartridge KT into the cartridge chamber 11 by action of gravity.

When being loaded into the cartridge chamber 11, the cartridge KT moves downward by action of gravity until the upper surface 510 thereof comes into contact with the eject claw 308 of the eject lever 307. Since the eject lever 307 is held in its eject position by the torsion coil spring 318, the cartridge KT is not completely loaded into the cartridge chamber 11. A part of the cartridge KT projects from the cartridge loading opening 43 by a specified distance (see FIG. 34).

Thereafter, when the cartridge KT is pressed down against the spring force of the coil spring 318 to a position where the pin 319 of the eject lever 307 is located slightly below the line segment S2 (see FIG. 35), the direction of the spring force of the coil spring 318 acting on the pin 319 is inverted into a direction obliquely downward to the right. As a result, the eject lever 307 is automatically lowered to its load position by the spring force of the coil spring 318, thereby completing the loading of the cartridge KT into the cartridge chamber 11 (state of FIG. 36).

Subsequently, as the cartridge cover 8 is rotated clockwise to close the cartridge loading opening 43, the hook 303 of the eject hook lever 301 moves downward along the guide groove 306. When the cartridge cover 8 is rotated by a specified angle, the contact portion 303b of the hook 303 comes into contact with the lever portion 314 of the eject link lever 313 (see FIG. 37). When the cartridge cover 8 is rotated against the spring force of the coil spring 316 until the leading end of the engaging hole 84 comes into contact with the contact portion 419 of the unlocked state holding lever 416, the lever 313 rotates counterclockwise, thereby moving the lever portion 314 away from the moving path of the hook 303. As a result, the hook 303 is allowed to move between the lever portion 314 and the projection 311 (see FIG. 38).

When the cartridge cover 8 is rotated against the spring force of the torsion coil spring 423 acting on the unlocked state holding lever 416 until it becomes in flush with the bottom surface of the camera main body 1, the lever 416 moves downward by being pressed by the engagement portion 83 of the cartridge cover 8. This downward movement of the lever 416 brings the contact portion 414 out of contact with the locking portion 422, and the lock lever 407 is rotated counterclockwise by the spring force of the coil spring 423. The engaging claw 412 fits into the engaging hole 84 of the downward moving engagement portion 83 to automatically lock the cartridge cover 8.

Further, the locking portion 422 of the unlocked state holding lever 416 having moved downward by being pressed by the engagement portion 83 engages the engagement portion 413 of the lock lever 407, with the result that the upward movement of the lever 416 is restricted to hold the cartridge cover 8 in its lock position (see FIG. 39).

Although the above description concerns the case where the cartridge KT is loaded by being lowered from the eject position to the load position, the cartridge KT may be loaded into the cartridge chamber 11 by closing the cartridge cover 8 after being fitted into the cartridge chamber 11 by action of gravity.

More specifically, when the hook 303 of the eject hook lever 301 is lowered as the cartridge cover 8 is closed, the contact portion 303b of the hook 303 comes into contact with the projection 311 of the eject lever 307, thereby lowering the eject lever 307 to the load position by being pressed by the hook 303. In this way, the cartridge KT is loaded into the cartridge chamber 11.

Next, the operation of the ejecting mechanism 300 and the locking mechanism 400 is described during the ejection of the cartridge KT.

Figure 40:
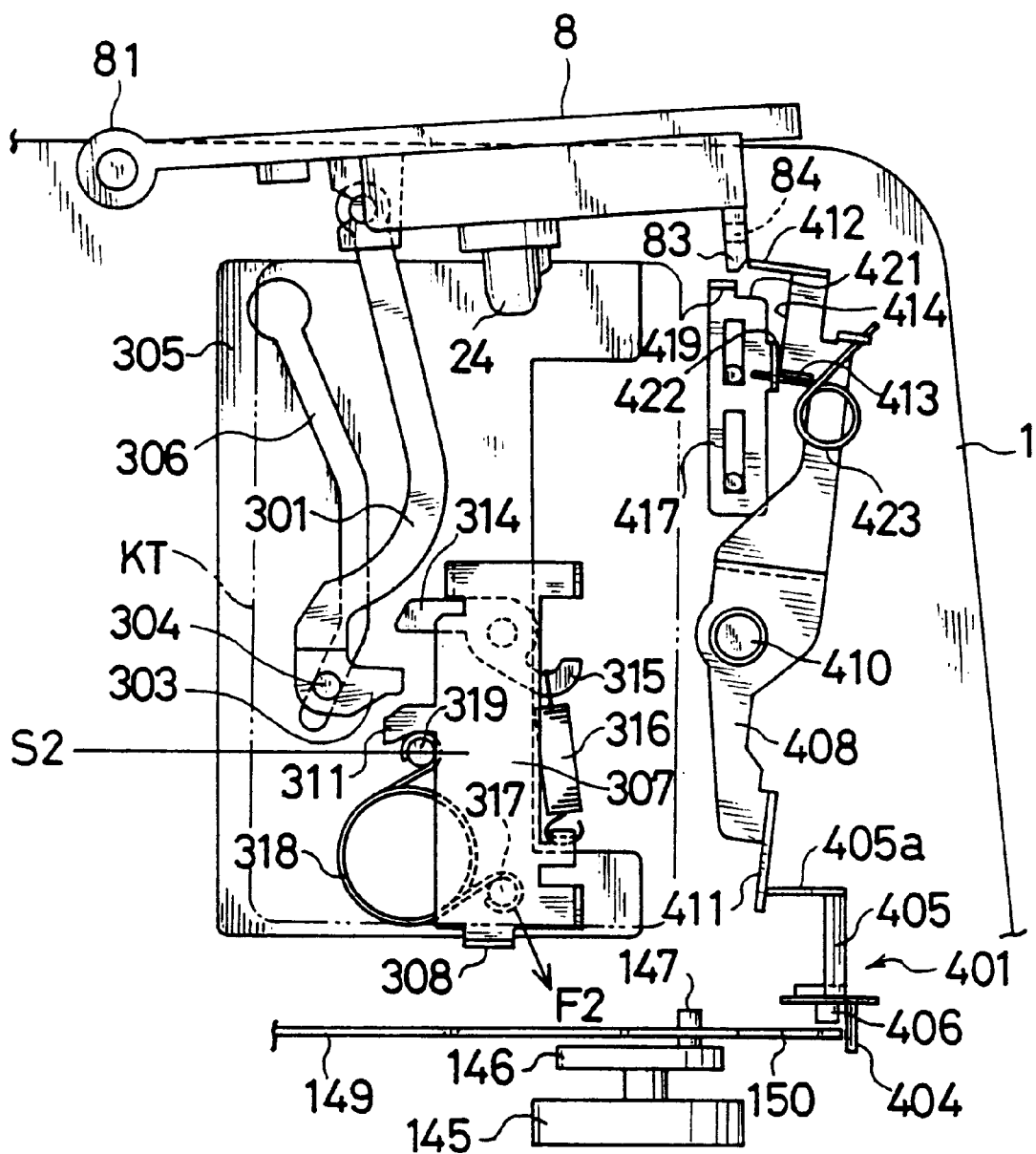
FIG. 40 is a diagram showing the cartridge cover of the cartridge chamber after being unlocked.
Figure 41:
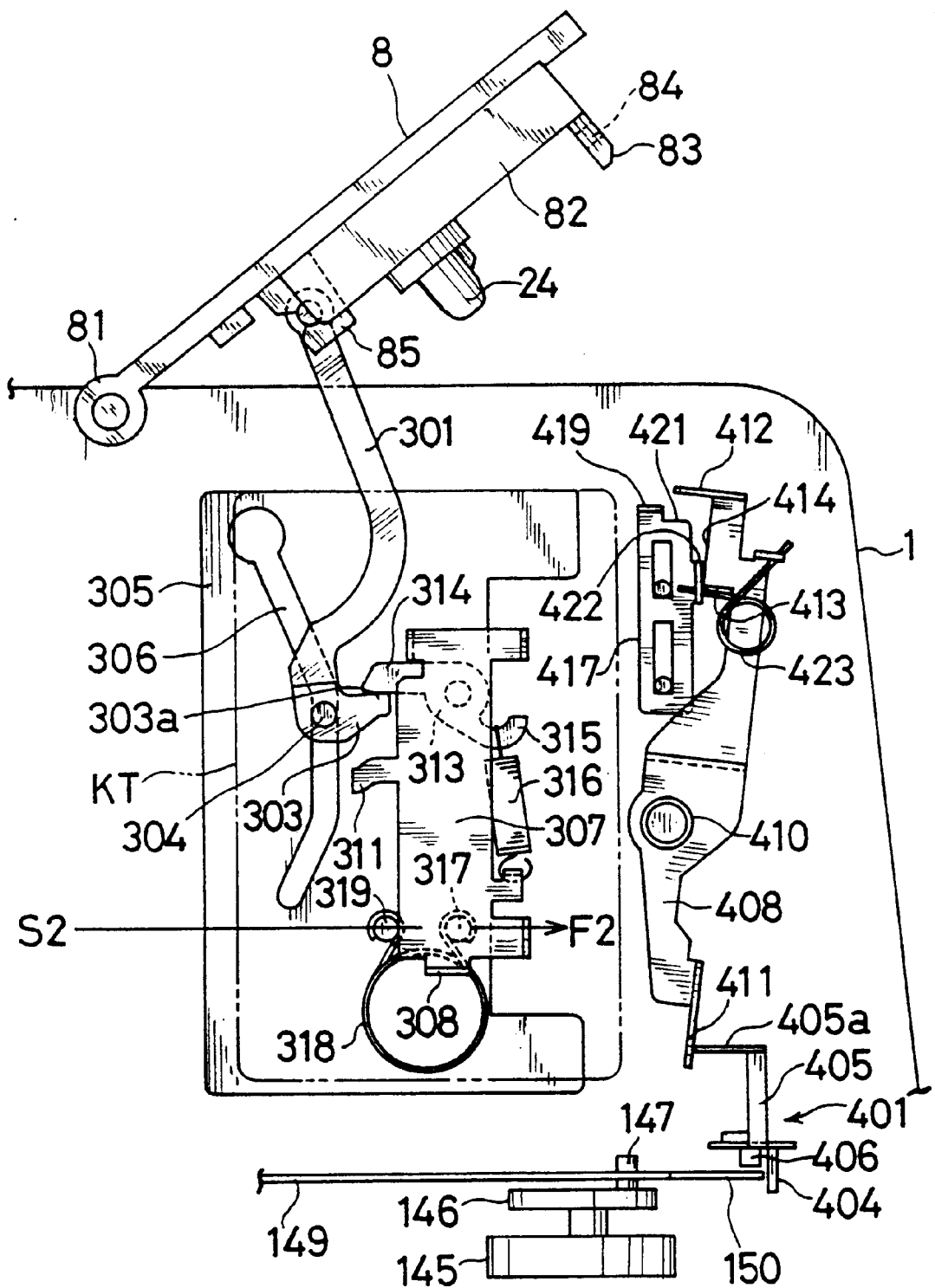
FIG. 41 is a diagram showing the cartridge immediately before being ejected.
Figure 42:
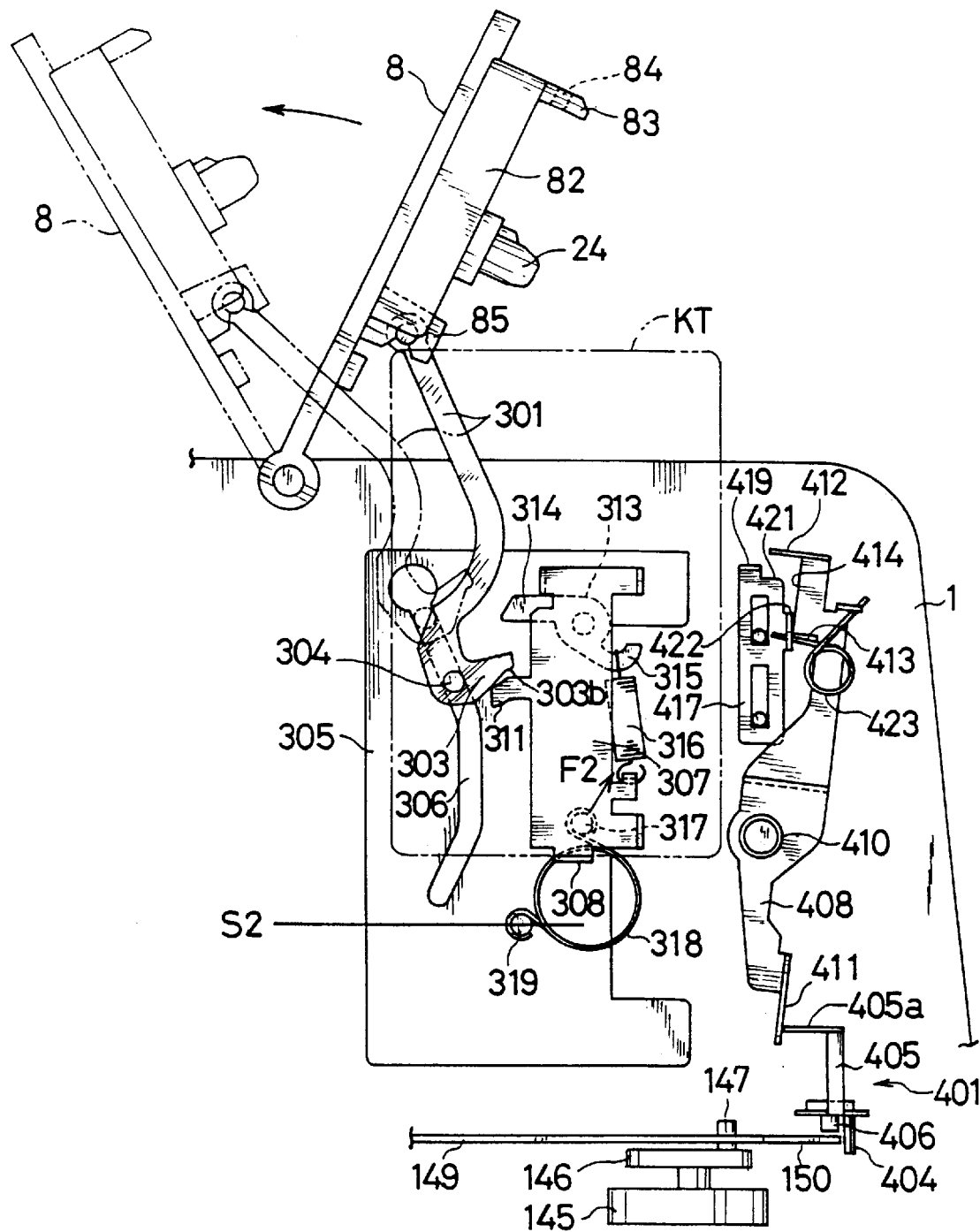
FIG. 42 is a diagram showing the cartridge after being ejected.

FIGS. 40 to 42 are diagrams showing the operation of the respective elements of the ejecting mechanism 300 and the locking mechanism 400 during the ejection of the cartridge KT when viewed from the front of the camera.

FIG. 40 shows a state immediately after the cartridge cover 8 is unlocked; FIG. 41 shows a state immediately before the cartridge KT is ejected; and FIG. 42 shows a state after the cartridge KT is ejected. It should be appreciated that the camera main body 1 is turned upside down in FIGS. 40 to 42 as well.

The cartridge KT is ejected by unlocking the cartridge cover 8 by the torque of the drive motor M as described above.

Specifically, when the crank lever 149 is moved by rotating the crank plate 146 by the torque of the drive motor M, the contact portion 150 of the crank lever 149 comes into contact with the contact portion 404 of the unlock lever 401 to rotate the unlock lever 401. Thereby, the lever portion 405 comes into contact with the contact portion 411 of the lock lever 407, rotating the lock lever 407 clockwise against the spring force of the coil spring 423.

The rotation of the lock lever 407 disengages the engaging claw 412 from the engaging hole 84 of the cartridge cover 8 and also disengages the locking portion 422 from the engagement portion 413, with the result that the unlocked state holding lever 416 moves upward by the spring force of the coil spring 423. The upward movement of the lever 416 causes the contact portion 419 to come into contact with the engagement portion 83 of the cartridge cover 8, thereby pushing up the leading end of the cartridge cover 8 to open the cartridge cover 8 (see FIG. 40).

When the leading end of the cartridge cover 8 is pushed up by finger in this state, the cartridge cover 8 rotates counterclockwise to open the cartridge loading opening 43. At this time, the hook 303 of the eject hook lever 301 moves upward along the guide groove 306 as the cartridge cover 8 rotates. When the cartridge cover 8 rotates by a specified amount, the hook 303 engages the lever portion 314 of the eject link lever 313.

Since the clockwise rotation of the lever portion 314 is restricted by the projection 312 of the eject lever 307, the upward movement of the hook 303 causes the eject lever 307 to move upward against the spring force of the coil spring 318. When the pin 319 of the eject lever 307 is pressed down to a position slightly above the line segment S2 (see FIG. 41), the direction of the spring force of the coil spring 318 acting on the pin 319 is inverted to a direction obliquely upward to the right, and the eject lever 307 is automatically moved upward to the eject position by the spring force of the coil spring 318. In this way, the ejection of the cartridge KT is completed (see FIG. 42).

Thereafter, the cartridge KT is taken out of the cartridge chamber 11 by fully opening the cartridge cover 8 and by being withdrawn through the cartridge loading opening 43 as indicated by phantom line in FIG. 42.

As described above, the eject lever 307 having the engaging claw 308 coming into contact with the inner surface of the cartridge chamber 11 to eject the cartridge KT is movably provided between the eject position and the load position. The eject lever 307 is held in the eject position or the load position by the biasing force of the torsion coil spring 318 whose biasing direction is inverted in an intermediate position of the movable range of the eject lever 307. The eject link lever 313 retractably projects from the eject lever 307, and the guide plate 305 formed with the substantially arch-shaped guide groove 306 is so provided as to be movable closer to and away from the eject link lever 313. There is also provided the eject hook lever 301 which has its base end rotatably supported on the cartridge cover 8 and also has, at its leading end, the hook 303 slidably fittable in the guide groove 306. As the cartridge cover 8 is opened, the hook 303 of the eject hook lever 301 moving toward the cartridge loading opening 43 comes into contact with the eject link lever 313, thereby moving the eject lever 307a to the position where the biasing direction of the coil spring 318 is inverted. Thereafter, the eject lever 307 is moved to the eject position by the inverted spring force of the coil spring 318. Accordingly, the cartridge KT can be securely and stably ejected from the cartridge chamber 11 as the cartridge cover 8 is opened.

Further, since the hook 303 of the eject hook lever 301 moving as the cartridge cover 8 is opened moves along a substantially arcuate path and comes into contact with the eject link lever 313 of the eject lever 307 in an intermediate position of the opening/closing range of the cartridge cover 8, even if the eject lever 307 is moved after the cartridge KT is inserted into the cartridge chamber 11 during the loading of the cartridge KT, the cartridge cover 8 is not closed. Accordingly, an operator does not encounter an accident of, e.g. pinching his finger while loading the cartridge KT. Therefore, the cartridge can be easily and safely loaded.

Further, when the hook 303 moves toward the bottom side of the cartridge chamber 11, the eject link lever 313 is retractable from the moving path of the hook 303. The hook 303 rapidly passes the eject link lever 313 in the very neighborhood thereof. Accordingly, the eject link lever 313 can securely be returned to its projecting position by a maximally short stroke of the eject hook lever 301.

In the locking mechanism 400, the engaging claw 412 is linearly moved substantially in the horizontal direction (widthwise direction of the camera main body 1) to be engaged with the engaging hole 84 of the cartridge cover 8 by rotating the lock lever 407 on the vertical plane. However, the engaging claw 412 may be engaged with the engaging hole 84 of the cartridge cover 8 by being rotated about a rotatable shaft which is so provided as to extend in the vertical direction (height direction of the camera main body 1).

Figure 43:
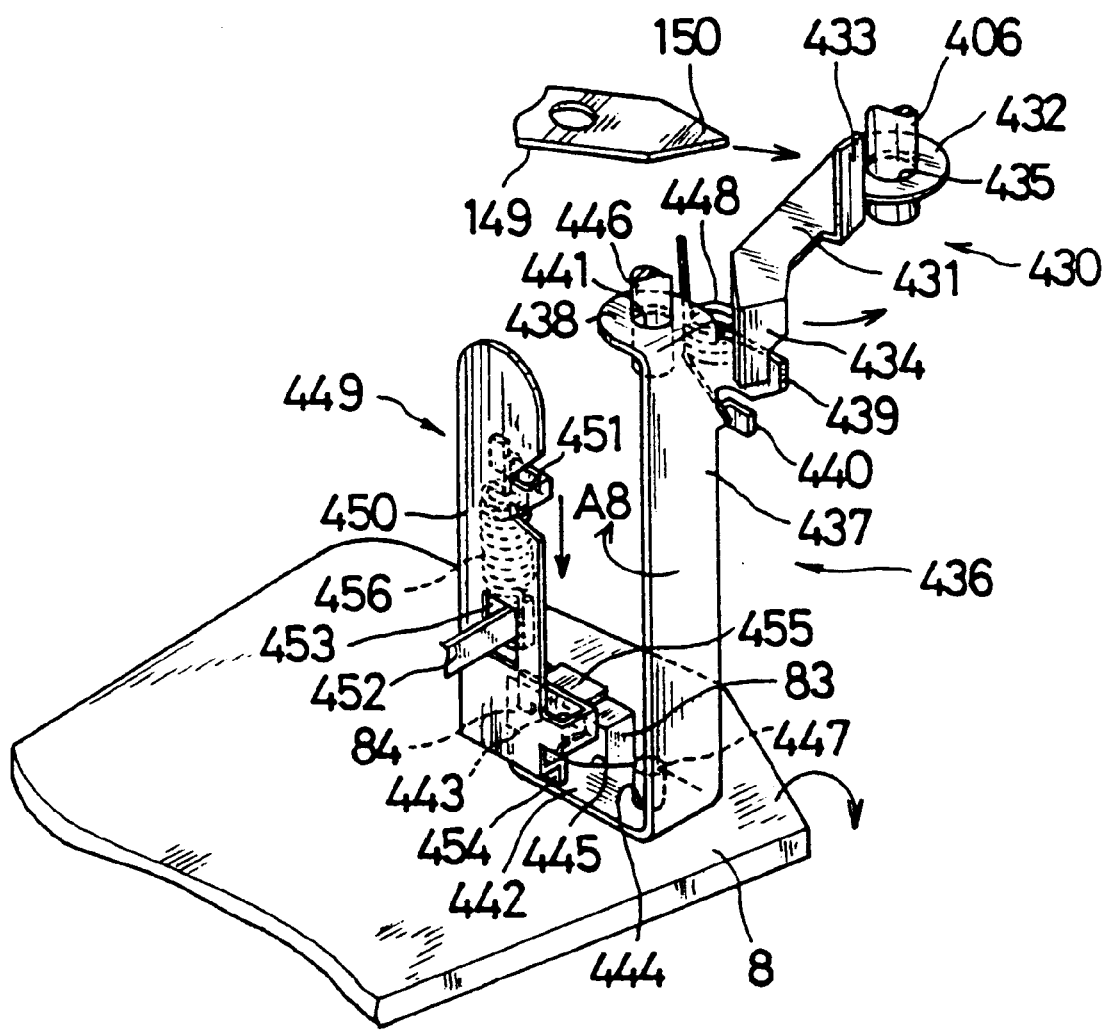
FIG. 43 is a perspective view of an essential portion of a second embodiment of the locking mechanism.

FIG. 43 is a perspective view showing an essential portion of a second embodiment of the locking mechanism.

The locking mechanism shown in FIG. 43 is provided with an unlock lever 430, a lock lever 436, an unlocked state holding lever 449, a torsion coil spring 448 and a tension coil spring 456.

The unlock lever 430 is a strip-shaped plate member and is formed with a support portion 432 at the base end of an unlock lever main body 431, a contact portion 433 projecting upward in a specified position of the base end thereof, the contact portion 150 of the crank lever 149 coming into contact with the contact portion 433, and an engaging portion 434 at the leading end thereof. The engaging portion 434 is formed by bending the leading end of the unlock lever main body 431. The support portion 432 is formed with a hole 435, and the unlock lever 430 is rotatably supported by fitting the shaft 406 on the unillustrated support plate into the hole 435.

The lock lever 436 is also a strip-shaped plate member and is formed with a support portion 438, an engagement portion 439, and a locking portion 440 at the upper end of a lock lever main body 437 and with a support portion 442 and an engaging claw 443 at the lower end thereof. The support portions 438, 442 are formed by bending their opposite ends at right angles in the same direction, and holes 441, 444 are formed in the vicinity of their bent portions, respectively. The engagement portion 439 is a projection projecting in a direction opposite from the support portion 438 in a specified upper position of one side edge of the lock lever main body 437. The engaging portion 434 of the unlock lever 430 is engaged with the engagement portion 439. The locking portion 440 is a projection projecting in a direction parallel with the engagement portion 439 below the engagement portion 439. One end of the torsion coil spring 448 is secured to the locking portion 440. The other end of the coil spring 448 is secured to the unillustrated housing.

The engaging claw 443 has a hooked shape obtained by forming a recess 445 in one side end of the support portion 442, and is fittable into the engaging hole 84 of the cartridge cover 8 to lock the cartridge cover 8.

The lock lever 436 is rotatably supported by fitting a pair of vertically extending shafts 446, 447 provided on the housing into the holes 441, 444, respectively. The torsion coil spring 448 renders the lock lever main body 437 a clockwise (direction of arrow A8 in FIG. 43) rotational force when viewed from above the camera. This causes the lock lever main body 437 to rotate in such a direction that the engaging claw 443 locks the cartridge cover 8. On the other hand, when the engaging claw 443 rotates to a position where it is fitted into the engaging hole 84 of the cartridge cover 8 (hereinafter, "lock position"), the engaging portion 434 of the unlock lever 430 engages the engagement portion 439, thereby restricting the rotation of the lock lever 436. As a result, the lock lever 436 is held in the lock position.

The unlocked state holding lever 449 is a strip-like plate member and is formed in a specified upper position of one side of a holding lever main body 450 with a support portion 451 for supporting one end of the tension coil spring 456; and in an intermediate position thereof with a support projection 452 for supporting the other end of the spring 456, a hole 453 being formed in the support projection 452. The support projection 452 is provided at the unillustrated housing, and the holding lever main body 450 is biased downward by the contractive force of the tension coil spring 456 mounted between the support portion 451 and the support projection 452.

At the bottom end of the holding lever main body 450, there is provided a projection 454 having an L-shaped leading end for holding the cartridge cover 8 unlocked. Above the projection 454, there is provided a contact piece 455 which is formed by bending a projection projecting from one side edge of the lever main body 450 and comes into contact with the engagement portion 83 of the cartridge cover 8. When the lock lever main body 437 rotates counterclockwise (direction opposite from the direction of arrow A8 in FIG. 43), the projection 437 fits into the recess 445 of the support portion 442 to hold the lock lever main body 437 in a position where the engaging claw 443 is not engaged with the engaging hole 84 of the cartridge cover 8 (hereinafter, "unlock position"). Further, during the unlocking of the cartridge cover 8, the contact piece 455 comes into contact with the engagement portion 83 of the cartridge cover 8 to pressingly open the cartridge cover 8.

FIGS. 44A to 44C are diagrams showing the operation of the locking mechanism according to the second embodiment, wherein FIG. 44A shows the locked state, FIG. 44B shows the state upon the completion of the unlocking operation, and FIG. 44C shows a state where the unlocked state is held. In FIGS. 44A to 44C, the upper sides show the rotation of the unlock lever 449, whereas the lower sides the rotation of the clawing claw 443.

As the crank lever 149 is moved forward while the cartridge cover 8 is locked (state of FIG. 44A) to rotate the unlock lever 430 counterclockwise when viewed from above the camera, the lock lever 436 rotates counterclockwise, thereby disengaging the engaging claw 443 from the engaging hole 84 of the cartridge cover 8 to unlock the cartridge cover 8 (state of FIG. 44B). When the lock lever 436 rotates to the unlock position, the unlocked state holding lever 449 is lowered by the tension coil spring 456, with the result that the cartridge cover 8 rotates to open by being pressed by the contact piece 455 having come into contact with the leading end of the engagement portion 83, and that the projection 454 fits into the recess 445 of the support portion 442 to hold the unlocked state (state of FIG. 44C).

On the other hand, when the cartridge cover 8 is pressed toward the cartridge chamber 11 against the spring force of the tension coil spring 456 with the leading end of the engagement portion 83 in contact with the contact piece 455 of the unlocked state holding lever 449 in order to close the cartridge cover 8 in its unlocked position (state of FIG. 44C), the lever 449 moves upward to release the restriction of the counterclockwise rotation of the lock lever main body 437 by the projection 454. Accordingly, the engaging claw 443 fits into the engaging hole 84 of the engagement portion 83 to lock the cartridge cover 8 (state of FIG. 44A).

The lock lever main body 437 is held in the lock position by the clockwise biasing force by the torsion coil spring 448 and by the restriction of the rotation by the unlock lever 430, thereby holding the cartridge cover 8 locked.

The first embodiment of the locking mechanism has a disadvantage of requiring a width sufficient to ensure the movable range of the engaging claw 443 since the engaging claw 443 is linearly moved, but has an advantage of a reduced thickness. Thus, as shown in the first embodiment, the locking mechanism 400 can be arranged in such a narrow space as a clearance between the battery chamber 12 and the drive motor M.

On the other hand, the second embodiment of the locking mechanism has a disadvantage of requiring a thickness sufficient to ensure a rotatable range of the engaging claw 443 since the engaging claw 443 is rotated, but has an advantage of a reduced width and a compact size. Thus, as shown in the second embodiment, the locking mechanism 400 can be arranged taking advantage of a space at the corner of the side surfaces of the camera main body 1.

As described above, the film feeding device for the film cartridge self-loading type camera transmits the torque of one electric motor to the fork provided at the cartridge chamber and to the take-up spool provided at the film take-up chamber to feed the film in a desired manner in accordance with the drive modes such as the film winding mode, the film rewinding mode and the film loading mode. This film feeding device is provided with the first gear device for transmitting the torque of the electric motor to the fork in the film rewinding mode, the second gear device for transmitting the torque of the electric motor to the take-up spool in the film winding mode and the film loading mode, the third gear device for transmitting the torque of the electric motor to the fork in the film loading mode, and the torque transmission mechanism including the cam for controlling switching the engagement of the respective planetary gear wheels of the first to third gear devices in the respective drive modes and the transmission gear wheel for transmitting the torque of the electric motor to the cam. The film feeding device thus constructed is arranged outside the bottom wall of the film loading chamber. Accordingly, the film feeding mechanism of the film cartridge self-loading type camera can be made small and compact.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A camera comprising:
   a cartridge chamber which accommodates a film cartridge containing a film;
   a cover which openably closes the cartridge chamber;
   a locking mechanism which locks the cover in a closing state of closing the cover, the locking mechanism including:
   a pivotal member pivotable about a specified axis, and having on one end a locking portion engageable with the cover to lock the cover in the closing state and on the other end a contact portion; and
   a biasing member which urges the pivotal member in a locking direction that the locking portion engages with the cover;
   a releasing device which releases the locking of the cover in the closing state, the releasing device including:
   a motor which generates a driving force;
   a crank member driven by the motor;
   an unlocking member which is operable to come into contact with the contact portion of the pivotal member to rotate the pivotal member in a direction opposite to the locking direction; and
   a link member which operatively connects the crank member with the unlocking member.

2. A camera as defined in claim 1, further comprising:
   a fork provided in the cartridge chamber and engageable with a spool provided in the film cartridge;
   a film take-up chamber provided with a take-up spool for taking up the film;
   a transmission mechanism which transmits the driving force from the motor to the crank member, the take-up spool, and the fork, the transmission mechanism having a first transmission route of transmitting the driving force to the crank member to actuate the unlocking member, a second transmission route of transmitting the driving force to the take-up spool to wind the film, and a third transmission route of transmitting the driving force to the fork to rewind the film; and
   a changer which changes over the first, second, and third transmission routes.

3. A camera as defined in claim 2, wherein the transmission mechanism further has a fourth transmission route of transmitting the driving force to the take-up spool and the fork to load the film.

4. A camera mountable with a film cartridge containing a film and having a light blocking lid rotatable about a vertical axis to open and close the film cartridge, comprising:
   a cartridge chamber which accommodates the film cartridge;
   an engaging member which is rotatably provided in the cartridge chamber and engageable with the light blocking lid when the film cartridge is placed in the cartridge chamber;
   a cover which openably closes the cartridge chamber;
   a pivotal member pivotable about a specified axis, and having on one end a locking portion engageable with the cover to lock the cover in the closing state and on the other end a contact portion;
   a biasing member which urges the pivotal member in a locking direction that the locking portion engages with the cover;
   a motor which generates a driving force;
   a crank member driven by the motor;
   an unlocking member which is operable to come into contact with the contact portion of the pivotal member to rotate the pivotal member in a direction opposite to the locking direction; and
   a link member which operatively connects the crank member with the engaging member and the unlocking member.

5. A method for locking and unlocking a cover of a cartridge chamber for accommodating a film cartridge, the method comprising the steps of:
   permitting a pivotal member to engage with the cover to lock the cover in a closing position when a film cartridge is placed in the cartridge chamber;

keeping the pivotal member to engage with the cover by a biasing member;

driving a motor to generate a driving force when the locking of the cover is required to be released; and transmitting the driving force to an unlocking member operable to come into contact with the pivotal member by a way of a crank member and a link member operatively connecting the crank member with the unlocking member.

6. A camera comprising:

a cartridge chamber which accommodates a film cartridge containing a film;

a cover which openably closes the cartridge chamber;

a locking member which locks the cover in a closing state of closing the cartridge chamber; and a releasing device which releases the locking of the cover in the closing state, the releasing device including:
   a motor which generates a driving force;
   a crank member driven by the motor;
   an unlocking member which comes into contact with the locking member; and
   a link member which operatively connects the crank member with the unlocking member.

7. A camera as defined in claim 6, wherein the locking member includes:

a pivotal member pivotable about a specified axis, and having on one end a locking portion engageable with the cover to lock the cover in the closing state and one the other end a contact portion;

a biasing member which urges the pivotal member in a locking direction that the locking portion engages with the cover; and the unlocking member comes into contact with the contact portion of the pivotal member to rotate the pivotal member in a direction opposite to the locking direction.

8. A camera as defined in claim 6, further comprising:

a fork provided in the cartridge chamber and engageable with a spool provided in the film cartridge;

a film take-up chamber provided with a take-up spool for taking up the film;

a transmission mechanism which transmits the driving force from the motor to the crank member, the take-up spool, and the fork, the transmission mechanism having a first transmission route of transmitting the driving force to the crank member to actuate the unlocking member, a second transmission route of transmitting the driving force to the take-up spool to wind the film, and a third transmission route of transmitting the driving force to the fork to rewind the film; and a changer which changes over the first, second, and third transmission routes.

9. A camera as defined in claim 8, wherein the transmission mechanism further has a fourth transmission route of transmitting the driving force to the take-up spool and the fork to load the film.

10. A camera mountable with a film cartridge containing a film and having a light blocking lid rotatable about a vertical axis to open and close the film cartridge, comprising:

a cartridge chamber which accommodates a film cartridge containing a film;

an engaging member which is rotatably provided in the cartridge chamber and engageable with the light blocking lid when the film cartridge is placed in the cartridge chamber;

a cover which openably closes the cartridge chamber;

a locking member which locks the cover in a closing state of closing the cartridge chamber;

a releasing device which releases the locking of the cover in the closing state, the releasing device including:
   a motor which generates a driving force;
   a crank member driven by the motor;
   an unlocking member which comes into contact with the locking member; and
   a link member which operatively connects the crank member with the unlocking member.

11. A camera as defined in claim 10, wherein the locking member includes:

a pivotal member pivotable about a specified axis, and having on one end a locking portion engageable with the cover to lock the cover in the closing state and one the other end a contact portion; and a biasing member which urges the pivotal member in a locking direction that the locking portion engages with the cover; and the unlocking member comes into contact with the contact portion of the pivotal member to rotate the pivotal member in a direction opposite to the locking direction.

12. A camera as defined in claim 10, wherein the link member includes, a lever having a first end connected with the crank member and a second end connected with the engaging member, the lever being reciprocally movable in a first direction of releasing the locking of the cover in the closing state and closing the light blocking lid and a second direction of locking the cover in the closing state and opening the light blocking lid.

13. A method for locking and unlocking a cover of a cartridge chamber for accommodating a film cartridge, the method comprising the steps of:

permitting a locking member to engage with the cover to lock the cover in a closing position when a film cartridge is placed in the cartridge chamber;

driving a motor to generate a driving force when the locking of the cover is required to be released; and transmitting the driving force to a unlocking member operable to come into contact with the locking member by a way of a crank member and a link member operatively connecting the crank member with the unlocking member.

* * * * *